US012270264B1

(12) United States Patent
Naesgaard et al.

(10) Patent No.: US 12,270,264 B1
(45) Date of Patent: Apr. 8, 2025

(54) ROBOTIC PIPE HANDLER SYSTEMS

(71) Applicant: Canrig Robotic Technologies AS, Sandnes (NO)

(72) Inventors: Kjetil Naesgaard, Røyneberg (NO); Kenneth Mikalsen, Sandnes (NO); Travis Burke, Porter, TX (US)

(73) Assignee: Canrig Robotic Technologies AS, Sandnes (NO)

( * ) Notice: Subject to any disclaimer, the term of this patent is extended or adjusted under 35 U.S.C. 154(b) by 49 days.

(21) Appl. No.: 18/302,075

(22) Filed: Apr. 18, 2023

Related U.S. Application Data

(63) Continuation of application No. 17/360,941, filed on Jun. 28, 2021, now Pat. No. 11,643,887.

(60) Provisional application No. 63/048,503, filed on Jul. 6, 2020.

(51) Int. Cl.
*E21B 19/15* (2006.01)
*E21B 19/16* (2006.01)

(52) U.S. Cl.
CPC ............ *E21B 19/155* (2013.01); *E21B 19/16* (2013.01)

(58) Field of Classification Search
CPC .............................. E21B 19/155; E21B 19/16
See application file for complete search history.

(56) References Cited

U.S. PATENT DOCUMENTS

| | | | |
|---|---|---|---|
| 3,501,027 A | 3/1970 | Dea et al. | |
| 3,655,071 A * | 4/1972 | Langowski | ........... E21B 19/155 |
| | | | 414/22.58 |
| 3,799,010 A | 3/1974 | Guier | |
| 3,895,677 A | 7/1975 | Bokenkamp | |
| 4,051,775 A | 10/1977 | Watson | |
| 4,129,221 A | 12/1978 | Moller | |
| 4,235,566 A * | 11/1980 | Beeman | ................ E21B 19/155 |
| | | | 414/598 |
| 4,371,302 A | 2/1983 | Frias et al. | |

(Continued)

FOREIGN PATENT DOCUMENTS

| AU | 2008202799 A1 | 1/2009 |
|---|---|---|
| CN | 109477362 B | 9/2021 |

(Continued)

OTHER PUBLICATIONS

International Search Report from PCT Application No. PCT/US2021/037218, mailed Sep. 29, 2021, 1 pg.

(Continued)

Primary Examiner — Jennifer H Gay
(74) Attorney, Agent, or Firm — Abel Schillinger, LLP

(57) ABSTRACT

A pipe handling system can include first and second bridges disposed within a horizontal storage area and coupled to a guide rail, and configured to move along the guide rail, a pipe handler coupled to the first bridge, and a shuttle coupled to the second bridge, wherein the pipe handler selectively couples to the shuttle and drives the shuttle. A tubular handling system can include a bridge with first and second bridge rails with a space between, an arm coupled to the rails to manipulate a tubular through the space, and to move back and forth along the bridge; and a tubular lift system that raises or lowers the tubular in a horizontal orientation between a horizontal storage and an intermediate storage location.

12 Claims, 35 Drawing Sheets

(56) References Cited

U.S. PATENT DOCUMENTS

| | | | |
|---|---|---|---|
| 4,380,297 A * | 4/1983 | Frias | B65G 1/0442 |
| | | | 414/22.59 |
| 4,386,883 A * | 6/1983 | Hogan | E21B 19/155 |
| | | | 414/22.61 |
| 4,494,899 A | 1/1985 | Hoang et al. | |
| 4,544,135 A | 10/1985 | Albaugh | |
| 4,610,315 A * | 9/1986 | Koga | E21B 19/20 |
| | | | 175/203 |
| 4,718,805 A * | 1/1988 | Becker | E21B 19/155 |
| | | | 175/85 |
| 4,822,230 A * | 4/1989 | Slettedal | E21B 19/155 |
| | | | 175/85 |
| 5,423,390 A | 6/1995 | Donnally et al. | |
| 5,451,129 A * | 9/1995 | Boyadjieff | E21B 19/155 |
| | | | 414/738 |
| 5,458,454 A * | 10/1995 | Sorokan | E21B 19/155 |
| | | | 414/22.55 |
| 5,492,436 A | 2/1996 | Suksumake | |
| 6,220,807 B1 | 4/2001 | Sorokan | |
| 6,343,892 B1 | 2/2002 | Kristiansen | |
| 6,860,694 B2 | 3/2005 | Slettedal | |
| 6,926,488 B1 * | 8/2005 | Bolding | E21B 19/15 |
| | | | 414/22.59 |
| 7,404,697 B2 * | 7/2008 | Thompson | E21B 19/155 |
| | | | 414/22.58 |
| 7,473,065 B2 | 1/2009 | Wells | |
| 7,744,327 B2 * | 6/2010 | Lops | E21B 19/155 |
| | | | 414/742 |
| 7,802,636 B2 * | 9/2010 | Childers | E21B 19/20 |
| | | | 175/203 |
| 7,837,426 B2 | 11/2010 | Lesko | |
| 7,946,795 B2 * | 5/2011 | Orgeron | E21B 19/155 |
| | | | 414/22.55 |
| 7,967,540 B2 | 6/2011 | Wright et al. | |
| 8,011,426 B1 | 9/2011 | Orgeron | |
| 8,033,779 B2 | 10/2011 | Gerber | |
| 8,113,762 B2 | 2/2012 | Belik | |
| 8,172,497 B2 * | 5/2012 | Orgeron | E21B 19/155 |
| | | | 414/22.55 |
| 8,186,455 B2 * | 5/2012 | Childers | E21B 19/20 |
| | | | 175/203 |
| 8,186,926 B2 | 5/2012 | Littlely | |
| 8,192,128 B2 | 6/2012 | Orgeron | |
| 8,235,104 B1 | 8/2012 | Sigmar et al. | |
| 8,240,968 B2 | 8/2012 | Hopkins et al. | |
| 8,371,790 B2 * | 2/2013 | Sigmar | E21B 19/155 |
| | | | 414/22.55 |
| 8,469,085 B2 | 6/2013 | Orgeron | |
| 8,474,806 B2 | 7/2013 | Orgeron | |
| 8,584,773 B2 * | 11/2013 | Childers | E21B 19/20 |
| | | | 175/203 |
| 8,690,508 B1 * | 4/2014 | Orgeron | E21B 19/155 |
| | | | 414/22.55 |
| 8,695,522 B2 | 4/2014 | Wijning et al. | |
| 8,845,260 B2 * | 9/2014 | Gerber | E21B 19/15 |
| | | | 414/745.7 |
| 8,905,699 B2 * | 12/2014 | Orgeron | E21B 19/155 |
| | | | 414/22.55 |
| 8,949,416 B1 | 2/2015 | Barnes et al. | |
| 9,091,126 B2 | 7/2015 | Thiessen et al. | |
| 8,936,424 B1 | 10/2015 | Barnes et al. | |
| 9,249,635 B2 | 2/2016 | Ferrari | |
| 9,410,385 B2 * | 8/2016 | Childers | E21B 19/20 |
| 9,556,689 B2 | 1/2017 | Orgeron | |
| 9,677,298 B2 | 6/2017 | Konduc et al. | |
| 9,790,752 B2 * | 10/2017 | Gustavsson | E21B 19/20 |
| 9,932,784 B2 | 4/2018 | Wang et al. | |
| 10,106,995 B2 | 10/2018 | Snell et al. | |
| 10,196,867 B2 * | 2/2019 | Mailly | G06F 18/2411 |
| 10,214,976 B2 | 2/2019 | Chang et al. | |
| 10,385,634 B2 | 8/2019 | Pover | |
| 10,465,456 B2 | 11/2019 | Gupta et al. | |
| 10,612,322 B2 * | 4/2020 | Doyon | E21B 19/155 |
| 10,612,323 B2 * | 4/2020 | Childers | E21B 19/20 |
| 10,711,540 B2 | 7/2020 | Holand | |
| 10,808,465 B2 | 10/2020 | Mikalsen et al. | |
| 10,822,891 B2 | 11/2020 | Mikalsen et al. | |
| 10,837,238 B2 | 11/2020 | Gupta et al. | |
| 10,995,564 B2 * | 5/2021 | Miller | E21B 19/155 |
| 11,015,402 B2 | 5/2021 | Mikalsen | |
| 11,041,346 B2 * | 6/2021 | Mikalsen | E21B 19/14 |
| 11,118,415 B2 | 9/2021 | Eriksen | |
| 11,118,416 B2 | 9/2021 | Vu | |
| 11,274,508 B2 * | 3/2022 | McKenzie | E21B 19/14 |
| 11,346,163 B2 | 5/2022 | Mikalsen et al. | |
| 11,365,592 B1 * | 6/2022 | Moon | E21B 19/087 |
| 11,371,299 B2 | 6/2022 | Naesgaard et al. | |
| 11,377,914 B2 * | 7/2022 | Mikalsen | E21B 19/161 |
| 11,408,236 B2 * | 8/2022 | Mikalsen | E21B 7/026 |
| 11,414,936 B2 | 8/2022 | Naesgaard et al. | |
| 11,486,209 B2 * | 11/2022 | Burke | E21B 19/155 |
| 11,643,887 B2 * | 5/2023 | Petrello | E21B 19/16 |
| | | | 166/380 |
| 2001/0025727 A1 | 10/2001 | Byrt et al. | |
| 2003/0159854 A1 | 8/2003 | Simpson et al. | |
| 2003/0170095 A1 * | 9/2003 | Slettedal | E21B 19/155 |
| | | | 414/22.59 |
| 2006/0045655 A1 | 3/2006 | Wells | |
| 2006/0104746 A1 * | 5/2006 | Thompson | E21B 19/155 |
| | | | 414/22.54 |
| 2006/0151215 A1 * | 7/2006 | Skogerbo | E21B 19/155 |
| | | | 175/85 |
| 2006/0285941 A1 | 12/2006 | Fikowski et al. | |
| 2008/0202812 A1 * | 8/2008 | Childers | E21B 19/20 |
| | | | 175/85 |
| 2008/0253866 A1 * | 10/2008 | Lops | E21B 19/155 |
| | | | 414/22.55 |
| 2010/0034620 A1 * | 2/2010 | Orgeron | E21B 19/155 |
| | | | 405/184 |
| 2010/0230166 A1 * | 9/2010 | Sigmar | E21B 19/14 |
| | | | 175/85 |
| 2010/0254784 A1 * | 10/2010 | Orgeron | E21B 19/155 |
| | | | 92/143 |
| 2010/0326672 A1 * | 12/2010 | Childers | E21B 19/155 |
| | | | 166/380 |
| 2011/0030942 A1 * | 2/2011 | Orgeron | F16L 1/19 |
| | | | 166/77.51 |
| 2011/0188973 A1 | 8/2011 | Baumler | |
| 2012/0118639 A1 * | 5/2012 | Gerber | E21B 19/15 |
| | | | 175/52 |
| 2012/0217024 A1 * | 8/2012 | Childers | E21B 19/20 |
| | | | 166/380 |
| 2013/0087387 A1 | 4/2013 | Hacker | |
| 2013/0142593 A1 * | 6/2013 | Orgeron | E21B 19/155 |
| | | | 414/22.55 |
| 2013/0195583 A1 | 8/2013 | Rodgers | |
| 2013/0283589 A1 | 10/2013 | Lavalley et al. | |
| 2013/0336748 A1 | 12/2013 | Hilton | |
| 2014/0110174 A1 * | 4/2014 | Childers | E21B 19/155 |
| | | | 175/57 |
| 2015/0144402 A1 * | 5/2015 | Gustavsson | E21B 19/155 |
| | | | 175/52 |
| 2015/0152697 A1 | 6/2015 | Gustavsson | |
| 2015/0167408 A1 * | 6/2015 | Orgeron | E21B 19/155 |
| | | | 414/22.55 |
| 2016/0017673 A1 | 1/2016 | Roodenburg et al. | |
| 2016/0160587 A1 | 6/2016 | Misson et al. | |
| 2016/0186495 A1 | 6/2016 | Flusche | |
| 2016/0208566 A1 | 7/2016 | Bowley et al. | |
| 2016/0230481 A1 | 8/2016 | Misson et al. | |
| 2016/0305204 A1 * | 10/2016 | Childers | E21B 19/20 |
| 2016/0319611 A1 | 11/2016 | Chang et al. | |
| 2017/0305510 A1 | 10/2017 | Roodenburg et al. | |
| 2017/0314345 A1 | 11/2017 | Flusche et al. | |
| 2017/0328149 A1 | 11/2017 | Soyland et al. | |
| 2017/0362905 A1 * | 12/2017 | Mailly | G06N 20/00 |
| 2019/0119995 A1 | 4/2019 | Gullaksen et al. | |
| 2019/0128077 A1 | 5/2019 | Holand et al. | |
| 2019/0128078 A1 * | 5/2019 | Doyon | E21B 19/155 |
| 2019/0136669 A1 | 5/2019 | Wiedecke et al. | |
| 2019/0284886 A1 | 9/2019 | Soyland et al. | |

(56) References Cited

U.S. PATENT DOCUMENTS

| | | | | |
|---|---|---|---|---|
| 2019/0330933 | A1* | 10/2019 | Mikalsen | B25J 11/00 |
| 2019/0330935 | A1* | 10/2019 | Mikalsen | E21B 19/155 |
| 2019/0330936 | A1* | 10/2019 | Mikalsen | E21B 19/15 |
| 2019/0330937 | A1* | 10/2019 | Mikalsen | E21B 19/15 |
| 2020/0040674 | A1* | 2/2020 | McKenzie | E21B 19/20 |
| 2020/0199949 | A1 | 6/2020 | Magnuson | |
| 2021/0017823 | A1 | 1/2021 | Mikalsen et al. | |
| 2021/0156207 | A1* | 5/2021 | Do | E21B 19/155 |
| 2021/0164303 | A1* | 6/2021 | Valen | E21B 19/14 |
| 2021/0270095 | A1* | 9/2021 | Mikalsen | E21B 19/15 |
| 2021/0301602 | A1* | 9/2021 | McKenzie | E21B 19/20 |
| 2022/0003053 | A1* | 1/2022 | Burke | E21B 19/161 |
| 2022/0003054 | A1* | 1/2022 | Mikalsen | E21B 19/06 |
| 2022/0003055 | A1* | 1/2022 | Petrello | E21B 19/087 |
| 2022/0065052 | A1 | 3/2022 | Naesgaard et al. | |
| 2022/0065053 | A1* | 3/2022 | Naesgaard | E21B 19/155 |
| 2022/0316286 | A1 | 10/2022 | Naesgaard et al. | |
| 2023/0392456 | A1* | 12/2023 | Naesgaard | E21B 19/155 |

FOREIGN PATENT DOCUMENTS

| | | | |
|---|---|---|---|
| EP | 0646694 | A2 | 4/1995 |
| EP | 2521834 | B1 | 12/2013 |
| EP | 2799661 | B1 | 2/2016 |
| GB | 2264736 | A * 9/1993 | ........... E21B 19/155 |
| WO | 2006128300 | A1 | 12/2006 |
| WO | 2012165951 | A2 | 12/2012 |
| WO | 2014047055 | A1 | 3/2014 |
| WO | 2014146759 | A2 | 9/2014 |
| WO | 2022008266 | A1 | 1/2022 |
| WO | 2022008352 | A1 | 1/2022 |
| WO | 2022010619 | A1 | 1/2022 |
| WO | 2022048923 | A1 | 3/2022 |
| WO | 2022048924 | A1 | 3/2022 |

OTHER PUBLICATIONS

International Search Report from PCT Application No. PCT/EP2021/068259, mailed Sep. 30, 2021, 1 pg.
International Search Report from PCT Application No. PCT/EP2021/073131, mailed Nov. 26, 2021, 2 pg.
Partial International Search Report from PCT Application No. PCT/EP2021/073137, mailed Dec. 22, 2021, 1 pg.
International Search Report from PCT Application No. PCT/EP2021/067545, mailed Sep. 30, 2021, 1 pg.
International Search Report from PCT Application No. PCT/EP2021/073137, mailed Feb. 14, 2022, 1 pg.

* cited by examiner

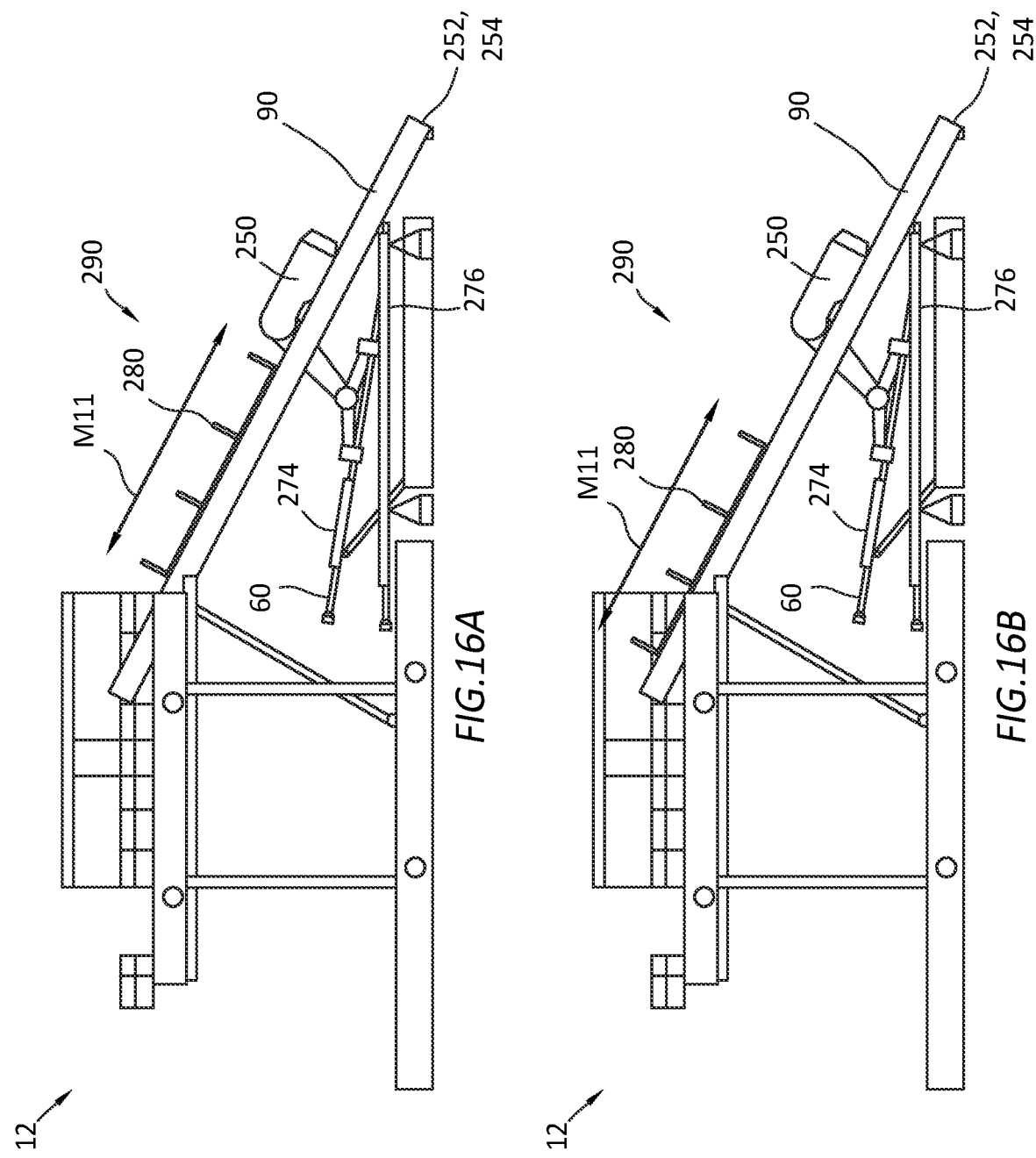

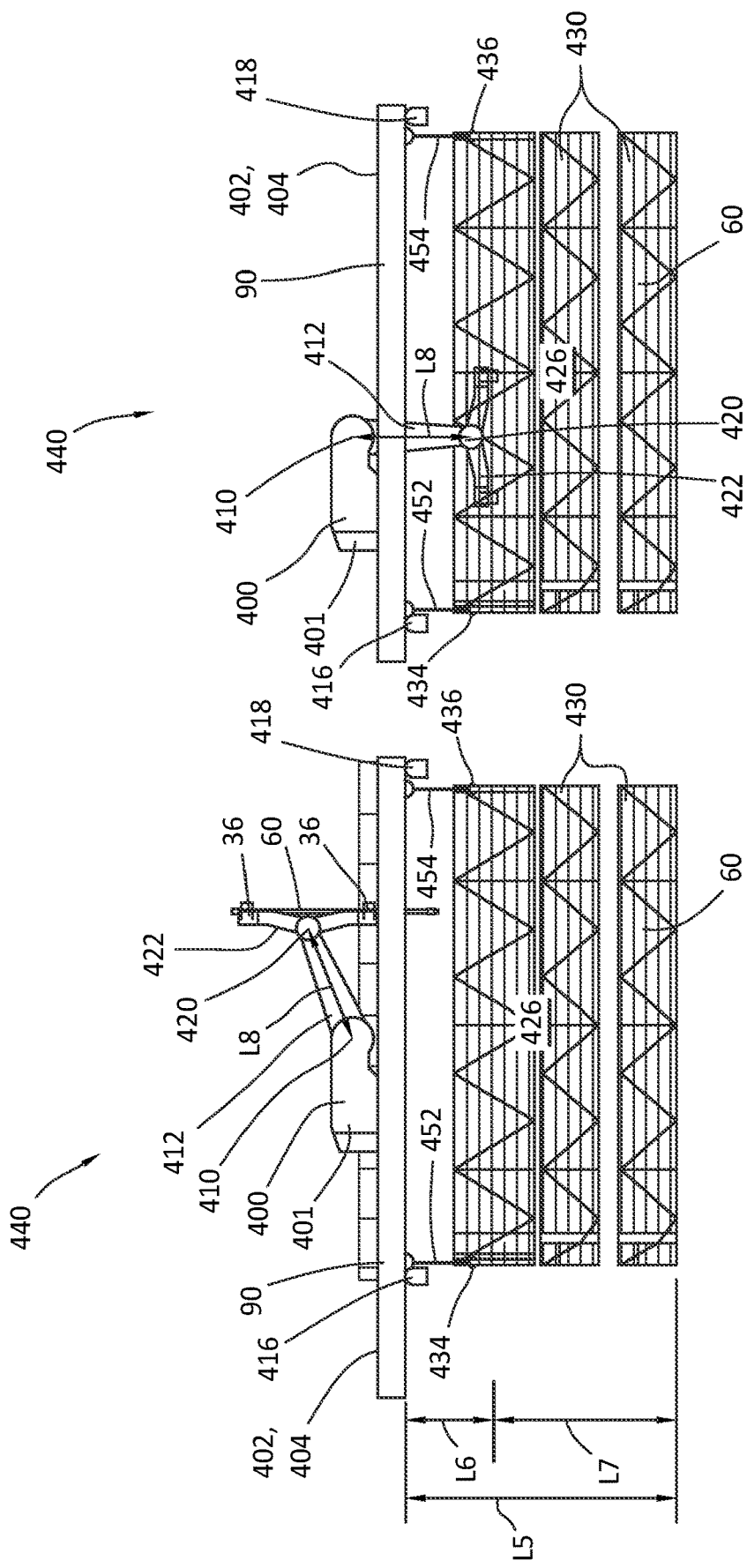

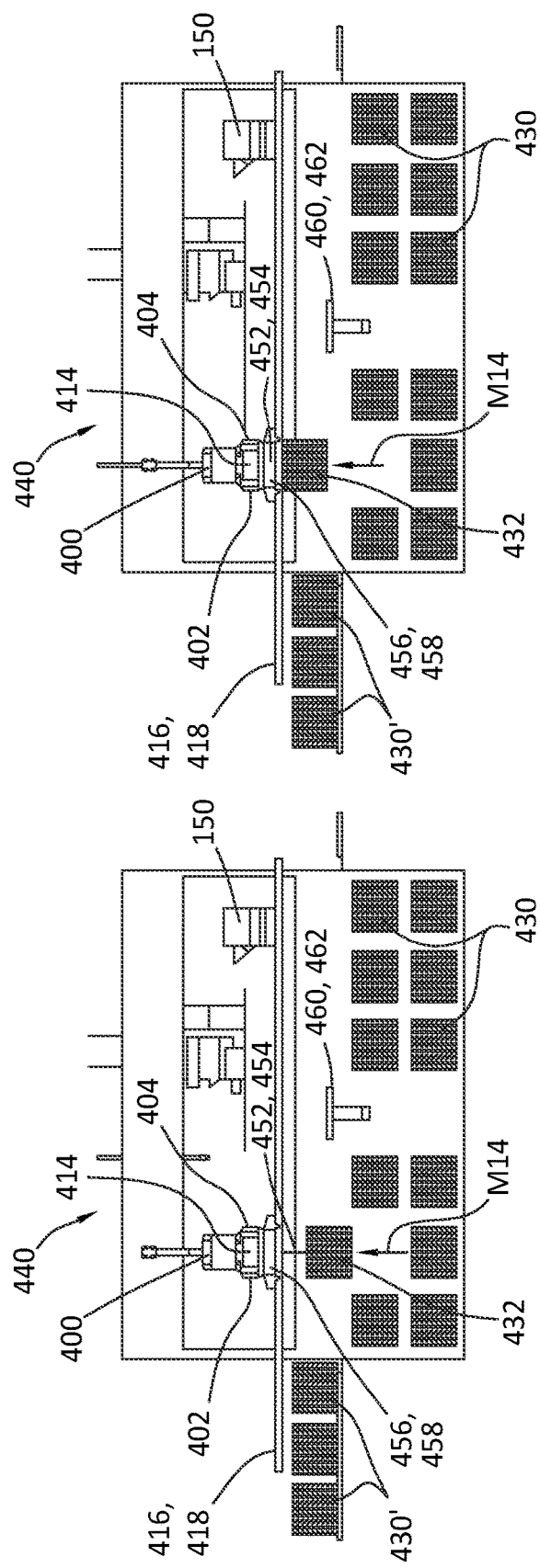
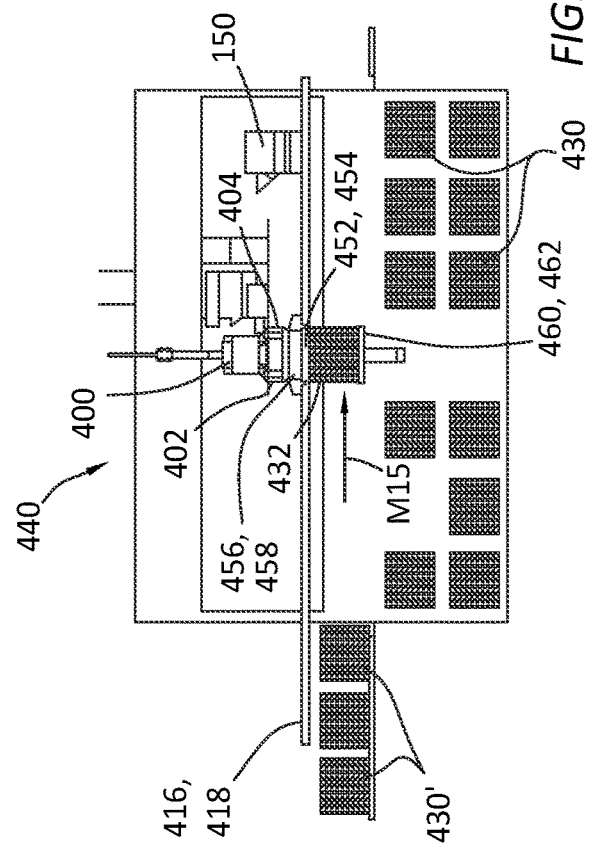
FIG.27A
FIG.27B
FIG.27C

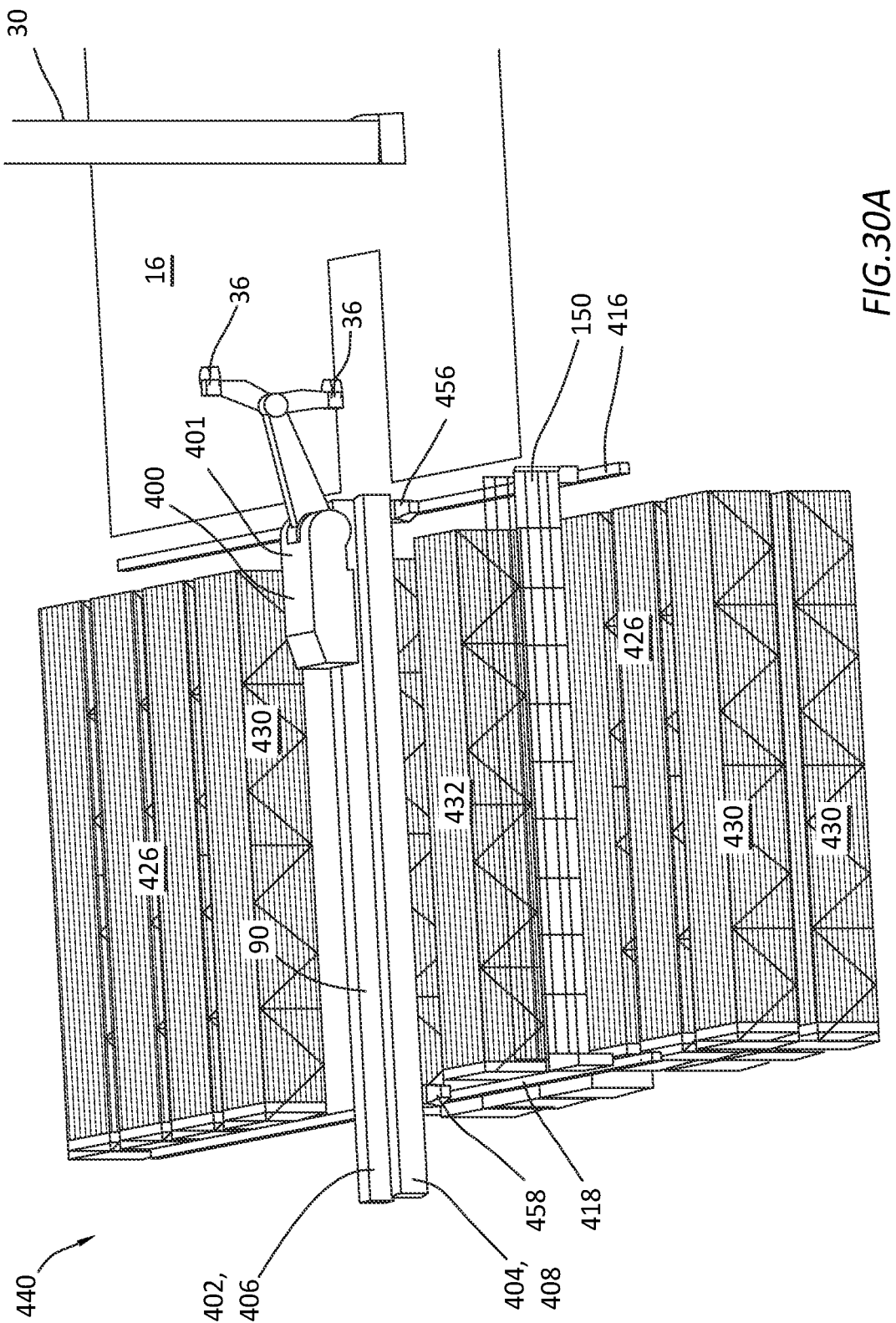

ROBOTIC PIPE HANDLER SYSTEMS

CROSS-REFERENCE TO RELATED APPLICATION(S)

This application is a continuation of and claims priority under 35 U.S.C. § 120 to U.S. patent application Ser. No. 17/360,941, entitled "ROBOTIC PIPE HANDLER SYSTEMS," by Anthony G. PETRELLO et al., filed Jun. 28, 2021, which claims priority under 35 U.S.C. § 119(c) to U.S. Provisional Patent Application No. 63/048,503, entitled "ROBOTIC PIPE HANDLER SYSTEMS," by Anthony G. PETRELLO et al., filed Jul. 6, 2020, all of which are assigned to the current assignee hereof and incorporated herein by reference in their entireties for all purposes.

FIELD OF THE DISCLOSURE

The present invention relates, in general, to the field of drilling and processing of wells. More particularly, present embodiments relate to a system and method for manipulating tubulars or other equipment.

BACKGROUND

In subterranean operations, a segmented tubular string can be used to access hydrocarbon reserves in an earthen formation. The segmented tubular string can be made up of individual tubular segments or stands of tubular segments. As tubular segments or tubular stands are assembled together to form the tubular string, the tubular string can be extended further into the wellbore at the well site, which can be referred to as "tripping in" the tubular string. When the tubular string needs to be at least partially removed from the wellbore, individual tubular segments or tubular stands can be removed from the top end of the tubular string as the tubular string is pulled up from the wellbore. This can be referred to as "tripping out" the tubular string.

Due to the large number of tubular segments needed during the tripping operations, tubular storage areas near or on the rig can be utilized to improve the efficiency of rig operations. Many rigs can have a horizontal storage area positioned on a V-door side of the rig with tubulars stored in a horizontal orientation. The rigs can also include a fingerboard vertical storage normally on the rig floor for holding tubulars in a vertical orientation. As used herein, a "horizontal orientation" or "horizontal position" refers to a horizontal plane that is generally parallel to a horizontal plane of a rig floor, where the horizontal plane can be any plane that is within a range of "0" degrees+/−10 degrees from the horizontal plane of the rig floor. As used herein, a "vertical orientation" or "vertical position" refers to a vertical plane that is generally perpendicular to the horizontal plane of the rig floor, where the vertical plane can be any plane that is within a range of 90 degrees+/−10 degrees from the horizontal plane of the rig floor. As used herein, an "inclined orientation" or "inclined position" refers to a plane that is generally angled relative to the horizontal plane of the rig floor, where the inclined plane can be any plane that is within a range from 10 degrees up to and including 80 degrees rotated from the horizontal plane of the rig floor.

Pipe handler systems are used to move the tubulars between the horizontal storage area, the vertical storage area, and the well center as needed during rig operations. The efficiency of these pipe handler systems can greatly impact the overall efficiency of the rig during subterranean operations. Therefore, improvements in these pipe handler systems are continually needed.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a pipe handling system that can include a bridge disposed in an inclined position, the bridge may include first and second rails with a space therebetween; and an arm coupled to the first and second rails, the arm being configured to manipulate a tubular through the space between the first and second rails. Other embodiments of this aspect include corresponding computer systems, apparatus, and computer programs recorded on one or more computer storage devices, each configured to perform the actions of the methods.

One general aspect includes a pipe handling system that can include a bridge disposed in an inclined position from a horizontal storage area to a rig floor; a tubular lift positioned in the horizontal storage area and configured to rotate a tubular between a horizontal orientation and an inclined orientation; and an arm coupled to the bridge and configured to move along the bridge, where the arm is configured to engage the tubular in the inclined orientation and lift the tubular from the tubular lift or configured to deliver the tubular to the tubular lift in the inclined orientation. Other embodiments of this aspect include corresponding computer systems, apparatus, and computer programs recorded on one or more computer storage devices, each configured to perform the actions of the methods.

One general aspect includes a method that can include operations of gripping a tubular in a horizontal storage area via an arm coupled to a bridge, the bridge may include first and second rails with a space therebetween; lifting the tubular from the horizontal storage area and through the space; and moving the tubular along the bridge via the arm, with the bridge being inclined from the horizontal storage area to a rig floor. Other embodiments of this aspect include corresponding computer systems, apparatus, and computer programs recorded on one or more computer storage devices, each configured to perform the actions of the methods.

One general aspect includes a method that can include operations of gripping a tubular at a well center on a rig floor via an arm coupled to a bridge, the bridge may include first and second rails with a space therebetween; moving the tubular from the well center and through the space; and moving the tubular along the bridge via the arm, with the bridge being inclined from a horizontal storage area to the rig floor. Other embodiments of this aspect include corresponding computer systems, apparatus, and computer programs recorded on one or more computer storage devices, each configured to perform the actions of the methods.

One general aspect includes a catwalk system that can include a bridge disposed within a horizontal storage area and coupled to a guide rail; an equipment basket contained within the horizontal storage area, with the equipment basket having an internal storage area; a crane coupled to the bridge, the crane being configured to transport the equipment basket between a first location and an elevated location in the horizontal storage area; and a pipe handler coupled to the bridge and configured to move along the bridge. Other embodiments of this aspect include corresponding computer systems, apparatus, and computer programs recorded on one or more computer storage devices, each configured to perform the actions of the methods.

One general aspect includes a catwalk system that can include a first bridge and a second bridge disposed within a horizontal storage area and coupled to a guide rail, with the first bridge and the second bridge configured to move along the guide rail in a first direction; a pipe handler coupled to the first bridge and configured to move along the first bridge in a second direction; and a shuttle coupled to the second bridge and configured to move along the second bridge in the second direction, where the pipe handler is configured to selectively couple to the shuttle and drive the shuttle in the second direction. Other embodiments of this aspect include corresponding computer systems, apparatus, and computer programs recorded on one or more computer storage devices, each configured to perform the actions of the methods.

One general aspect includes a method of operating a tubular handling system that can include operations of lifting an equipment basket, via a crane coupled to a bridge, from a first storage location in a horizontal storage area; transporting the equipment basket to an elevated storage location in the horizontal storage area; gripping, via an arm coupled to the bridge, equipment in an internal storage area of the equipment basket; lifting, via the arm, the equipment from the equipment basket; and transporting the equipment, via the arm, to a well center on a rig floor. Other embodiments of this aspect include corresponding computer systems, apparatus, and computer programs recorded on one or more computer storage devices, each configured to perform the actions of the methods.

One general aspect includes a catwalk system that can include a guide rail; a bridge disposed over a horizontal storage area, coupled to a guide rail, and configured to move along the guide rail in a first direction, with one end of the bridge configured to couple to a rig floor and the bridge configured to move in a second direction with the rig floor when the rig floor moves relative to the horizontal storage area; and a pipe handler coupled to the bridge and configured to move along the bridge in the second direction. Other embodiments of this aspect include corresponding computer systems, apparatus, and computer programs recorded on one or more computer storage devices, each configured to perform the actions of the methods.

One general aspect includes a catwalk system that can include a bridge disposed in a horizontal orientation above a horizontal storage area; a tubular lift system configured to transport a tubular in a horizontal orientation between the horizontal storage area and an intermediate storage location; and a pipe handler moveably coupled to the bridge, the pipe handler configured to transport the tubular between the intermediate storage location and a rig floor. Other embodiments of this aspect include corresponding computer systems, apparatus, and computer programs recorded on one or more computer storage devices, each configured to perform the actions of the methods.

One general aspect includes a tubular handling system that can include a bridge disposed in a horizontal position proximate a drill floor, the bridge may include first and second bridge rails with a space between; an arm coupled to the first and second bridge rails, the arm configured to manipulate a tubular through the space between the first and second bridge rails and to move back and forth along the bridge; and a tubular lift system that raises or lowers the tubular in a horizontal orientation between a horizontal storage and an intermediate storage location, the arm being configured to collect the tubular from the intermediate storage location and present the tubular to a well center on the drill floor or collect the tubular from the well center and deposit the tubular in the intermediate storage location. Other embodiments of this aspect include corresponding computer systems, apparatus, and computer programs recorded on one or more computer storage devices, each configured to perform the actions of the methods.

One general aspect includes a method that can include operations of lifting a tubular, via a vertically oriented tubular lift system, from a horizontal storage area to an intermediate storage location while maintaining the tubular in a horizontal orientation; engaging the tubular at the intermediate storage location with a pipe handler; transporting the tubular, via the pipe handler, along a bridge to a rig floor; rotating the tubular, via the pipe handler, from the horizontal orientation to a vertical orientation; and presenting, via the pipe handler, the tubular in the vertical orientation to a well center. Other embodiments of this aspect include corresponding computer systems, apparatus, and computer programs recorded on one or more computer storage devices, each configured to perform the actions of the methods.

One general aspect includes a method that can include operations of retrieving, via a pipe handler, a tubular in a vertical orientation from a rig floor; transporting the tubular, via the pipe handler, from the rig floor along a bridge; rotating the tubular, via the pipe handler, from the vertical orientation to a horizontal orientation; disengaging the tubular, via the pipe handler, into an intermediate storage location; and lowering the tubular, via a vertically oriented tubular lift system, from the intermediate storage location to a horizontal storage area while maintaining the tubular in the horizontal orientation. Other embodiments of this aspect include corresponding computer systems, apparatus, and computer programs recorded on one or more computer storage devices, each configured to perform the actions of the methods.

One general aspect includes a method that can include operations of, in a horizontal orientation, lifting, via a tubular conveyance, a tubular from a horizontal storage to an intermediate storage location; gripping, via an arm, the tubular in the intermediate storage location, the arm being coupled to a bridge that is disposed in a horizontal orientation, the bridge may include first and second bridge rails with a space between; lifting, via the arm, the tubular from the intermediate storage location and manipulating the tubular through the space between the first and second bridge rails; and moving, via the arm, the tubular from the intermediate storage location to a well center on a rig floor. Other embodiments of this aspect include corresponding computer systems, apparatus, and computer programs recorded on one or more computer storage devices, each configured to perform the actions of the methods.

BRIEF DESCRIPTION OF THE DRAWINGS

These and other features, aspects, and advantages of present embodiments will become better understood when the following detailed description is read with reference to the accompanying drawings in which like characters represent like parts throughout the drawings, wherein:

FIGS. 16A-16B are representative side views of a pipe handler operating at an incline from a horizontal storage area to a rig floor, in accordance with certain embodiments;

FIGS. 26A-26B are representative side views of a pipe handler operating along a horizontal bridge over a deep horizontal storage area;

FIGS. 27A-27C are representative end views of a pipe handler operating along a horizontal bridge and the bridge operating along guide rails over a deep horizontal storage area, with the bridge including a crane for lifting tubular baskets, in accordance with certain embodiments;

FIGS. 30A-30B are representative perspective views of a pipe handler operating along a horizontal bridge and the bridge operating along guide rails over a deep horizontal storage area, where a portion of the bridge can extend to a well center in a rig floor, in accordance with certain embodiments.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about," "approximately," or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

Figure 1:
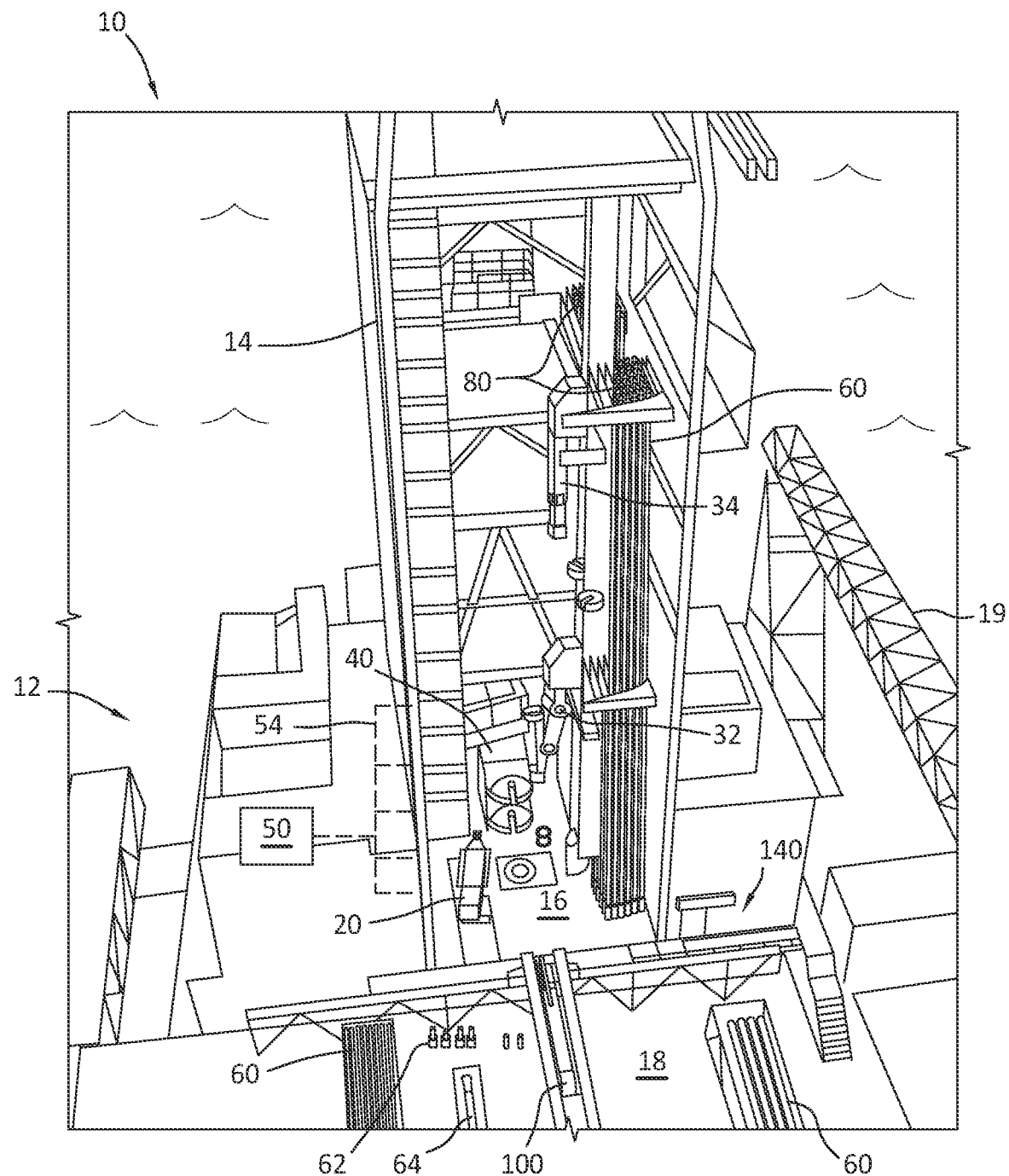
FIG. 1 is a representative view of a rig, in accordance with certain embodiments.

FIG. 1 is a representative view of a rig 10 that can be used to perform subterranean operations. The rig 10 is shown as an offshore rig, but it should be understood that the principles of this disclosure are equally applicable to onshore rigs as well. The example rig 10 can include a platform 12 with a derrick 14 extending above the platform 12 from the rig floor 16. The platform 12 and derrick 14 provide the general super structure of the rig 10 from which the rig equipment is supported. The rig 10 can include a horizontal storage area 18, pipe handlers 100, 32, 34, a drill floor robot 20, an iron roughneck 40, a crane 19, and fingerboards 80. The equipment on the rig 10, can be communicatively coupled to a rig controller 50 via a network 54, with the network 54 being wired or wirelessly connected to the equipment and other rig resources.

It should be understood that the rig controller 50 can include one or more processors, non-transitory memory storage that can store data and executable instructions, where the one or more processors are configured to execute the executable instructions, a graphical user interface (GUI), one or more input devices, a display, and a communication link to a remote location. The rig controller 50 can also include processors disposed in the robots for local control of the robots or distributed about the rig 10. Each processor can include non-transitory memory storage that can store data and executable instructions.

Some of the equipment that can be used during subterranean operations is shown in the horizontal storage area 18 and the fingerboards 80, such as the tubulars 60, the tools 62, and the bottom hole assembly (BHA) 64, etc. The tubulars 60, BHA 64, tools 62, or other rig equipment known in the art can be stored in the horizontal storage area in vertical, inclined, or horizontal orientations. The tubulars 60, BHA 64, tools 62, or other rig equipment known in the art can be stored in the horizontal storage area 18 in one or more equipment baskets 130 that can be used to transport rig equipment in to, out of, and within the horizontal storage area 18. Shorter tubulars 60 can be stored in a vertical orientation in an equipment basket 130, such as on a magazine of pins extending vertically from a base structure carried in the equipment basket 130, similar to the tools 62 shown in FIGS. 1-3. As used herein, "equipment basket" refers to any support structure that can be transported (e.g., via a conveyance such as a crane) to, from, or within the horizontal storage area 18, the equipment basket having an interior storage area in which rig equipment (e.g., tubulars 60, BHA 64, tools 62 or other rig equipment known in the art) can be stored. The tubulars 60 can include drilling tubular segments, casing tubular segments, and tubular stands that are made up of multiple tubular segments, as well as short tubulars. The tools 62 can include centralizers, subs, slips, subs with sensors, adapters, etc. The BHA 64 can include drill collars, instrumentation, and a drill bit.

Figure 2:
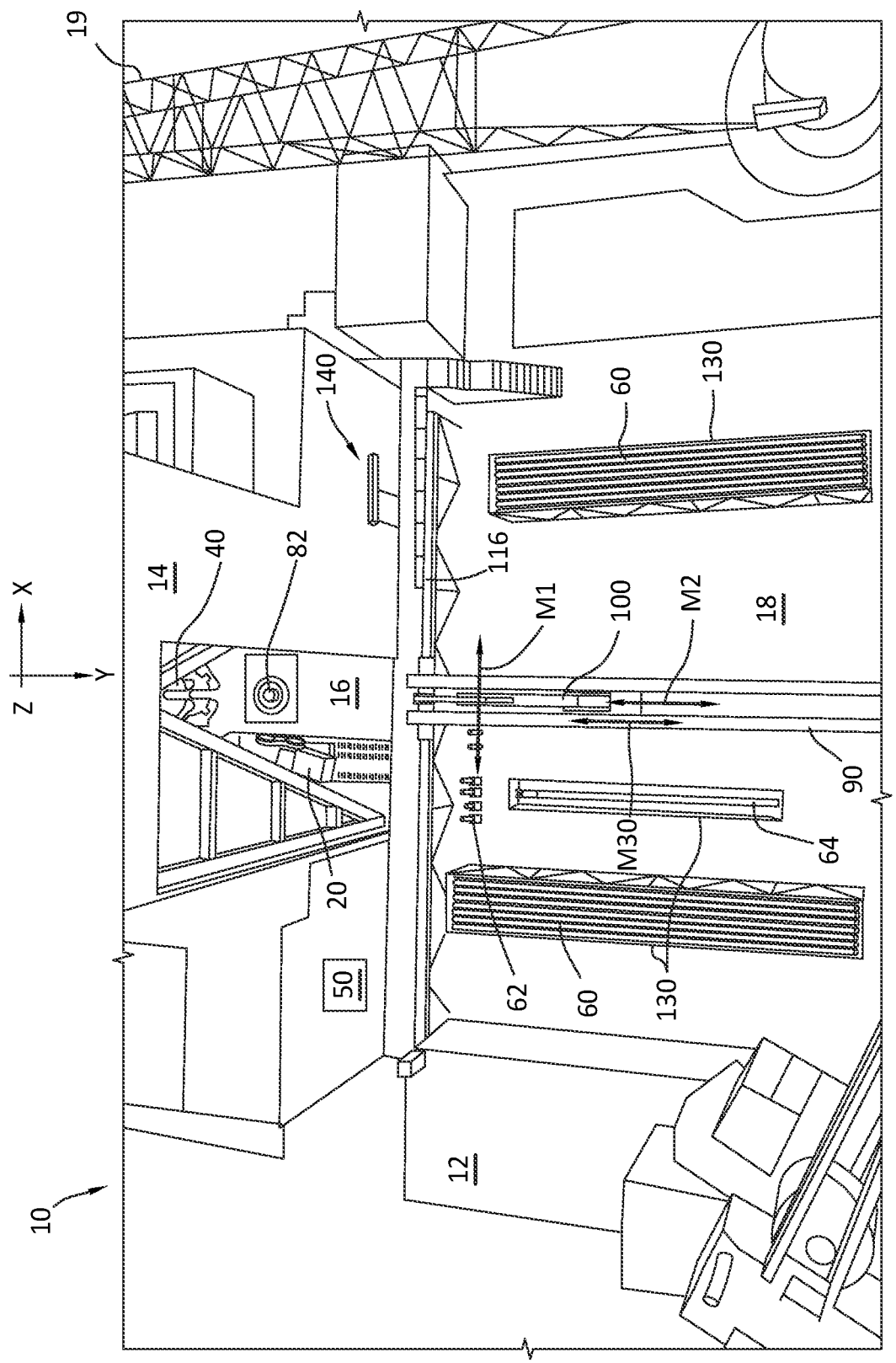
FIG. 2 is a representative perspective view of a pipe handler that operates over a horizontal storage area on a rig, in accordance with certain embodiments.

FIG. 2 is a representative perspective view of a catwalk system 140 that can include a pipe handler 100 and a bridge 90, where the pipe handler 100 operates over a horizontal storage area 18 on a rig 10 used to perform subterranean operations (e.g., drilling, treating, completing, producing, killing, etc.). The bridge 90 can move along guide rail 116 and guide rail 118 (not shown) in an X-direction (arrows M1). The pipe handler 100 can move along the bridge 90 relative to the guide rails 116, 118 in a Y-direction (arrows M2). The bridge 90 can also move relative to the guide rails 116, 118 in a Y-direction (arrows M30), for example, to extent toward or retract from the well center 82. This allows the pipe handler 100 access to the full horizontal storage area 18 and to transport equipment between the horizontal storage area 18 and any other desired location.

Figure 3:
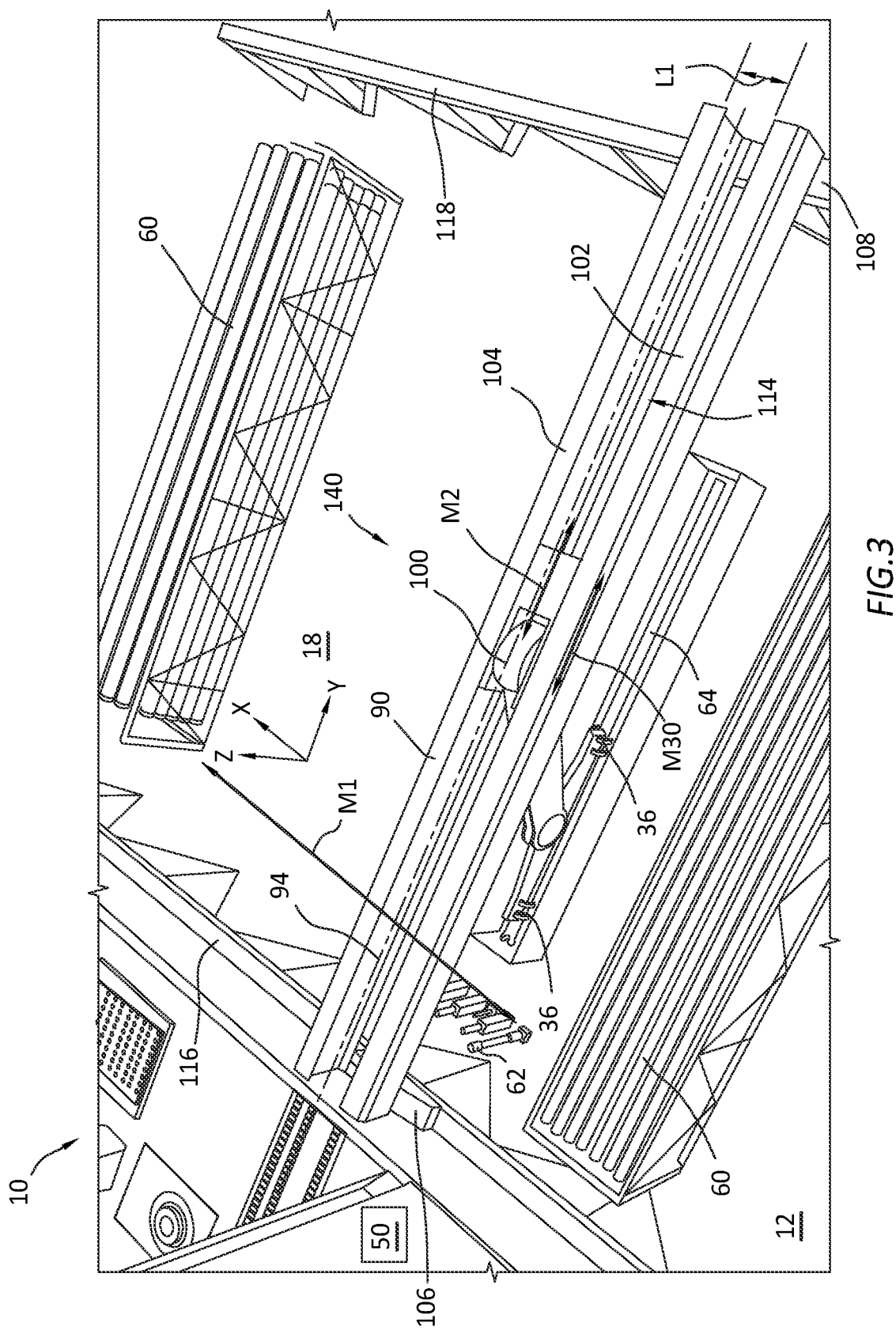
FIG. 3 is another representative perspective view of a pipe handler that engages a piece of equipment (e.g., a BHA) contained in a horizontal storage area on a rig, in accordance with certain embodiments.

FIG. 3 is another representative perspective view of the catwalk system 140 that can include the pipe handler 100 and the bridge 90, where the pipe handler 100 can engage a piece of equipment (e.g., a BHA 64) contained in a horizontal storage area 18 on a rig 10 used to perform subterranean operations. The pipe handler 100 can engage a particular piece of equipment (e.g., a BHA 64 in this example) in the horizontal storage area 18 with one or more grippers 36 and transport the piece of equipment to a delivery location, such as the rig floor, pipe handlers 32, 34, a well center 82, storage, etc. The bridge 90 can include bridge rails 102, 104 that span over the horizontal storage area 18 from guide rail 116 to guide rail 118. The bridge rails 102, 104 span between bridge ends 106, 108, with the bridge ends 106, 108 being moveably coupled to the guide rails 116, 118, respectively. Therefore, the bridge 90 is configured to move in the X-direction (arrows M1) along the guide rails 116, 118 via a drive mechanism (not shown) in each of the bridge ends 106, 108 which interacts with the guide rails 116, 118 to move the bridge in the X-direction.

The pipe handler 100 is moveably coupled between the bridge rails 102, 104. A drive mechanism (not shown) can be used to move the pipe handler 100 in the Y-direction along the bridge 90 and between the bridge rails 102, 104. The bridge rails 102, 104 can be separated by a space 114 of length L1. The pipe handler 100 can engage a piece of equipment (e.g., a tubular 60, BHA 64, etc.) in the horizontal storage area 18, grip the equipment via one or more grippers 36, lift the equipment up through the space 114 between the bridge rails 102, 104, and present the equipment to the rig floor 16. If the bridge rails 102, 104 are lengthened to extend past the ends 106, 108, then the bridge rails 102, 104 and be moved in a Y-direction (arrows M30) relative to the ends 106, 108 and guide rails 116, 118. The bridge rails 102, 104 can also have bridge rail extensions (not shown and described in more detail below) that are disposed between the bridge rails 102, 104, and the pipe handler 100, such that the pipe handler 100 can move along the bridge rail extensions, while the bridge rails extensions can extend out of or retract into the bridge rails 102, 104 (please refer to FIGS. 28-33 for a more detailed description of bridge rail extensions). This allows the bridge to be extended to well center 82 without requiring significant clearance past the guide rail 118 (for example, if the rig were enclosed and the bridge rails 102, 104 could not extend too far past the guide rail 118).

Figure 4:
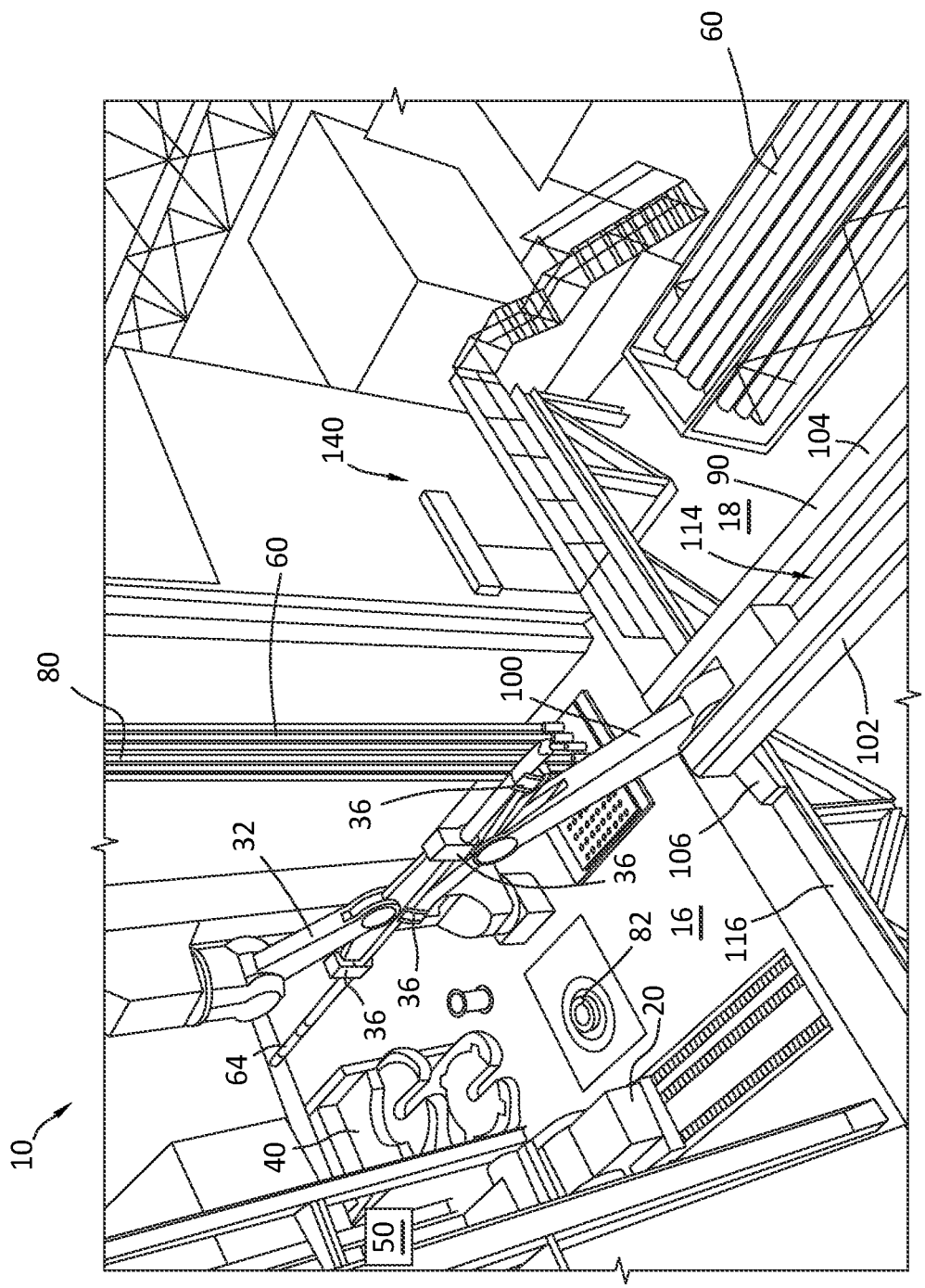
FIG. 4 is a representative perspective view of a pipe handler, that operates over a horizontal storage area, transferring equipment to a pipe handler on a rig floor of a rig, in accordance with certain embodiments.

FIG. 4 is a representative perspective view of the pipe handler 100 transferring a piece of equipment (e.g., a BHA 64, or tubular 60) to a pipe handler 32 on a rig floor 16. In a particular example of transporting tubulars (e.g. BHA 64, tubulars 60, etc.), the pipe handler 100 can 1) grip the piece of equipment with one or more grippers 36, 2) lift the piece of equipment from a first horizontal orientation in the horizontal storage area 18, 3) lift the piece of equipment through the space 114 between the bridge rails 102, 104, 4) rotate the piece of equipment (e.g. BHA 64, tubular 60, etc.) through a vertical position to a second horizontal orientation above the rig floor 16 and hand-off the piece of equipment to a pipe handler 32 (or pipe handler 34) on the rig floor 16, or 5) rotate the piece of equipment (e.g. BHA 64, tubular 60, etc.) through a vertical position to a second horizontal orientation above the rig floor 16 and lay the piece of equipment down on the rig floor 16 (such as in a crib or other holder, not shown) to allow the pipe handler 32 (or pipe handler 34) to then pick up the piece of equipment from the rig floor 16, or 6) rotate the piece of equipment (e.g. BHA 64, tubular 60, etc.) to a vertical position and hand off the piece of equipment to a pipe handler 32, 34, top drive, or elevator in a substantially vertical orientation, or 7) rotate the piece of equipment (e.g. BHA 64, tubular 60, etc.) to an inclined position and hand off the piece of equipment to a pipe handler 32, 34, top drive, or elevator in an inclined orientation, or 8) rotate the piece of equipment (e.g. BHA 64, tubular 60, tools, etc.) to a vertical position and set it down on the rig floor 16 in a substantially vertical orientation (e.g. on storage pins, in a setback storage area, etc.), or 9) grip the piece of equipment with one or more grippers 36 in a vertical, inclined, or horizontal orientation, lift the piece of equipment from the horizontal storage area 18 and through the space 114 between the bridge rails 102, 104, and deliver the piece of equipment to the rig floor 16 in a vertical, inclined, or horizontal orientation. These operations can also be reversed when transporting equipment from these delivery locations (e.g., pipe handlers 32, 34, fingerboards (or setback storage area) 80, vertical storage pins, drill floor robot 20, rig floor 16, etc.) and to the horizontal storage area 18.

In transporting tools from a tool storage area in the horizontal storage area 18, the pipe handler 100 can 1) grip the tool with one or more grippers 36 in a vertical, inclined, or horizontal orientation, 2) lift the tool from the storage area and up through the space 114 between the bridge rails 102, 104, 3) rotate the tool (e.g., BHA 64, tubular 60, etc.) to an appropriate orientation (i.e., vertical, inclined, or horizontal orientation) above the rig floor 16 and hand-off the tool to another pipe handler (e.g., drill floor robot 20, pipe handlers 32, 34, vertical or inclined storage bins, etc.), or place the tool on the rig floor 16 to allow the other pipe handler, top drive, or elevator to then pick up the tool from the rig floor 16.

It may be necessary for the delivery location to be the rig floor 16 when the equipment being manipulated by the pipe handler 100 has limited gripping zones and the pipe handler 100 must release the equipment before another pipe handler (e.g., top drive, pipe handlers 32, 34, drill floor robot 20, elevator, etc.) can engage the equipment to further manipulate the piece of equipment. Therefore, it is not a requirement that the pipe handler 100 hand off the equipment directly to another pipe handler. In this case, the pipe handler 100 can 1) grip the piece of equipment with one or more grippers 36, 2) lift the piece of equipment from a first horizontal, inclined, or vertical orientation in the horizontal storage area 18, 3) lift the piece of equipment through the space 114 between the bridge rails 102, 104, 4) rotate the piece of equipment (e.g., BHA 64, tubular 60, etc.) through non-horizontal orientations to a second horizontal, inclined, or vertical orientation above the rig floor 16 and release the piece of equipment to rest on the rig floor 16 or a structure coupled to the rig floor 16 (such as a horizontal or inclined crib, vertical storage pins, etc.). Another pipe handler (e.g., top drive, elevator, pipe handlers 32, 34, drill floor robot 20, etc.) can then engage and lift the piece of equipment from the rig floor 16 to further manipulate the piece of equipment. The delivery location can also be a dedicated fixture where the pipe handler 100 delivers the piece of equipment (e.g., BHA 64, tubular 60, tools, subs, etc.) to the dedicated fixture and hands off the piece of equipment to the dedicated fixture in a substantially horizontal orientation, an inclined orientation, or a substantially vertical orientation.

Figure 5:
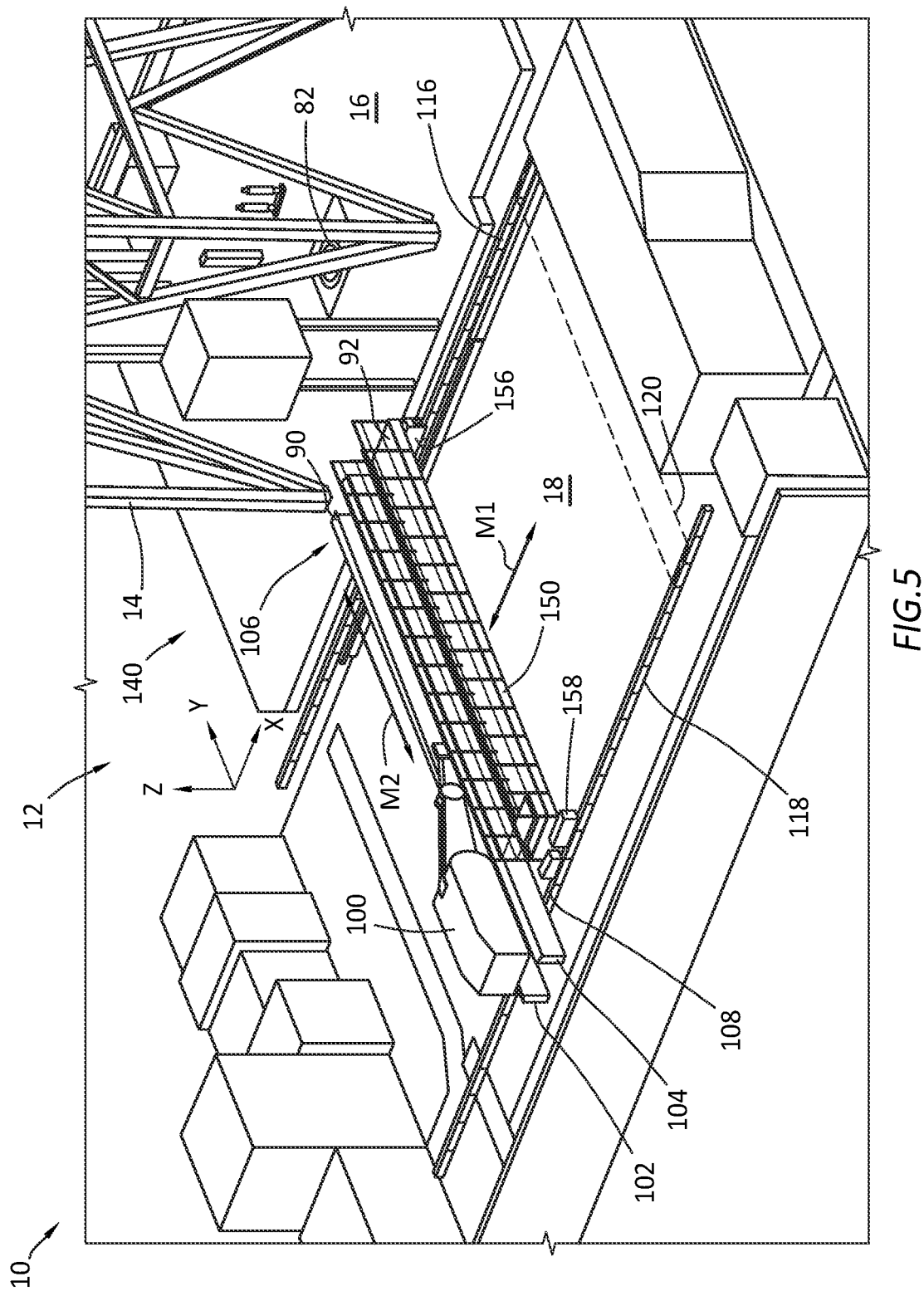
FIGS. 5-7 are representative perspective views of a pipe handler and associated shuttle, that operates over a horizontal storage area, transferring equipment to a rig floor of a rig, in accordance with certain embodiments.
Figure 6:
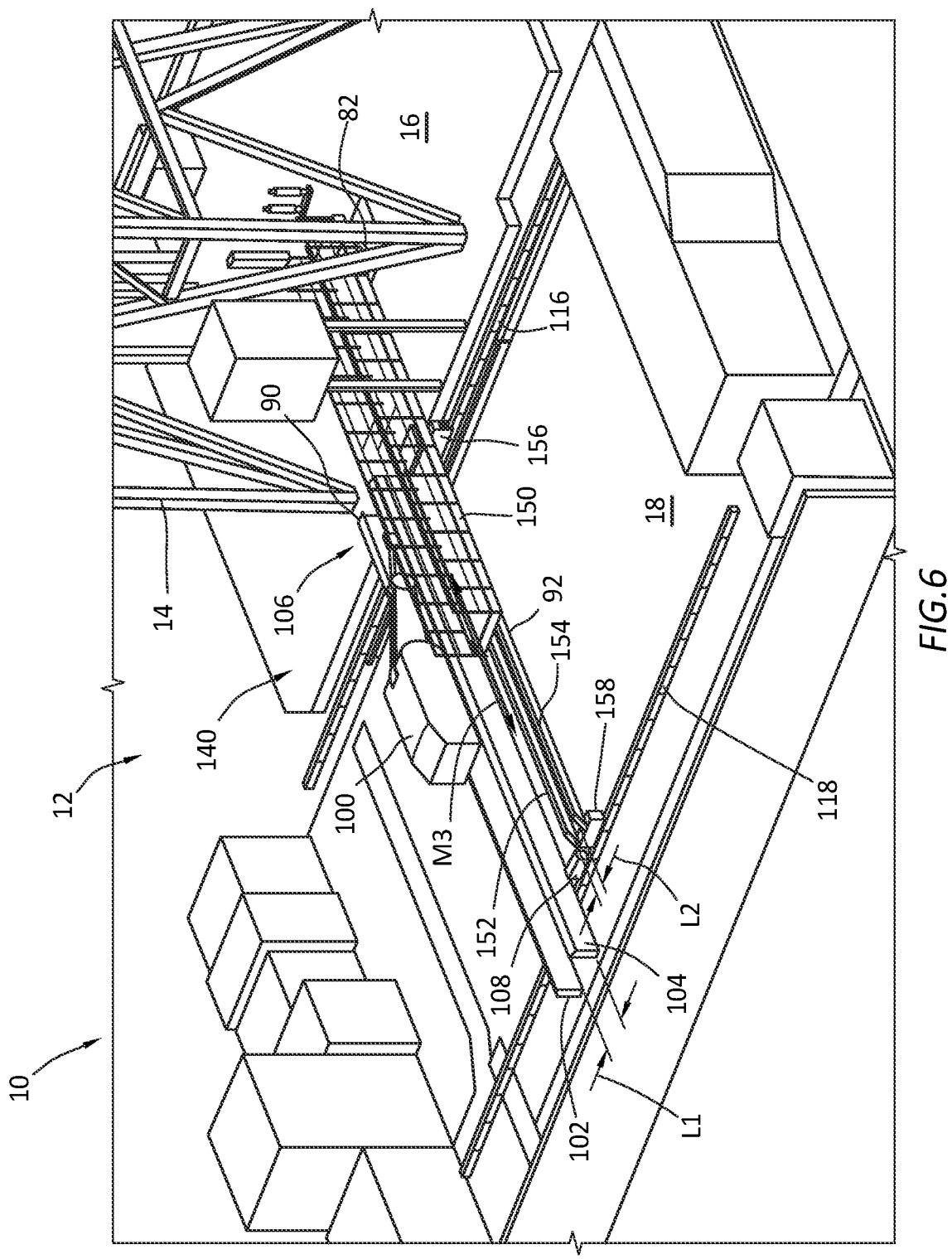
Figure 7:
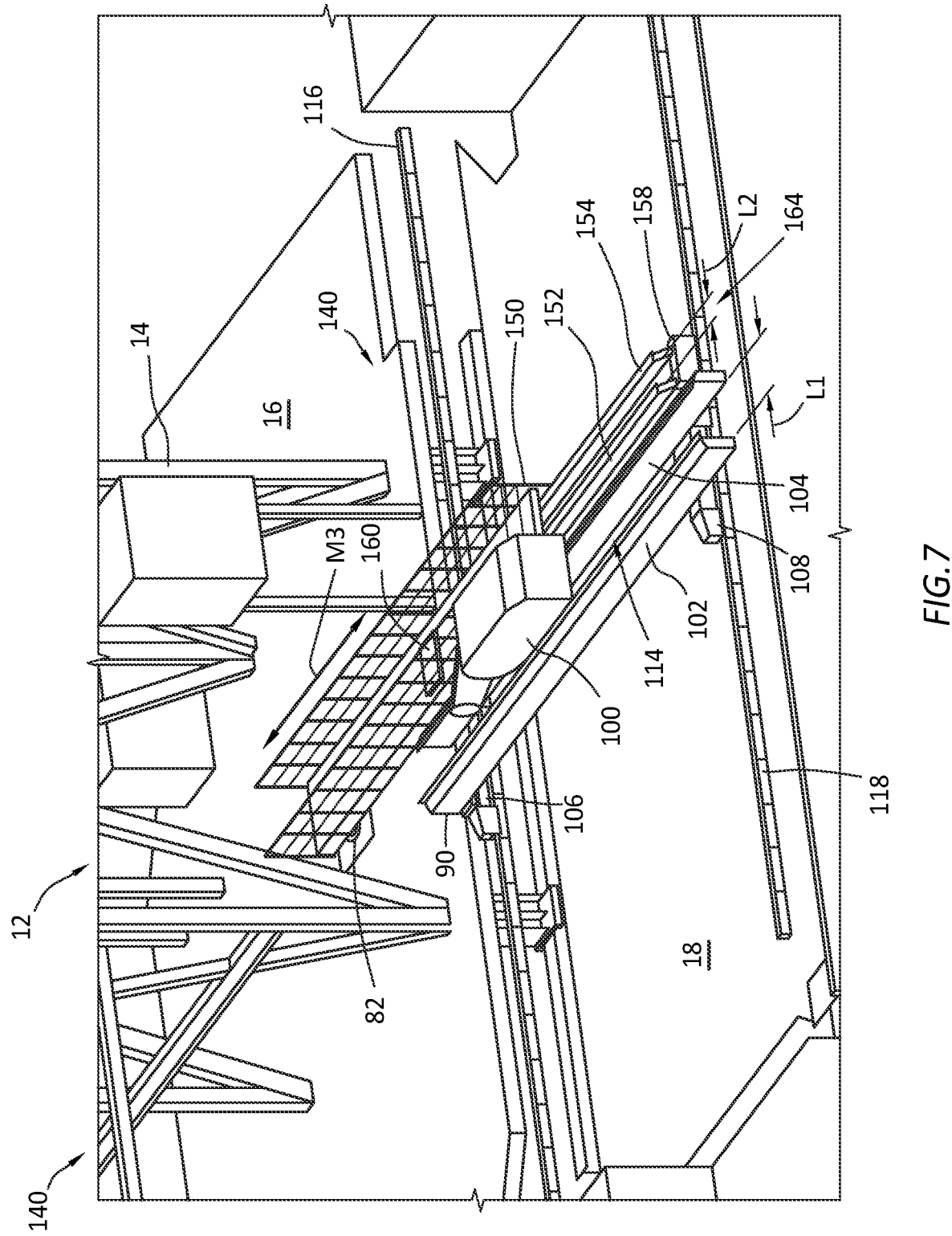

FIGS. 5-7 are representative perspective views of a catwalk system 140 with a pipe handler 100 and an associated shuttle 150, that operates over a horizontal storage area 18, and can be used to transfer equipment to a rig floor 16. When a piece of equipment is too large or heavy for the pipe handler 100 to grip and manipulate (e.g., a large riser segment), or when the piece of equipment is bulky, oddly shaped, or otherwise not suited for manipulation by the pipe handler 100 (such as magazines with subs, machine parts for the drill floor, etc.), then a shuttle 150 can be deployed to assist in transporting the piece of equipment to/from the well center 82 or other location on the rig floor 16. The shuttle 150 can include a bridge 92 that spans between guide rails 116, 118, similar to the bridge 90 coupled to the pipe handler 100. The bridge 92 can include bridge rails 152, 154 with a space 164 between them of length L2. The bridge rails 152, 154 can span between bridge ends 156, 158, which are moveably coupled to the guide rails 116, 118, respectively. The bridge ends 156, 158 allow the bridge 92 to be moved in the X-direction (arrows M1) along the guide rails 116, 118. The shuttle 150 can be slideably coupled to the bridge rails 152, 154 to allow for movement of the shuttle 150 along the bridge 92 in the Y-direction (arrows M3). The bridge rails 152, 154 of the bridge 92 can also be extended past the guide rails 116, 118 to allow for extension of the bridge 92 to accommodate long distances to the rig floor (e.g., in cases where the rig floor moves in the X-Y plane to access wellbores in a wellbore array). In this case, the bridge rails 152, 154 can be moveable in the Y-direction relative to the ends 156, 158, and the guide rails 116, 118. The bridge 92 can also include bridge rail extensions (not shown) that allow the bridge rails 152, 154 to remain stationary relative to the ends 156, 158 and the bridge rail extensions can extend and retract relative to the end 156 to allow for a longer reach of the shuttle 150 toward the rig floor 16.

Normally, the shuttle 150 can be parked (or stowed) at a location 120 that is out of the way of normal operation of the pipe handler 100 over the horizontal storage area 18. However, when the shuttle 150 is needed to transport the oversized or overweight piece of equipment to the well center 82, a crane 19 (see FIG. 1) can transport the piece of equipment from a storage location (e.g., a delivery vessel) and lay the equipment on the shuttle 150. The shuttle 150 can receive the piece of equipment while it is stowed at location 120, or it can receive the piece of equipment at any other location along the guide rails 116, 118.

The pipe handler 100 and the bridge 90 can be maneuvered along the guide rails 116, 118 into engagement with the shuttle 150 and, after engagement, transport the shuttle along the guide rails 116, 118 as needed to transport the piece of equipment. The pipe handler 100 can engage an arm of the shuttle 150 for moving the shuttle 150 along the bridge 92 in the Y-direction (arrows M3). The bridge 90 can engage the bridge 92 to unlock a locking mechanism and allow the bridge 92 to be moved from the stowed location 120. Therefore, with the bridge 92 unlocked from the guide rail 116 or 118 and latched to the bridge 90, and the shuttle 150 latched to the pipe handler 100, the pipe handler 100 and bridge 90 are free to move the shuttle 150 in either the X-direction (arrows M1) or the Y-direction (arrows M3), or both.

To move a large piece of equipment using the shuttle 150, a crane 19 can lift and place the large piece of equipment on the shuttle 150 (e.g., when the shuttle is at the stowed location 120). The bridge 90 and pipe handler 100 can be moved over to engage the shuttle 150 and unlock the bridge 92. With the bridge 92 latched to the bridge 90 and the shuttle latched to the pipe handler 100, the large piece of equipment can be moved over to horizontal storage area 18 in the X and Y directions to present an end of the large piece of equipment proximate the well center 82. If the large piece of equipment is a sub-sea riser, an elevator or top drive can lift one end of the large piece of equipment from the shuttle 150 and raise the large piece of equipment vertically until is it removed from the shuttle 150.

A moveable carriage 160 can be used to allow the other end of the large piece of equipment (e.g., subsea riser) to slide along the shuttle 150 as the large piece of equipment is raised vertically by another pipe handler (e.g., an elevator or top drive). When the large piece of equipment is removed from the shuttle 150, the shuttle 150 can again be moved to a location over the horizontal storage area 18 to receive another large piece of equipment or the shuttle 150 can again be moved to the stowed location 120 and disengaged from the bridge 90 and pipe handler 100.

Figure 8:
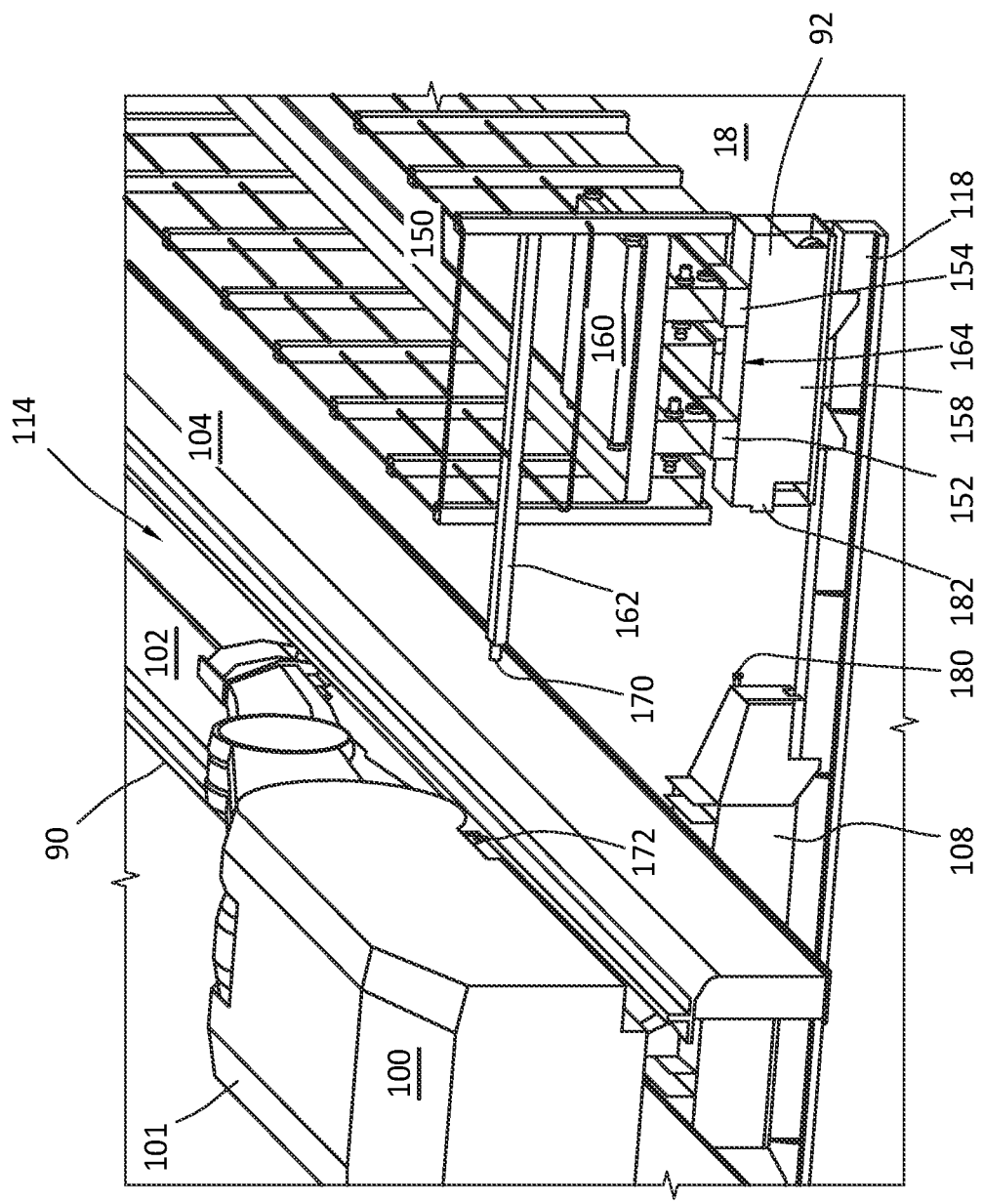
FIG. 8 is a representative perspective detailed view of a pipe handler and associated shuttle, that operates over a horizontal storage area, in accordance with certain embodiments.

FIG. 8 shows the bridge 90 and pipe handler 100 prior to them being engaged with the bridge 92 and the shuttle 150. The body 101 of the pipe handler 100 is moveably coupled to the bridge 90 and rationally coupled to the pipe handler arms. The bridge 92 is locked in position at the stowed location 120 by a locking mechanism described in more detail below. The pipe handler 100 has been moved into position on the bridge 90 so as to align the latch 172 of the pipe handler 100 with the extension 162 and retainer 170 of the shuttle 150. The end 108 of the bridge 90 can include a retainer 180 that extends toward a latch 182 in the end 158 of the bridge 92. As the bridge 90 moves toward the bridge 92, the latch 172 can receive and retain the retainer 170, thereby locking the shuttle 150 into following the pipe handler 100 in the X-direction as the pipe handler 100 moves along the bridge 90.

As the bridge 90 moves toward the bridge 92, the latch 182 can receive and retain the retainer 180, thereby locking the shuttle bridge 92 to the bridge 90, such that the bridge 92 follows the bridge 90 as the bridge 90 is moved in the Y-direction. Engagement of the retainer 180 with the latch 182 can actuate the locking mechanism and unlock the end 158 from the guide rail 118 and allow freedom of travel of the end 158 along the guide rail 118. It should be understood that a similar latch and retainer interface can be included between the end 106 of the bridge 90 and the end 156 of the bridge 92. Therefore, engaging a retainer of the end 106 with a latch of the end 156 can also couple the bridge 90 to the bridge 92 and unlock the end 156 from the guide rail 116. However, it is not a requirement that both ends 106, 108 of the bridge 90 engage with both ends 156, 158 of the bridge 92 to couple the bridge 90 to the bridge 92 for moving the bridge 92 in the X-direction.

Figure 9:
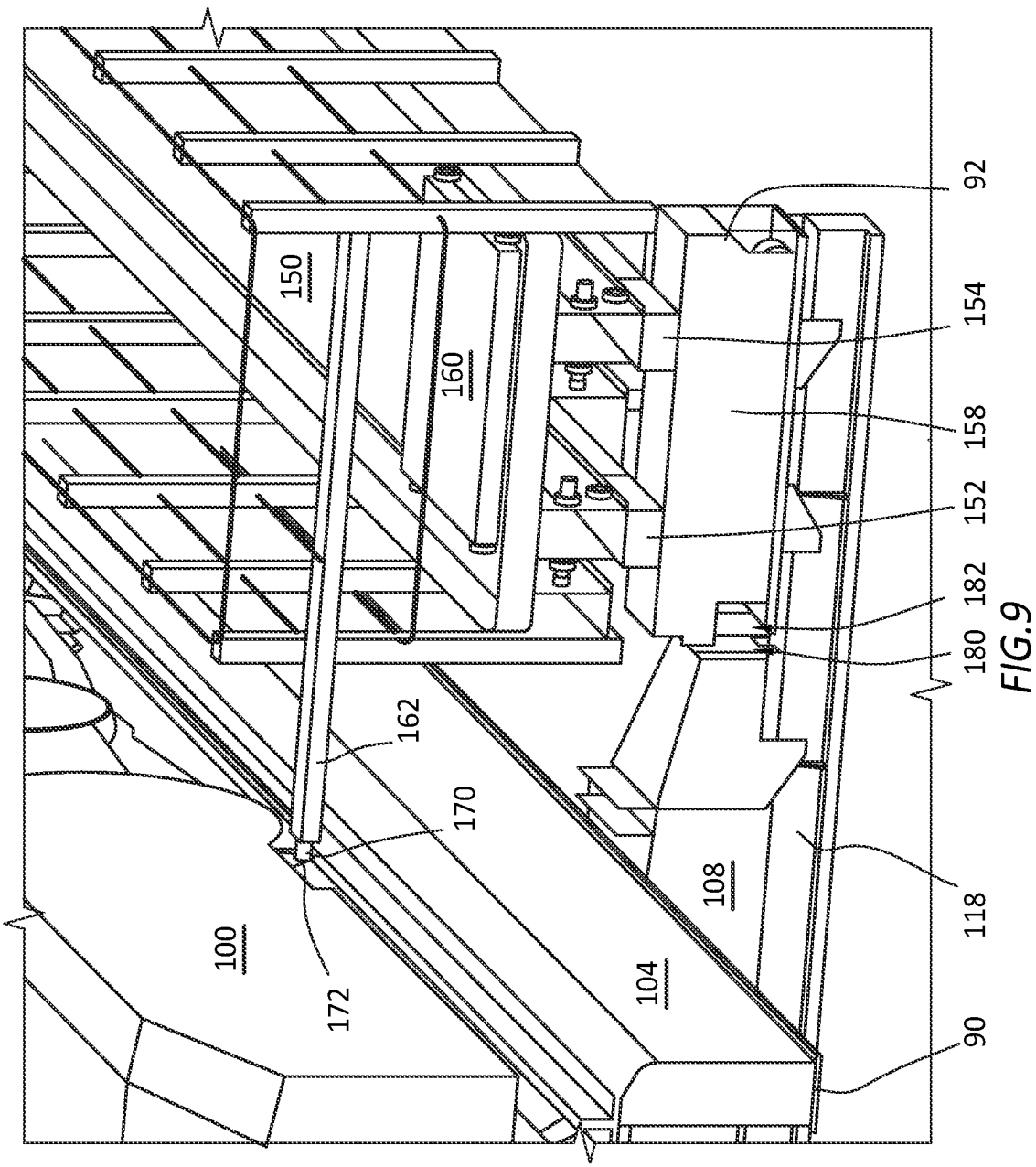
FIG. 9 is a representative perspective detailed view of a pipe handler coupled to an associated shuttle, that operates over a horizontal storage area, in accordance with certain embodiments.

FIG. 9 shows the retainer 170 of the pipe handler 100 engaged with the latch 172 of the shuttle 150, and the retainer 180 of the bridge end 108 engaged with the latch 182 of the bridge end 158. The engagement of the retainer 180 with the latch 182 can actuate the locking mechanism (not shown) to release the bridge 92 from the stowed location 120. The engagement of the retainer 170 with the latch 172 can couple the shuttle 150 to the pipe handler 100, such that movement in the X-direction of the pipe handler 100 along the bridge 90 also moves the shuttle 150 in the X-direction along the bridge 92. The shuttle 150 can be moveably coupled to the bridge rails 152, 154 of the bridge 92 to allow X-direction movement of the shuttle 150 along the bridge 92.

Figure 10:
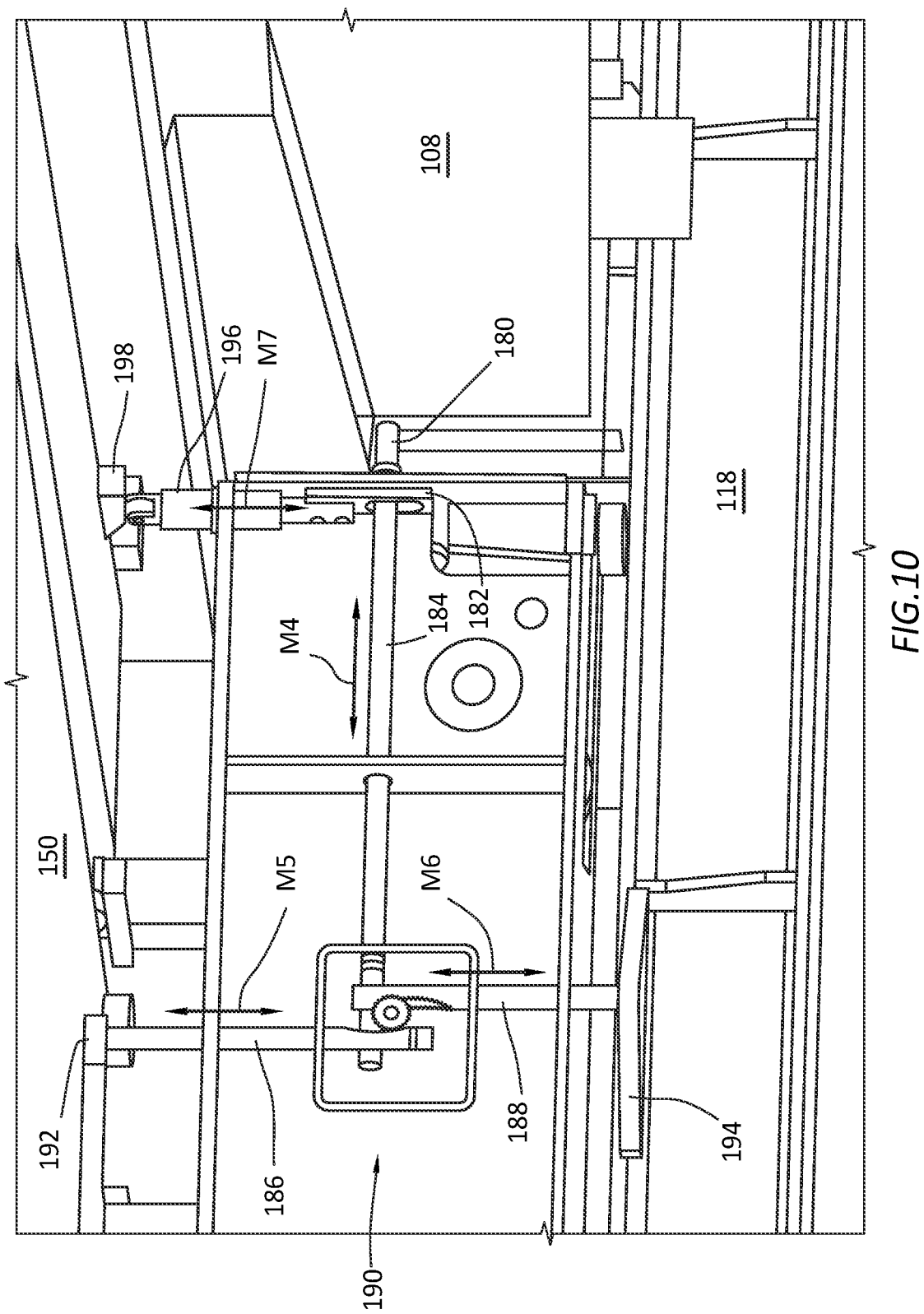
FIG. 10 is a representative perspective detailed view of a pipe handler coupled to an associated shuttle, that operates over a horizontal storage area, the shuttle having a locking mechanism, in accordance with certain embodiments.

FIG. 10 is a representative perspective view of the end 108 engaged with the end 158 via the retainer 180 and the latch 182. The locking mechanism 190 can be used to selectively enable movement of the bridge 92 relative to the guide rails 116, 118, and movement of the shuttle 150 relative to the bridge 92. If the locking mechanism 190 is engaged with the guide rail 118 (e.g., a rod 188 engaged with the retention feature 194), then X-direction movement of the bridge 92 relative to the guide rail 118 is prevented. However, if the locking mechanism 190 is disengaged from the guide rail 118 (e.g., the rod 188 disengaged from the retention feature 194), then X-direction movement of the bridge 92 relative to the guide rail 118 is permitted.

If the locking mechanism 190 is engaged with the shuttle 150 (e.g., a rod 186 engaged with the retention feature 192), then Y-direction movement of the shuttle 150 relative to the bridge 92 is prevented. However, if the locking mechanism 190 is disengaged from the shuttle 150 (e.g., the rod 186 disengaged from the retention feature 192), then Y-direction movement of shuttle 150 relative to the bridge 92 is permitted.

The locking mechanism 190 can be actuated by receiving the retainer 180 into the latch 182. For example, as the retainer 180 is received in the latch 182, the retainer 180 can move the rod 184 (arrows M4) to drive a gear in the locking mechanism 190. The gear can be rotated by the movement of the rod 184 and thereby move the rod 186 (arrows M5) and the rod 188 (arrows M6). Moving the rod 184 to the left relative to the view in FIG. 10 can rotate the gear counter-clockwise, thereby moving the rod 186 away from the retention feature 192 and moving the rod 188 away from the retention feature 194.

With the retainer 180 remaining in engagement with the latch 182, the shuttle 150 can be moved away from the end 158 allowing the latch actuator 196 to move upward (arrows M7) along the ramp feature 198, thereby securing the retainer 180 in the latch 182. With the locking mechanism 190 disengaged from both the shuttle 150 and the guide rail 118, the bridge 92 and the shuttle 150 can be free to move in the X and Y directions above the horizontal storage area 18. The movement of the bridge 92 and the shuttle 150 is controlled by the engagement of the bridge 90 to the bridge 92 and the engagement of the shuttle 150 with the pipe handler 100.

Figure 11:
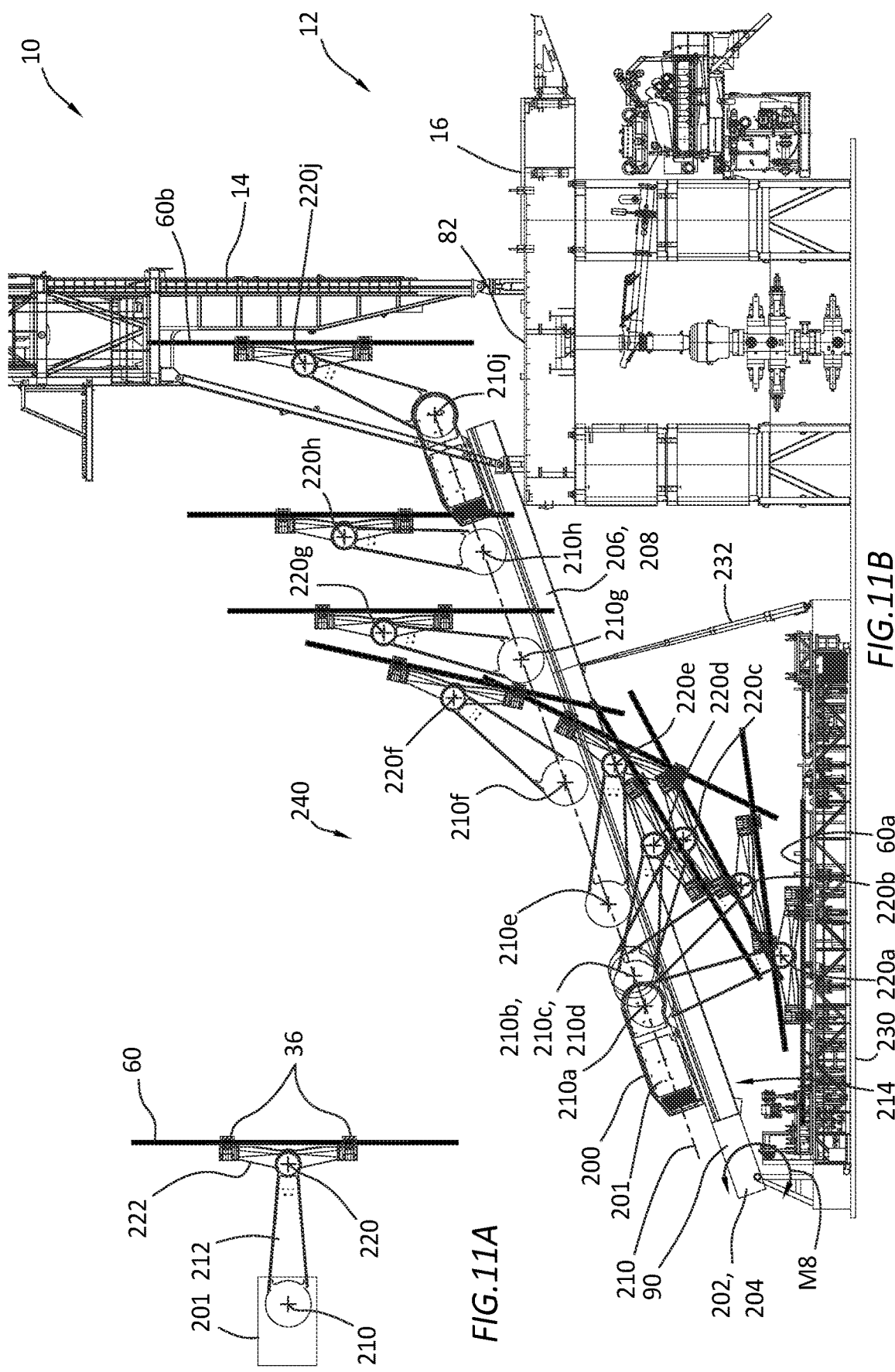
FIGS. 11A, 11B, 12A, and 12B are representative side views of a catwalk system with a pipe handler operating along an incline from a horizontal storage area to a rig floor, in accordance with certain embodiments.

FIG. 11A is a representative side view of the pipe handler 200 holding a tubular 60. The pipe handler 200 can include an arm 212 rotationally coupled at pivot 210 to a body 201 of the pipe handler 200. An arm 222 can be rotationally coupled at pivot 220 to the arm 212. The pivots 210, 220 can be generally centered on a central longitudinal axis 94 of the bridge 90 (see FIG. 3 for central axis 94 position), where the longitudinal axis 94 is generally positioned in the center of the space L1 between the bridge rails (e.g., bridge rails 202, 204, bridge rail extensions 206, 208). The arm 222 or grippers 36 can include sensors (e.g., ultrasonic sensors, Light Detection and Ranging (LiDAR) sensors, cameras, etc.) that can measure one or more parameters (e.g., inclination, diameter, length, etc.) of the tubular 60 (or other equipment) as the pipe handler 200 is positioned to engage and lift the tubular 60 (or other equipment).

It should be understood that the positions of the pivots in the other embodiments described in this disclosure can also be positioned generally centered on a central longitudinal axis 94 of the bridge 90. This can minimize stress and strain on the pipe handling components (e.g., arms 212, 222, pivots 210, 220, coupling of pipe handler 200 to the bridge 90, the bridge 90, etc.) since the weight of the equipment being moved by the pipe handler 200 can generally be distributed equally between the bridge rails 202, 204 or bridge rail extensions 206, 208. If the load engaged by the pipe handler 200 were offset from the central longitudinal axis 94, then additional stress and strain on the catwalk system 240 can be caused due to the rotational force applied by the load to the pipe handler 200. By maintaining the load volume centered on the central axis 94 of the bridge 90, rotational forces can be minimized and stress and strain on the catwalk system can be minimized. It should be understood that the other catwalk systems described in this disclosure are also configured to center a load relative to the central axis 94 of the bridge 90. This allows the catwalk systems in this disclosure to carry heavier loads since the stress and strain are minimized.

The arm 222 can include two grippers 36 spaced apart for gripping and transporting objects such as tubulars 60, but each individual gripper can also be used to grip and transport other objects such as tools, subs, short tubulars 60, etc. that do not require both grippers to engage the object. FIG. 11B illustrates the movement of the pipe handler 200 along the inclined bridge 90 as the pipe handler 200 carries a tubular 60 from the horizontal storage area 230 to the well center 82 on the rig floor 16. It should be understood that the process depicted in FIG. 11B can also be used to illustrate movement of the pipe handler 200 along the inclined bridge 90 as the pipe handler 200 carries a tubular 60 from the well center 82 to the horizontal storage area 230.

FIG. 11B is a representative perspective view of a catwalk system 240 that can include a pipe handler 200 operating along a bridge 90 that is inclined from a horizontal storage area 230 to a rig floor 16. The pipe handler 200 is similar to the pipe handler 100 in FIGS. 1-10, except that it moves along an inclined bridge 90. The bridge 90 can include bridge rails 202, 204, and bridge rail extensions 206, 208. The bridge rail extensions 206, 208 can extend a reach of the pipe handler 200 to the well center 82 on the rig floor 16. The bridge rail extensions 206, 208 can be unfolded from a stowed position or telescopically extended to allow the pipe handler 200 access to the well center 82.

An actuator 232 (e.g., one or more hydraulic cylinders) can be used to raise the bridge 90 from a stowed position to an appropriate height so that the bridge 90 can extend above the rig floor 16 and the pipe handler 200 can access the well center 82. The bridge 90 can rotate (arrows M8) around a pivot axis when the actuator 232 is extended or retracted. With the actuator 232 retracted to its minimum length, the bridge 90 can be in a stowed position that is generally parallel to the horizontal storage area 230. This stowed position can be used to transport the catwalk system 240 from one location to another. In the stowed position, the bridge rail extensions 206, 208 of the bridge 90 can be retracted to shorten the bridge 90 length for transport, or the bridge rail extensions 206, 208 can be folded over as in FIG. 13 for transport.

At the positions 210a, 220a, the respective pivots 210, 220 are rotated down to position the arms 212, 222, and grippers 36 of the pipe handler 200 to engage a tubular 60a in the horizontal storage area 230. At the positions 210b, 220b, the respective pivots 210, 220 are rotated to move the arms 212, 222, and grippers 36 of the pipe handler 200 to begin lifting the tubular 60a from the horizontal storage area 230 and rotating the tubular 60a from a horizontal orientation. At the positions 210c, 220c, the respective pivots 210, 220 are rotated to move the arms 212, 222, and grippers 36 of the pipe handler 200 to further lift the tubular 60a and rotate the tubular 60a toward a more vertical orientation. At the positions 210d, 220d, the respective pivots 210, 220 are rotated to move the arms 212, 222, and grippers 36 of the pipe handler 200 to further lift the tubular 60a and further rotate the tubular 60a toward a more vertical orientation. At positions 210d, 220d, the tubular 60a can begin moving through the space 214 between the bridge rails 202, 204 of the bridge 90.

At the positions 210e, 220e, the respective pivots 210, 220 are rotated to move the arms 212, 222, and grippers 36 of the pipe handler 200 to further lift the tubular 60a and further rotate the tubular 60a toward a more vertical orientation. At positions 210e, 220e, the arms 212, 222, and grippers 36 are moving through the space 214 between the bridge rails 202, 204 and between the bridge rail extensions 206, 208. At the positions 210f, 220f, the respective pivots 210, 220 are rotated to move the arms 212, 222, and grippers 36 of the pipe handler 200 to further lift the tubular 60a and further rotate the tubular 60a toward a more vertical orientation. At positions 210f, 220f, the arms 212, 222, and grippers 36 have moved through the space 214 between the bridge rails 202, 204 and between the bridge rail extensions 206, 208. At the positions 210g, 220g, the respective pivots 210, 220 are rotated to move the arms 212, 222, and grippers 36 of the pipe handler 200 to further lift the tubular 60a and rotate the tubular 60a to a vertical orientation. At positions 210g, 220g, the arms 212, 222, and grippers 36 have moved through the space 214 between the bridge rails 202, 204 and between the bridge rail extensions 206, 208, and a bottom end of the tubular 60a can remain extended between the bridge rail extensions 206, 208 while being held in the vertical orientation.

At positions 210h, 220h, the arms 212, 222, and grippers 36 can hold the tubular 60a in the vertical orientation while the pipe handler 200 moves farther up the bridge 90 toward the well center 82. At positions 210j, 220j, the respective pivots 210, 220 can be rotated to move the arms 212, 222, and grippers 36 to move the tubular 60a to the vertically orientated tubular 60b position at the well center 82. The pivots 210, 220 can be rotated to maintain the vertically orientated tubular 60b while threading the tubular 60b into a tubular string that can extend into a wellbore at well center 82. As mentioned above, this process can be reversed to remove a tubular 60b from a tubular string at well center 82 and transport it to the horizontal storage area 230 through positions 210j-201a, 220j-220a of the respective pivots 210, 220.

Figure 12:
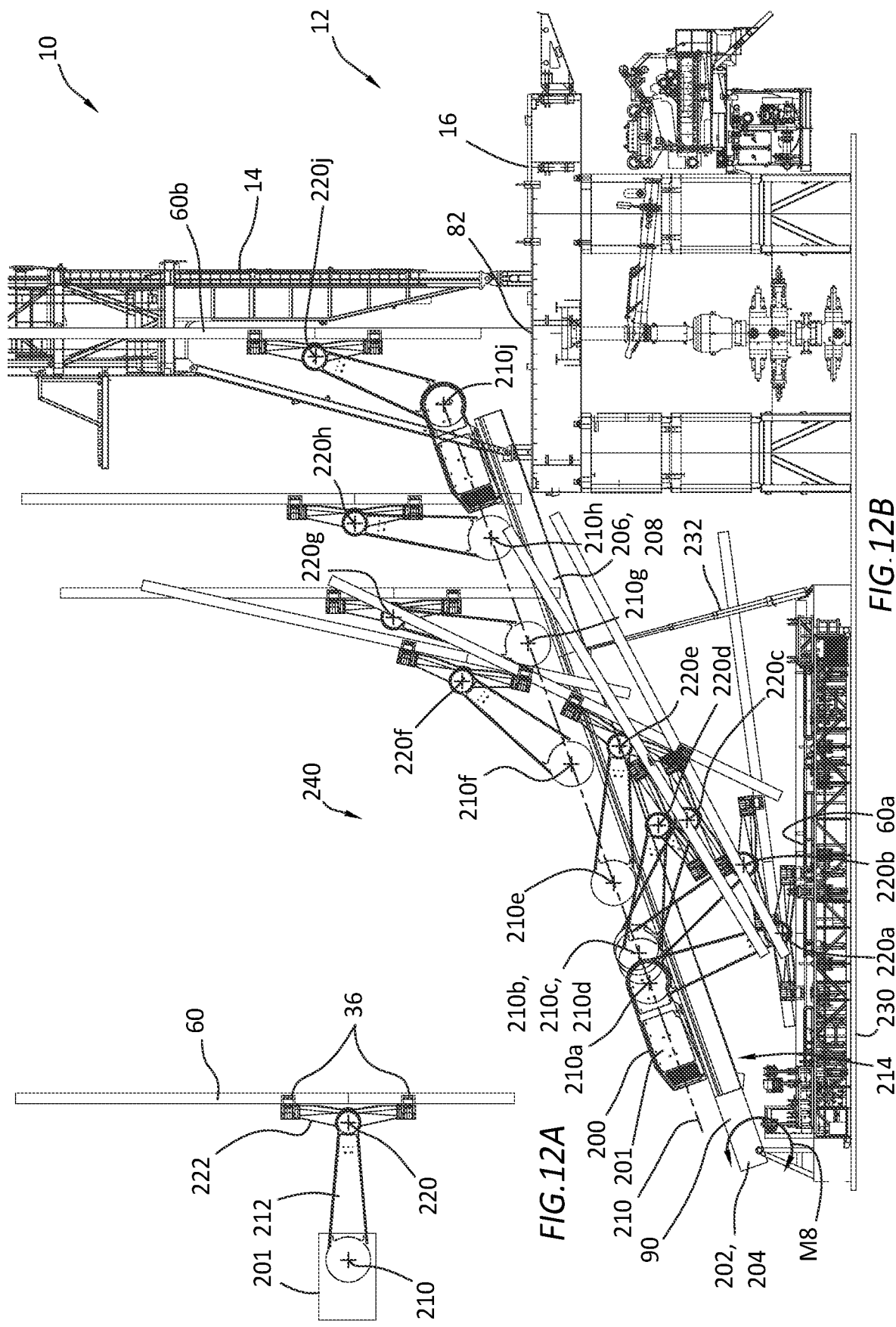

FIG. 12A is a representative side view of the pipe handler 200 holding a tubular 60. The pipe handler 200 can include an arm 212 rotationally coupled at pivot 210 to a body 201 of the pipe handler 200. An arm 222 can be rotationally coupled at pivot 220 to the arm 212. The arm 222 can include two grippers 36 spaced apart for gripping and transporting objects such as tubulars 60, but each individual gripper can also be used to grip and transport other objects such as tools, subs, short tubulars 60, etc. that do not require both grippers to engage the object. FIG. 12B illustrates the movement of the pipe handler 200 along the inclined bridge 90 as the pipe handler 200 carries a tubular 60 (which in this case is a larger and longer tubular 60 than the one shown in FIGS. 11A and 11B, such as a 50-60 ft. casing segment) from the horizontal storage area 230 to the well center 82 on the rig floor 16. It should be understood that the process depicted in FIG. 12B can also be used to illustrate movement of the pipe handler 200 along the inclined bridge 90 as the pipe handler 200 carries a tubular 60 from the well center 82 to the horizontal storage area 230.

As similarly described above regarding FIGS. 11A. 11B, the pipe handler 200 can lift a tubular 60a from the horizontal storage area 230 via moving the arms 212, 222, and the grippers 36 and transport it to a vertically oriented tubular 60b position above well center 82, or move the tubular 60 from the vertically oriented tubular 60b position at the well center 82, to a horizontally oriented tubular 60a position at the horizontal storage area 230. The pivots 210, 220 can move through the respective positions 210a-210j. 220a-220j when transporting the tubular 60 between the vertically oriented tubular 60b position and the horizontally oriented tubular 60a position. The catwalk system 240 shown in FIGS. 11A-12B is a more robust and efficient way to move tubulars between the well center 82 and the horizontal storage area 230, than traditional catwalk systems that have to be lifted and lowered for each tubular transported between the well center and a horizontal storage area.

Figure 13:
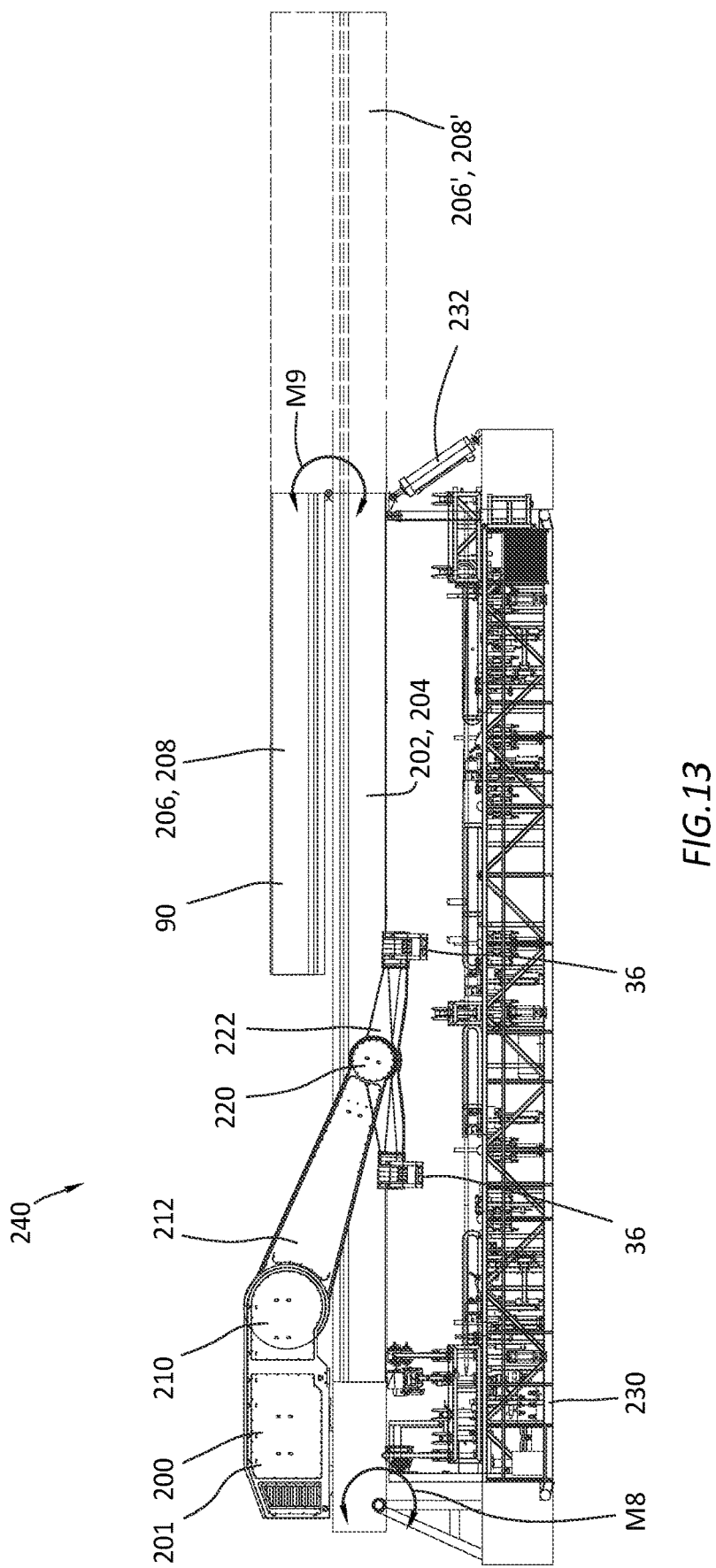
FIG. 13 is a representative side view of a pipe handler in a stowed configuration, in accordance with certain embodiments.

FIG. 13 is a representative side view of the catwalk system 240 in a stowed position ready for transport to a new location. The actuator 232 has been retracted to lower the bridge 90 to the horizontal position shown. The bridge rail extensions 206, 208, are shown rotated (arrows M9) about a rotational axis from the positions 206', 208' to fold the bridge rail extensions 206, 208 back onto the bridge rails 202, 204 in preparation for transport. The pipe handler 200 can be moved to the end of the bridge 90 to allow clearance for folding the bridge rail extensions 206, 208.

Figure 14:
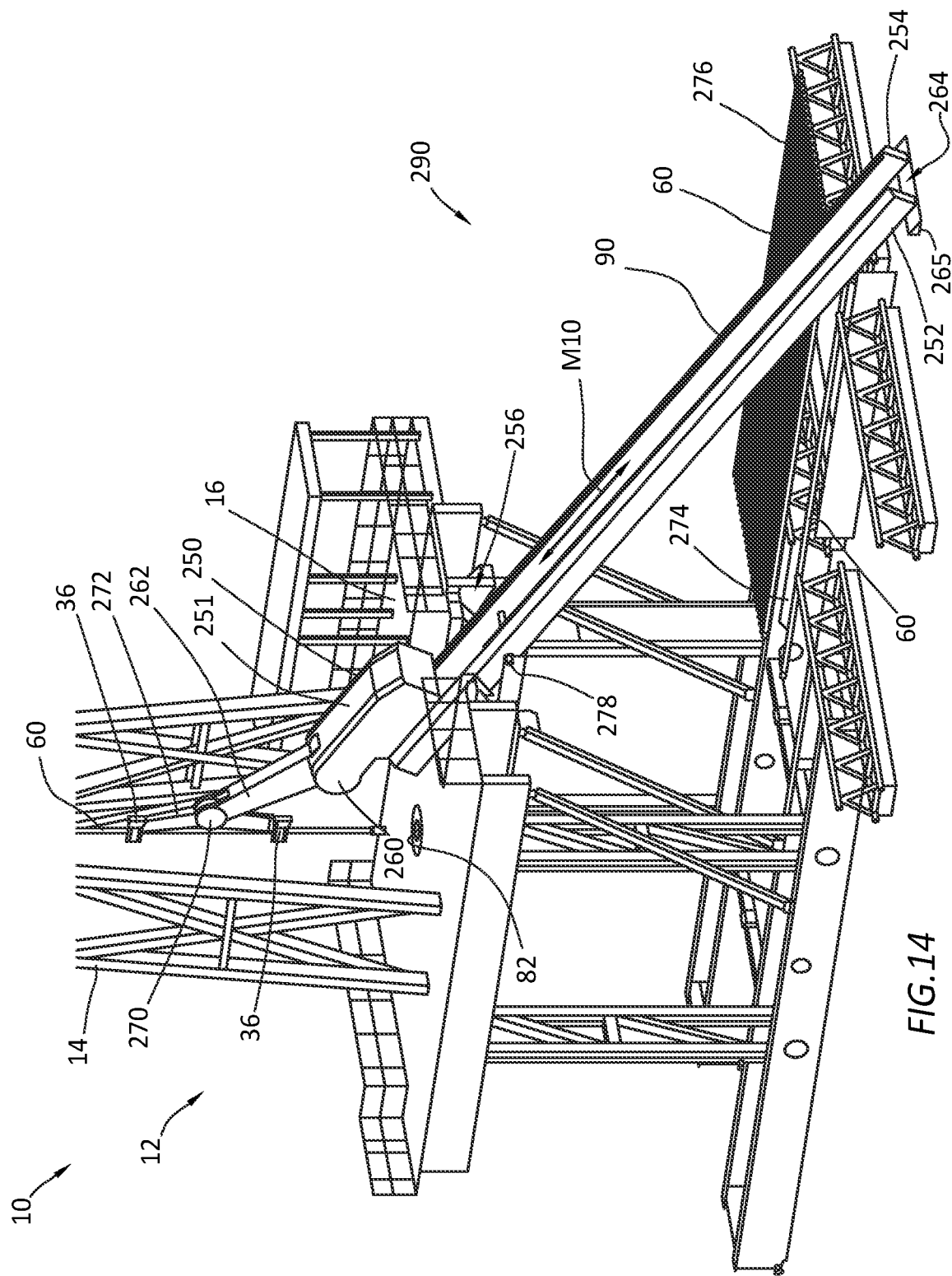
FIGS. 14, and 15A-15C are representative perspective views of a pipe handler operating at an incline from a horizontal storage area to a rig floor, in accordance with certain embodiments.

FIG. 14 is a representative perspective view of a catwalk system 290 with a pipe handler 250 operating at an incline from a horizontal storage area 276 to a rig floor 16. The catwalk system 290 is similar to the catwalk system 240 of FIGS. 11A-12B, except that the inclined bridge 90 rests on a support 265 on the ground next to the horizontal storage area 276, the bridge 90 is positioned in a rig floor cutout 256, and the horizontal storage area 276 has a tubular lift 274 to lift tubulars 60 (or other equipment) from the horizontal storage area 276 to the pipe handler 250 or receive and lower the tubular 60 (or other equipment) when the pipe handler 250 is returning the tubular 60 (or other equipment) to the horizontal storage area 276.

The catwalk system 290 includes a pipe handler 250 that operates along the bridge 90 (arrows M10) to transport tubulars 60 between the horizontal storage area 276 and the well center 82. The pipe handler 250 can include an arm 262 rotationally coupled to a body 251 at pivot 260, with the body moveably coupled to the bridge rails 252, 254 of the bridge 90. The arm 272 with spaced apart grippers 36 can be rotationally coupled to the arm 262 at the pivot 270. The bridge 90 is positioned in a rig floor cutout 256 that allows the pipe handler 250 to be closer to the rig floor at the top of the bridge 90. The bridge 90 can be coupled to the rig via a coupling 278, which secures the bridge 90 to the rig 10.

Figure 15A:
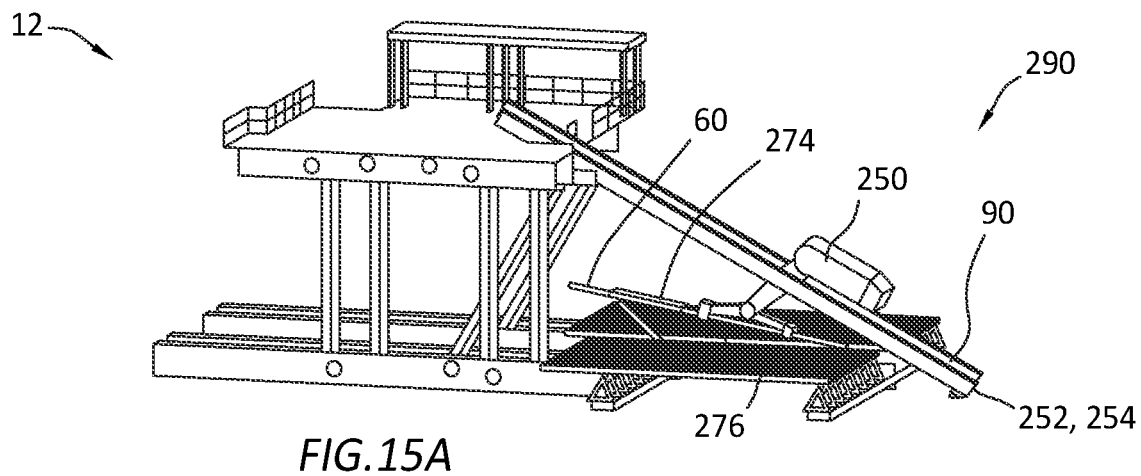
Figure 15B:
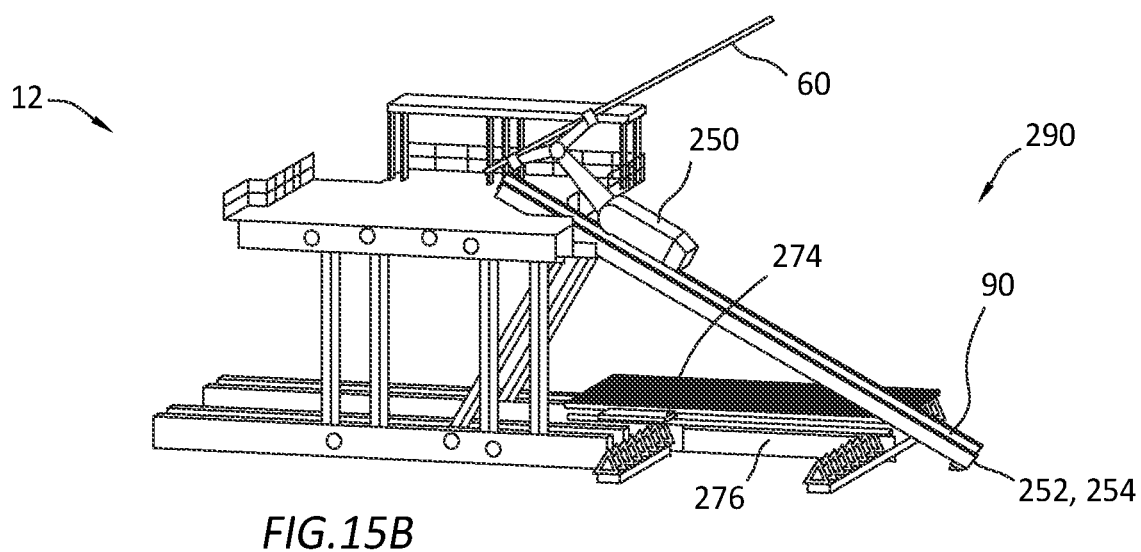
Figure 15C:
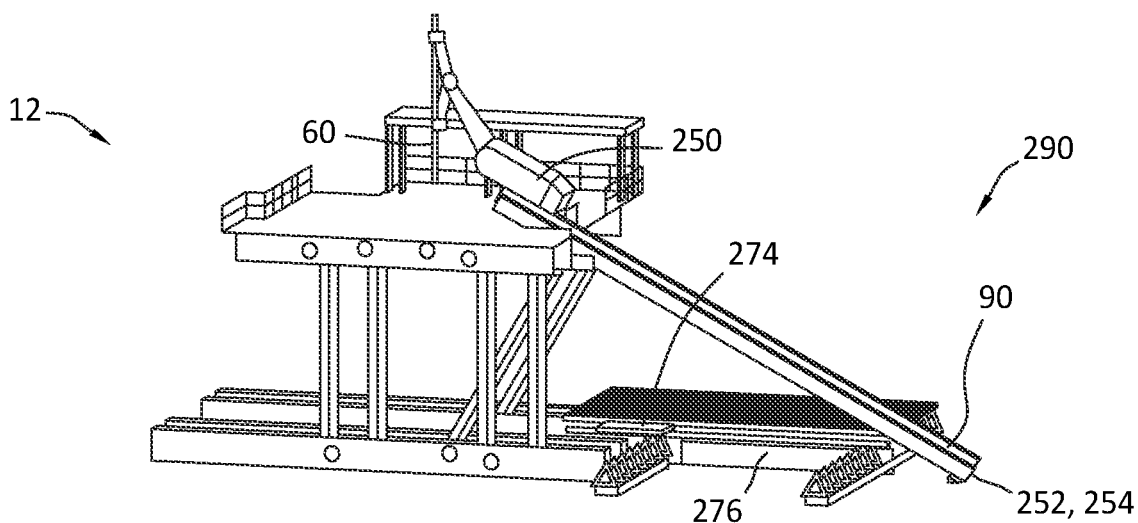

FIGS. 15A-15C are representative perspective views of the catwalk system 290 with a pipe handler 250 transporting a tubular 60 from a horizontal storage area 276 to a well center 82 on the rig floor 16. The tubular lift 274 can receive a tubular 60 from the horizontal storage area 276 in a horizontal orientation and lift the tubular 60 at one end to present the tubular 60 to the pipe handler 250. The pipe handler 250 can retrieve the tubular 60 from the tubular lift 274 and rotate it up through the space 264 (via the arms 262, 272, and respective pivots 260, 270) between the bridge rails 252, 254. The pipe handler 250 can transport the tubular 60 up along the inclined bridge 90 and present the tubular 60 to the well center 82 in a vertical orientation for connecting to a tubular string at the well center 82. The grippers 36 can be used to spin the tubular 60 into a connection to the tubular string, or another pipe handler (e.g., top drive, elevator, etc.) can be used to attach the tubular 60 to the tubular string. The arm 262 or grippers 36 can include sensors (e.g., ultrasonic sensors, LIDAR sensors, cameras, etc.) that can measure one or more parameters (e.g., inclination, diameter, length, etc.) of the tubular 60 (or other equipment) as the pipe handler 250 is positioned to engage and lift the tubular 60 (or other equipment).

The tubular lift 274 can be used to adjust the axial position of the tubular 60 so the pipe handler 200 knows the distance from the gripper to an end of the tubular 60. The tubular lift 274 can include sensors for measuring one or more parameters (e.g., length) of each tubular 60 being carried by the tubular lift 274. The tubular lift 274 can also measure and report the weight of the tubular 60 to the rig controller 50, as well as measure and report the diameter of the tubular 60 to the rig controller 50. The tubular lift 274 can also measure and report the dimensions of the pin or box end of the tubular 60 to the rig controller 50. The tubular lift 274 can also include a doping device for doping either the pin end or box end of the tubular 60 before the pipe handler 200 receives the tubular 60 from the tubular lift 274.

FIGS. 16A-16B are representative side views of the catwalk system 290 with a pipe handler 250 engaging a tubular 60 in a horizontal storage area 276. The tubular 60 has been elevated by the tubular lift 274. This allows the pipe handler 250 to engage and lift the tubular 60 at a location on the tubular that is closer to the center of the tubular 60. The pipe handler 250 can engage and lift the tubular 60 directly from a horizontal orientation in the horizontal storage area 276 without the tubular 60 being lifted by the lift 274. However, this may alter the available positions at which the pipe handler 250 can engage the tubular 60.

When larger, bulky, or oddly shaped equipment needs to be transported to the well center 82, then a shuttle 280 can be used to cradle the equipment and carry the larger, bulky, or oddly shaped equipment (not shown) to the well center 82, where the equipment can be manipulated by an elevator, top drive, crane, or other pipe handler. The shuttle 280 can be slidingly coupled to the bridge rails 252, 254 of the bridge 90. When the shuttle 280 is positioned at a lower position on the bridge 90, the large equipment can be deposited onto the shuttle 280 by handling equipment (e.g., a crane). With the large equipment on the shuttle 280, the shuttle 280 can then be slide up the inclined bridge 90 such that the large equipment can be accessed by rig floor handling equipment. A cable system can be used to pull the shuttle 280 up the bridge 9 and allow the shuttle 280 to slide down the bridge 90. Alternatively, or in addition to, the pipe handler 250 can be configured to manipulate the shuttle 280 along the bridge 90, similar to the shuttle 150 being manipulated by the pipe handler 100 in FIGS. 5-7. However, in this configuration, the shuttle 280 is in line with the pipe handler 250 on the bridge 90 as opposed to alongside the pipe handler 100 on a separate bridge 92, as in FIGS. 5-7. This shuttle 280 can be used on any of the catwalk systems described in this disclosure, as well as on the pipe handler 100 system in FIGS. 5-7.

Figure 17:
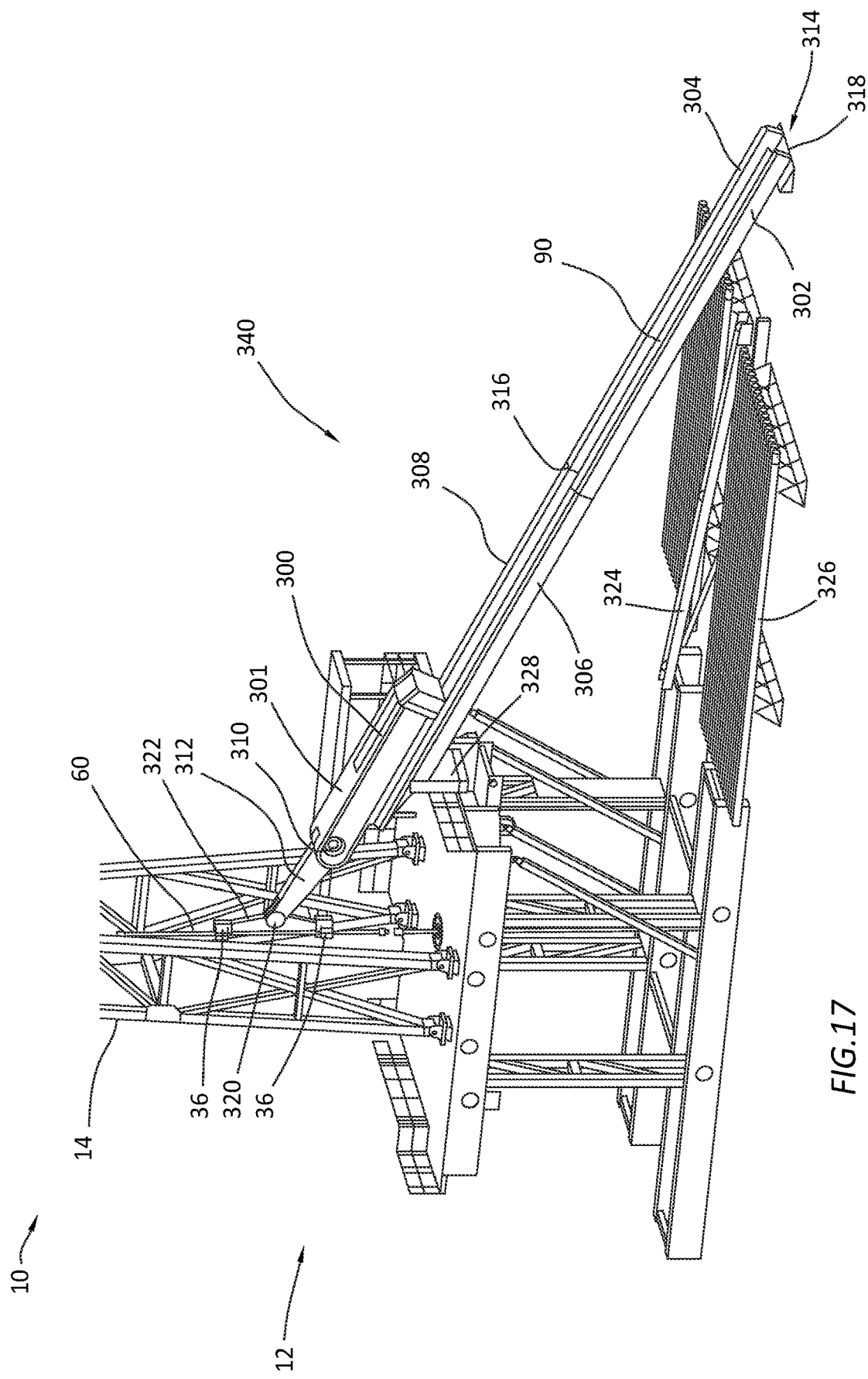
FIGS. 17-19 are representative perspective views of a pipe handler operating at an incline from a horizontal storage area to a rig floor, in accordance with certain embodiments.
Figure 18:
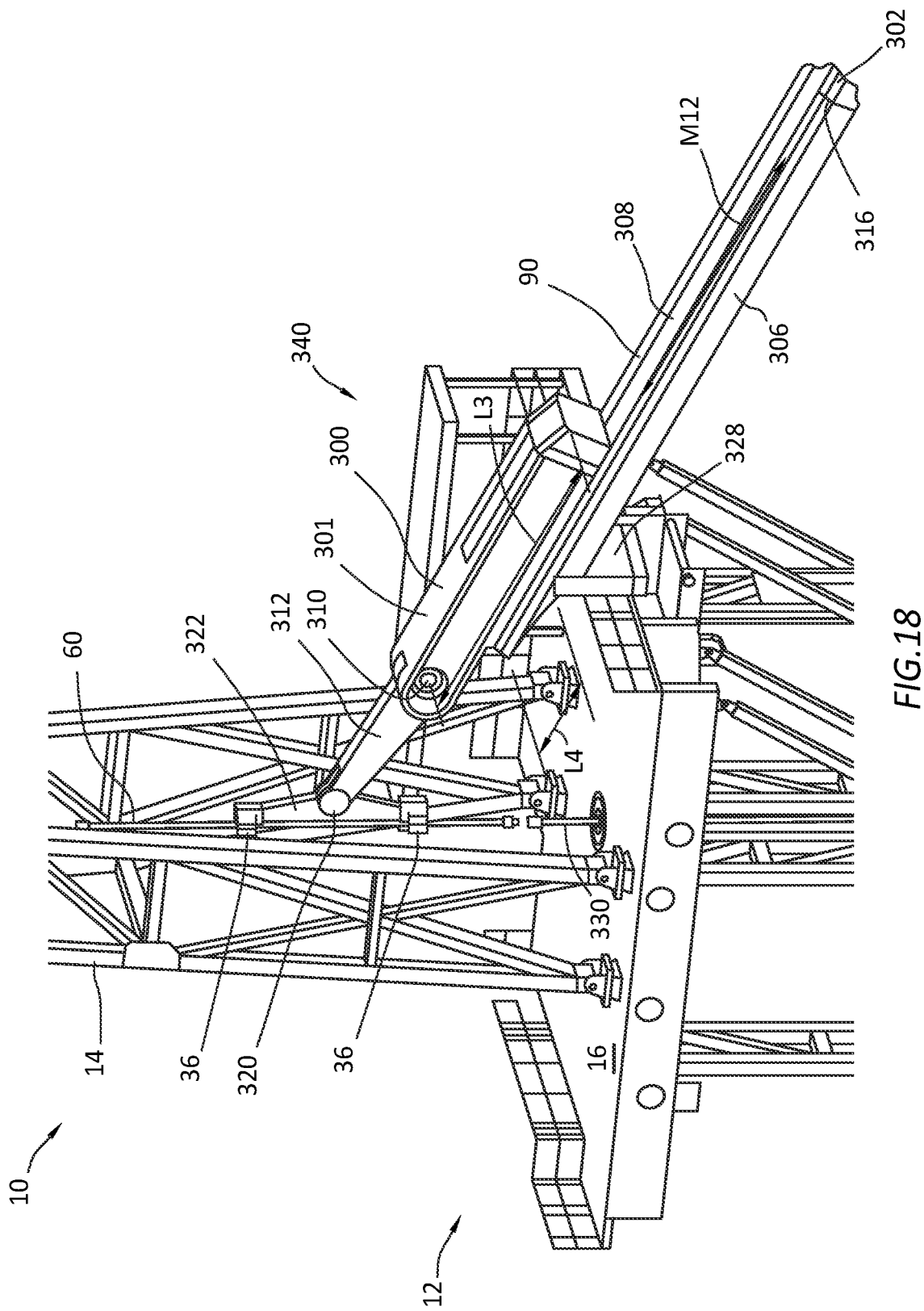
Figure 19:
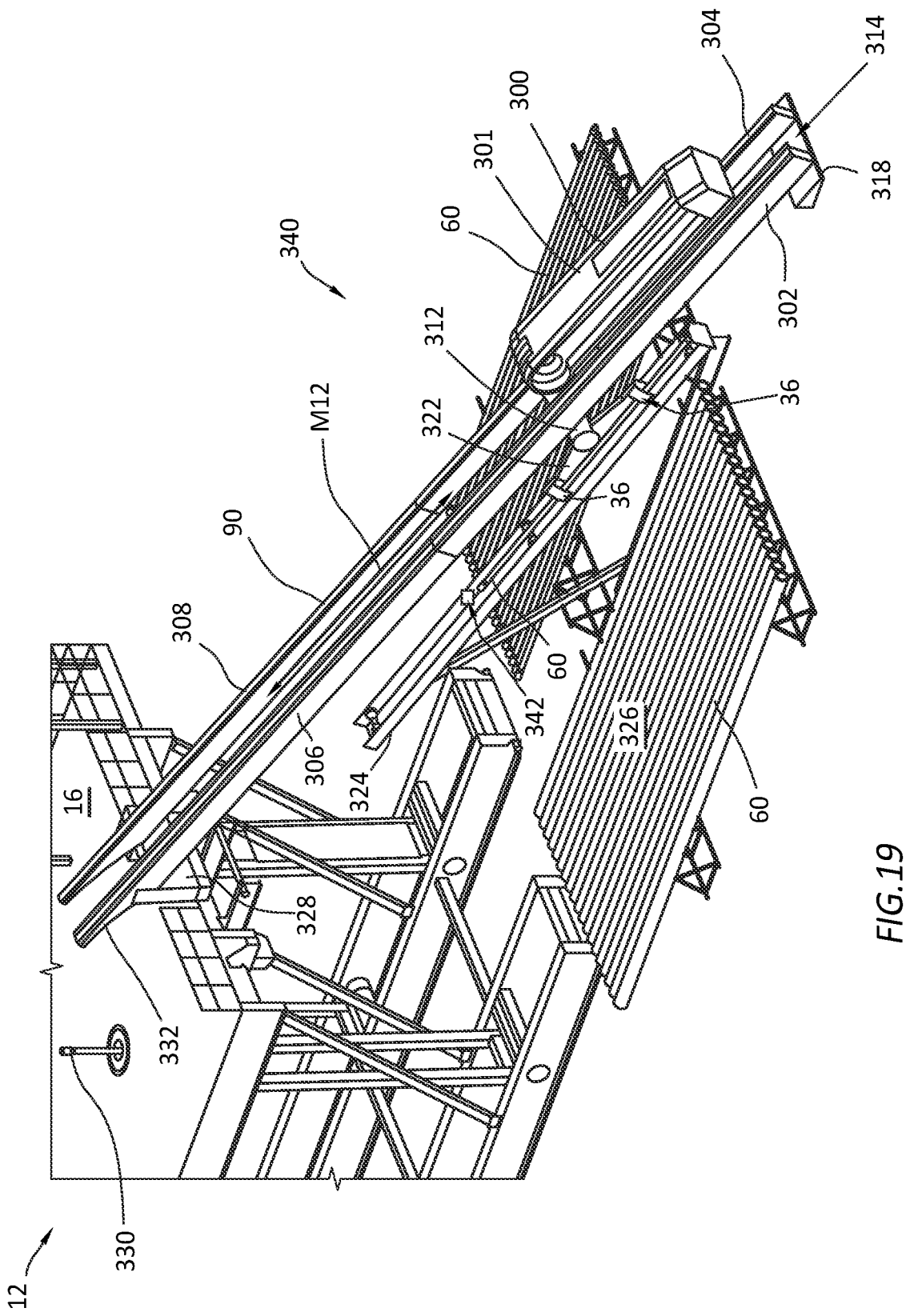
Figure 20:
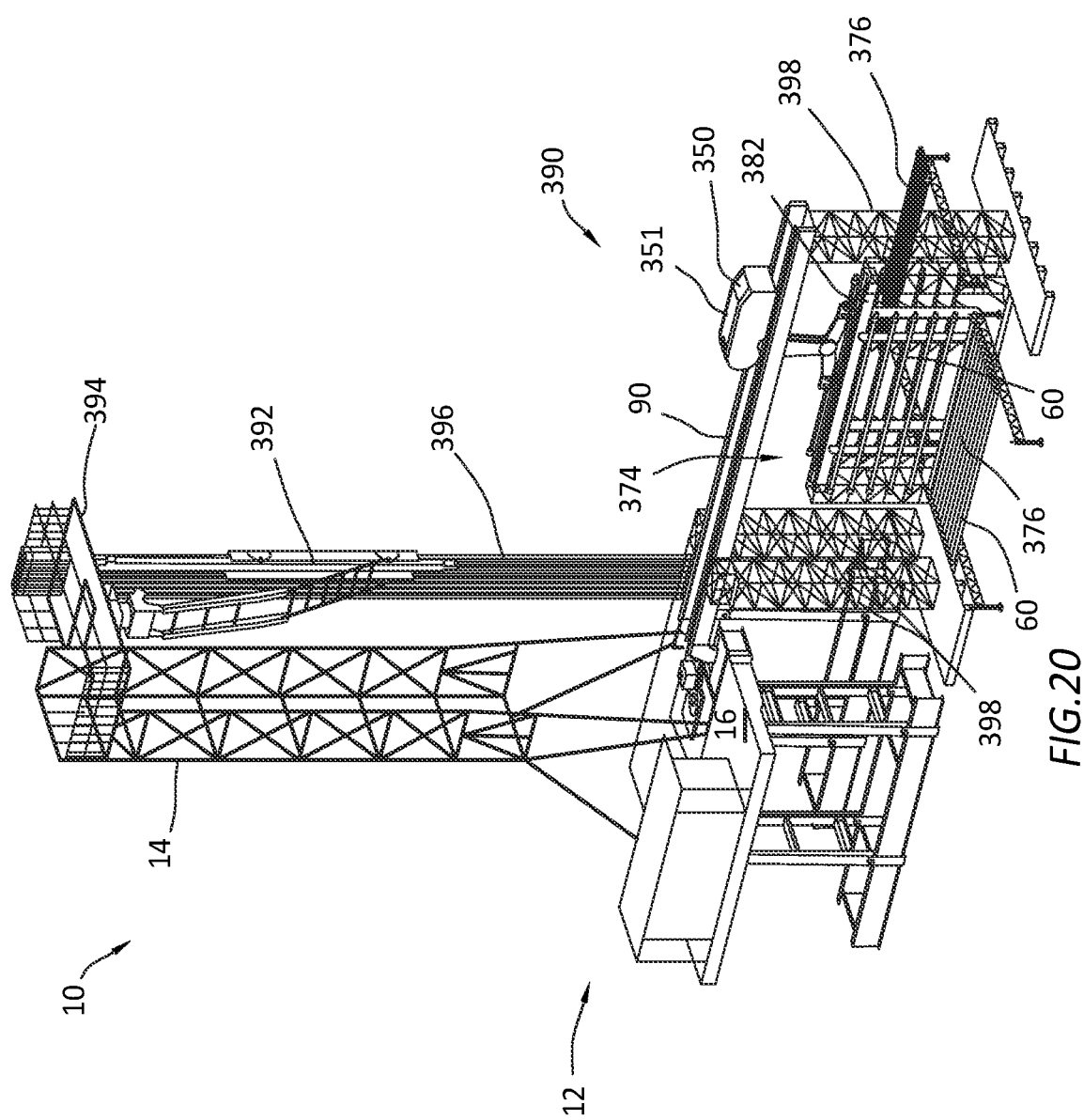
FIGS. 20-24 are representative perspective views of a pipe handler operating along a horizontal bridge above a horizontal storage area, with a horizontal lift system that transfers tubulars between the pipe handler and the horizontal storage area, in accordance with certain embodiments.

FIGS. 17-19 are representative perspective views of a catwalk system 340 which can include a pipe handler 300 operating on an inclined bridge 90 from a horizontal storage area 326 to a rig floor 16. The catwalk system 340 is similar in functionality to the catwalk system 290 of FIGS. 14-16B inclined bridge 90 configurations, except that the length of the body 301 of the pipe handler 300 can be varied, the connection to the rig floor 16 does not require a rig floor cutout, and the extension of the bridge 90 over the rig floor can be varied. Therefore, multiple variables can be adjusted to provide access of the pipe handler 300 to the well center 82, while optimizing other parameters. For example, with an increased length of the body 301 of the pipe handler 300, the end of the bridge 90 can be extended a minimal distance over the rig floor 16, providing more open rig floor space when the pipe handler 300 is not at the top of the bridge 90.

The pipe handler 300 can have a body 301 that is moveably coupled to the bridge rails 302, 304 and the bridge rail extensions 306, 308 of the bridge 90. The bridge 90 can include a space 314 between the bridge rails 302, 304 and between the bridge rail extensions 306, 308. The bridge rails 302, 304 can be rigidly coupled to the bridge rail extensions 306, 308 at the bridge connection 316. The lower end of the bridge 90 can be supported by the support 318 which can rest on the ground. The upper end of the bridge 90 can be coupled to the rig floor via an attachment mechanism 328. The height of the attachment mechanism 328 can be varied to accommodate various height rig floors 16 to maintain the desired position of the pipe handler 300 when it is at the top of the bridge 90 and to maintain the pipe handler's 300 position relative to the well center 82 and the rig floor 16. An arm 312 can be rotationally coupled to the body 301 at the pivot 310. An arm 322 can be rotationally coupled to the arm 312 at the pivot 320. The arm 322 can have spaced apart grippers 36 for engaging and gripping equipment, such as tubulars 60. A tubular lift 324 can hoist a tubular 60 from the horizontal storage area 326 to present it to the pipe handler 300. The arm 312 or grippers 36 can include sensors (e.g., ultrasonic sensors, LIDAR sensors, cameras, etc.) that can measure one or more parameters (e.g., inclination, diameter, length, etc.) of the tubular 60 (or other equipment) as the pipe handler 300 is positioned to engage and lift the tubular 60 (or other equipment).

The tubular lift 324 can be used to adjust the axial position of the tubular 60 so the pipe handler 300 knows the distance from the gripper to an end of the tubular 60. The tubular lift 324 can include sensors for measuring one or more parameters (e.g., length) of each tubular 60 being carried by the tubular lift 324. The tubular lift 324 can also measure and report the weight of the tubular 60 to the rig controller 50, as well as measure and report the diameter of the tubular 60 to the rig controller 50. The tubular lift 324 can also measure and report the dimensions of the pin or box end of the tubular 60 to the rig controller 50. The tubular lift 324 can also include a doping device for doping either the pin end or box end of the tubular 60 before the pipe handler 300 receives the tubular 60 from the tubular lift 324.

Referring to FIG. 18, the pipe handler 300 can move along the bridge 90 (arrows M12) to transport equipment between the horizontal storage area 326 and the well center 82. As mentioned above, parameters can be varied to accommodate various rig configurations. If the length L3 of the body 301 is reduced, then the length L4 of the end of the bridge 90 (as measured from the attachment mechanism 328 to the end of the bridge 90) may need to be increased to allow the pipe handler 300 to access the well center 82. Also, the height of the attachment mechanism 328 can also influence the determination of the lengths L3, L4. FIG. 18 shows a pipe handler 300 with a body 301 that is longer than the previously described similar pipe handlers. The length L3 is defined as the length from the end of the body 301 to the pivot 310.

Making the body 301 of the pipe handler 300 longer than the other configurations allows the bridge 90 overlap over the rig floor 16 to be minimized, thereby providing more clearance on the rig floor 16 when the pipe handler 300 is not over the rig floor 16. If the tubular 60 being manipulated by the pipe handler 300 is heavier than other equipment, then the pipe handler 300 can rotate the arm 312 to a more vertical orientation to minimize strain on the pivot 310 and the arm 312. The elongated body 301 and the upper end of the bridge 90 can be designed to allow the body 301 to get closer to the well center 82 to allow the arm 312 to be in a more vertical orientation when the tubular 60 is spun into of out of a connection joint with the tubular string 330.

Referring to FIG. 19, the pipe handler 300 is positioned on the bridge 90 to collect a tubular 60 from or deposit a tubular 60 into the tubular lift 324 in the horizontal storage area 326. The descriptions of the other catwalk system embodiments in this disclosure can generally apply also to the catwalk system 340. The differences of the pipe handler 300 can be applied to the other pipe handler embodiments described in this disclosure. The tubular lift 324 can include one or more sensors 342 that can be used to determine or measure parameters of the tubular 60 (e.g., length, weight, diameter, etc.). The tubular lift 324 can receive tubulars from either side of the horizontal storage area 326 or deliver tubulars to either side of the horizontal storage area 326. The pipe handler 300 can collect the tubular 60 from the tubular lift 324 and transport the tubular along the inclined bridge 90 to the bridge end 332 of the bridge 90. The end of each bridge rail extension 306, 308 at the bridge end 332 can have a reduced height, with the bottom of each bridge rail extension 306, 308 curved from a common height at the attachment mechanism 328 to the reduced height at the top end of the bridge 90.

FIGS. 20-24 are representative perspective views of catwalk system 390 that can include a pipe handler 350 operating along a horizontal bridge 90 above a horizontal storage area 376, with a horizontal lift system 374 that transfers tubulars between the pipe handler 350 and the horizontal storage area 376. The horizontal bridge 90 can be elevated above the horizontal storage area 376 to a height above the rig floor 16 of the rig 10. One or more vertical supports 398 can be used to support the horizontal bridge 90 at the elevated height. The horizontal lift system 374 can be used to raise or lower tubulars 60 in a horizontal orientation between the horizontal storage area 376 and a horizontal support 382, where the horizontal support 382 is accessible by the pipe handler 350 to collect or deposit tubulars 60. The pipe handler 350 can be any one of the pipe handlers described in this disclosure.

Figure 21:
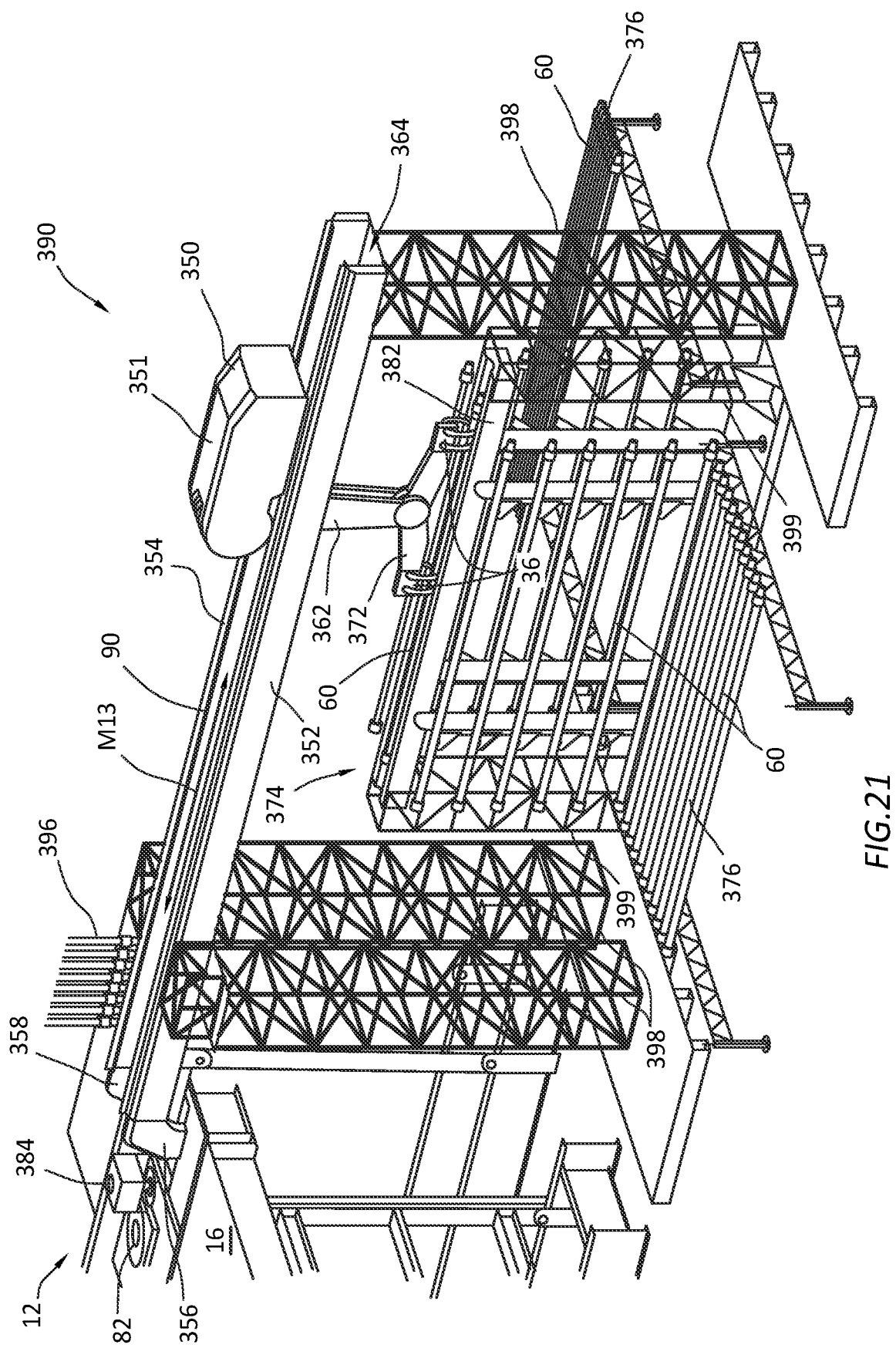

Referring to FIG. 21, the horizontal bridge 90 can include bridge rails 352, 354 with a space 364 therebetween. The body 351 of the pipe handler 350 is moveably coupled to the horizontal bridge 90, and the pipe handler 350 can rotate the arms 362, 372 through the space 364 to collect tubulars 60 from or deposit tubulars 60 onto the horizontal support 382. The pipe handler 350 can transport the tubulars 60 (arrows M13) between the horizontal support 382 and the well center during tripping in or tripping out operations. The horizontal lift system 374 transports the tubulars 60 between the horizontal support 382 and the horizontal storage area 376 in a horizontal orientation. The horizontal bridge 90 can include bridge rail extensions 356, 358 that can couple the respective bridge rails 352, 354 to the rig floor. The horizontal bridge 90 can also include additional bridge rail extensions (not shown), similar to those described in FIG. 17, to allow the horizontal bridge 90 to be broken down into shorter portions for transport between well sites. The arm 372 or grippers 36 can include sensors (e.g., ultrasonic sensors, LIDAR sensors, cameras, etc.) that can measure one or more parameters (e.g., inclination, diameter, length, etc.) of the tubular 60 (or other equipment) as the pipe handler 350 is positioned to engage and lift the tubular 60 (or other equipment).

Additionally, the bridge rail extensions 356, 358 can be slidingly engaged with the bridge rails 352, 354, such that when the platform 12 "walks" to another wellbore location in an array of wellbore locations, then the bridge rail extensions 356, 358 can travel with the rig floor 16 and provide an extension of the bridge 90 to access the rig floor 16 when the rig floor moves without requiring the catwalk system 390 to move along with the platform 12. The horizontal storage area 376 and the vertical supports 398, 399 can also be outfitted with a "walking" mechanism to walk along with the platform 12 when it moves to a new wellbore.

When tripping a tubular string into a wellbore at the well center 82 of the rig floor 16, the horizontal lift system 374 can lift tubulars from either side of the horizontal storage area 376 while maintaining a horizontal orientation of the tubulars 60. The horizontal lift system 374 can deposit a tubular 60 onto the horizontal support 382 at the top of the horizontal lift system 374. The pipe handler 350 can then engage the tubular 60 at the horizontal support 382, lift the tubular 60 up through the space 364 between the bridge rails 352, 354 of the horizontal bridge 90, transport the tubular 60 along the horizontal bridge 90 to the well center 82 and spin the tubular 60 onto the tubular string that sticks up through the well center 82 or hand the tubular off to another pipe handler (e.g., top drive, elevator, pipe handler 392, etc.) for connection to the tubular string or storage in the fingerboard vertical tubular storage 394. The tubulars 60 can also be assembled into tubulars 396, which can be tubular stands of two or more tubulars 60. Optionally, the pipe handler 350 can apply dope to one or both ends of the tubular 60 prior to spinning the tubular 60 onto the tubular string or handing the tubular 60 off to another pipe handler. As way of example, the pipe handler 350 can rotate the tubular 60 to a vertical orientation and extend an end (e.g., a pin end) of the tubular 60 into the doping device 384. As the pipe handler 350 rotates the tubular 60, the doping device can apply a doping layer to the tubular end. Then the pipe handler 350 can retract the tubular 60 from the doping device 384 and proceed to the well center 82 or to hand off the tubular to another pipe handler.

When tripping a tubular string out of a wellbore at the well center 82 of the rig floor 16, the pipe handler 350 spin the tubular 60 out of connection with the tubular string at the well center after an iron roughneck has untorqued the connection. Optionally, the pipe handler 350 can apply dope to one or both ends of the tubular 60 after spinning the tubular 60 out of connection to the tubular string or receiving the tubular 60 from another pipe handler. As way of example, the pipe handler 350 can maintain the tubular 60 in a vertical orientation and extend an end (e.g., a pin end) of the tubular 60 into the doping device 384. As the pipe handler 350 rotates the tubular 60, the doping device can clean the threads and apply a doping layer to the threads and shoulder of the tubular end. Then the pipe handler 350 can retract the tubular 60 from the doping device 384 and proceed to transport the tubular 60 from the well center, through the space 364 between the bridge rails 352, 354, and deposit the tubular 60 onto the horizontal support 382. The horizontal lift system 374 can then transport the tubular 60 in a horizontal orientation from the horizontal support 382 to the horizontal storage area 376. The vertical supports 399 can be used to support the horizontal support 382 at an elevated height that allows the pipe handler 350 to access the horizontal support 382 to collect or deposit tubulars 60. It should be understood that the doping device (e.g., 384) can be used with any embodiment of a catwalk system (e.g., catwalk systems 140, 240, 290, 340, 390, 440) and can include one or more doping devices, for cleaning and doping the threads and shoulder of one or both ends of the tubulars 60. The doping devices (e.g., 384) can also be disposed in any orientation to accommodate cleaning and doping the ends of the tubulars 60 as the tubulars 60 are manipulated by pipe handlers.

Figure 22:
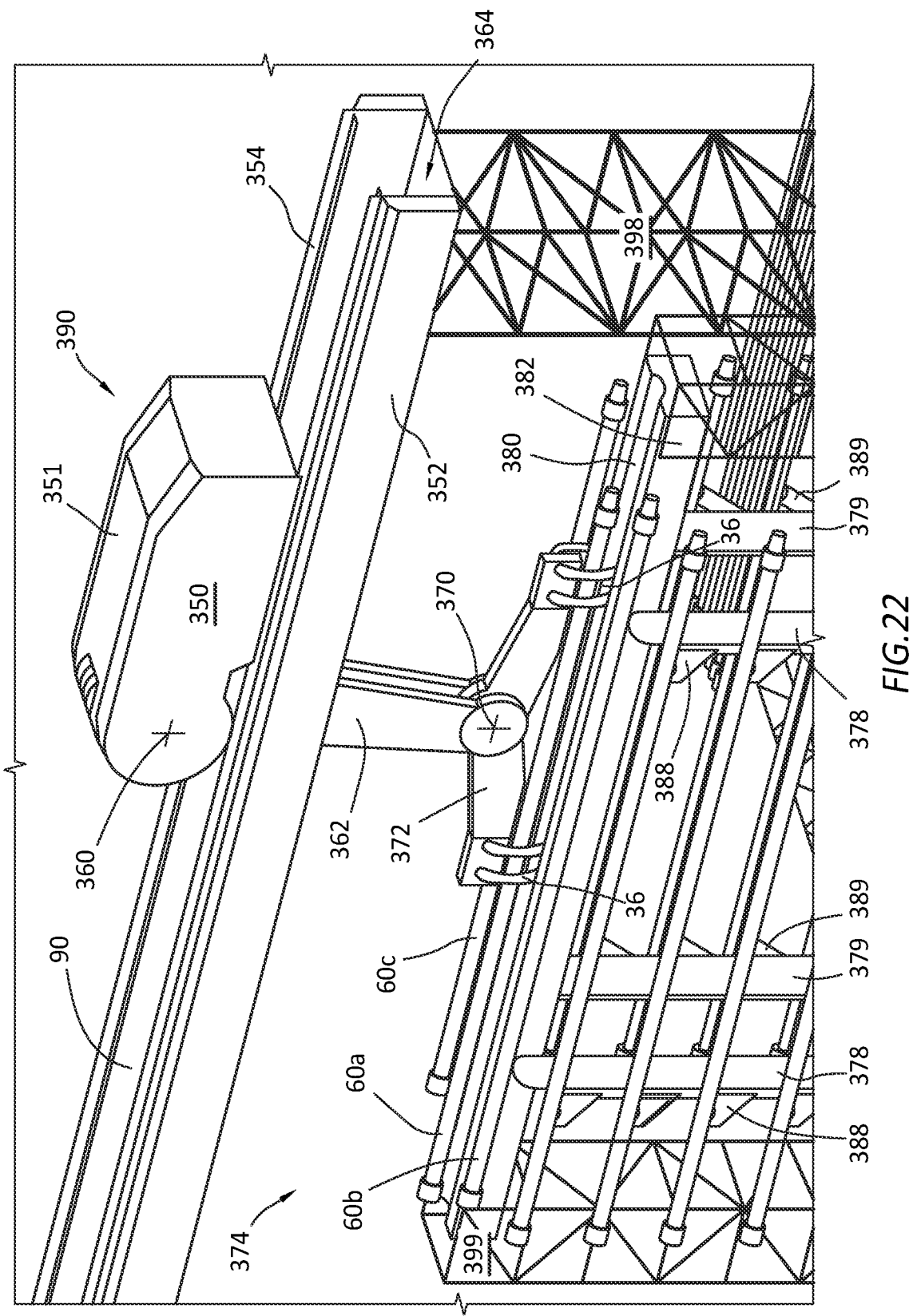

Referring to FIG. 22, this is a more detailed view of the interaction between the pipe handler 350 and the horizontal lift system 374. The horizontal lift system 374 can include a front horizontal lift 378 with lift actuators 388 that can raise and lower the tubulars 60 between the front portion of the horizontal storage area 376 and the horizontal support 382. The horizontal lift system 374 can also include a rear horizontal lift 379 with lift actuators 389 that can raise and lower the tubulars 60 between the rear portion of the horizontal storage area 376 and the horizontal support 382. The longitudinal groove 380 can be equipped with sensors to determine or measure various parameters of the tubulars 60 (e.g., weight, length, diameter, etc.). An arm 362 can be rotationally coupled to the body 351 at the pivot 360. An arm 372 can be rotationally coupled to the arm 362 at the pivot 370. The arm 372 can have spaced apart grippers 36 for engaging and gripping equipment, such as tubulars 60 (e.g., tubulars 60a, 60b, 60c). The arm 362 or grippers 36 can include sensors (e.g., ultrasonic sensors, LIDAR sensors, cameras, etc.) that can measure one or more parameters (e.g., inclination, diameter, length, etc.) of the tubular 60 (or other equipment) as the pipe handler 350 is positioned to engage and lift the tubular 60 (or other equipment).

When the tubular 60a is removed from a longitudinal groove 380 in the top of the horizontal support 382 by the pipe handler 350, a tubular 60b can be rolled into the longitudinal groove 380 from the front horizontal lift 378, or a tubular 60c can be rolled into the longitudinal groove 380 from the rear horizontal lift 379.

When the tubular 60a is being deposited in the longitudinal groove 380 by the pipe handler 350, a previously deposited tubular 60b can be rolled out of the longitudinal groove 380 to the front horizontal lift 378 for descending to the front portion of the horizontal storage area 376, or a previously deposited tubular 60c can be rolled out of the longitudinal groove 380 to the rear horizontal lift 379 for descending to the rear portion of the horizontal storage area 376.

Figure 23:
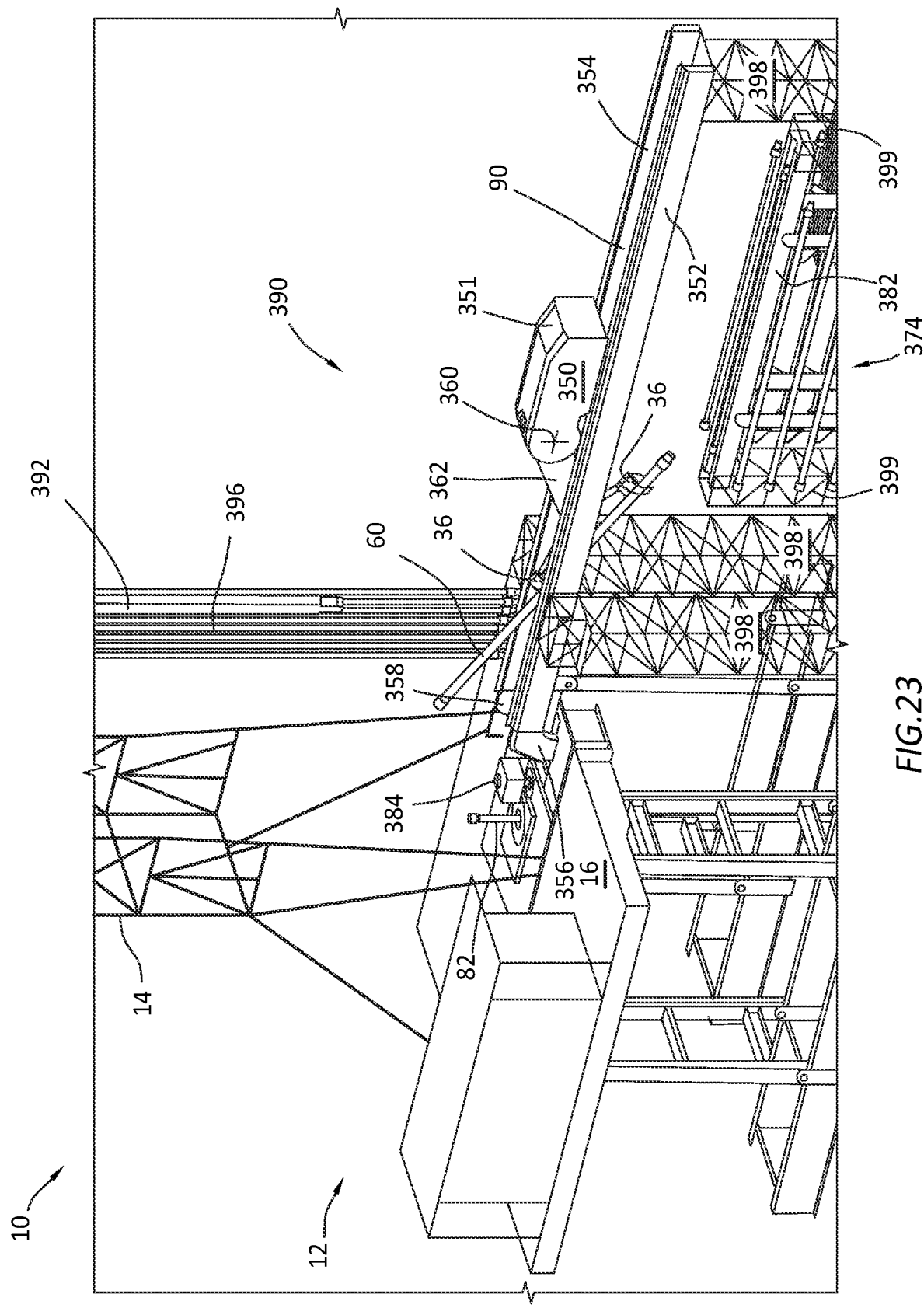

Referring to FIG. 23, the pipe handler 350 has engaged the tubular 60 in the longitudinal groove 380, lifted and rotated the tubular 60 into the space 364 between the bridge rails 352, 354, and transported the tubular 60 along the bridge 90 toward the well center 82.

Figure 24:
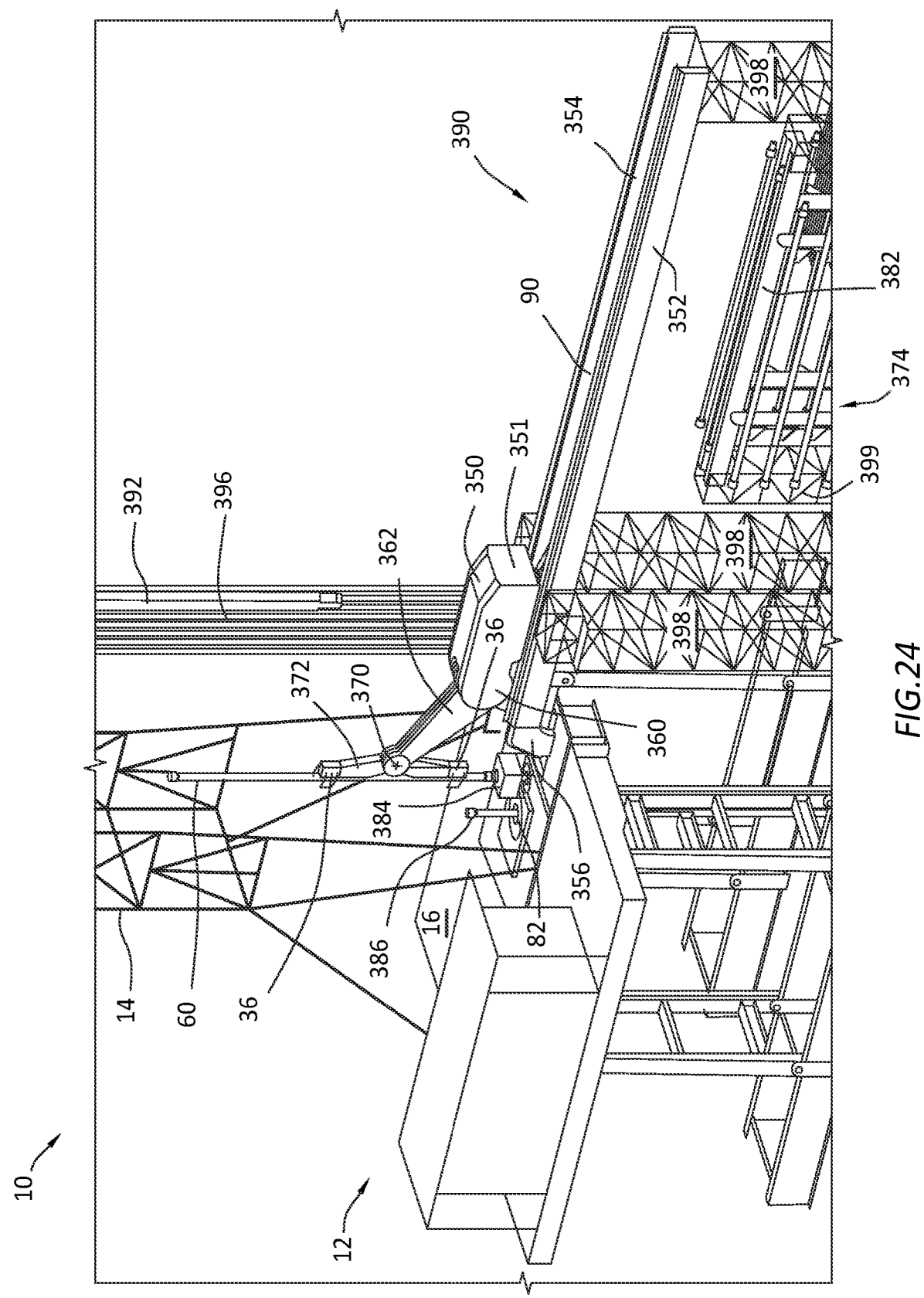

Referring to FIG. 24, the pipe handler 350 has lifted and rotated the tubular 60 to a vertical orientation and positioned the tubular 60 over the doping device 384. The pipe handler 350 can extend the lower end of the tubular 60 through the top of the doping device 384 and rotate the tubular 60 while the doping device deposits dope onto the threads of the end of the tubular 60. This figure is showing how one end (e.g., a pin end) of the tubular 60 can be doped before being connected to the tubular string 386 at the well center 82. After the end is doped (if doping is desired), the pipe handler 350 can move the tubular 60 to a vertical orientation above the tubular string 386 and spin the tubular into a connection to the top end of the tubular string 386. It should be understood that the operations described above regarding FIGS. 22-24 can be reversed to trip the tubular string 386 out of the wellbore at well center 82.

Figure 25:
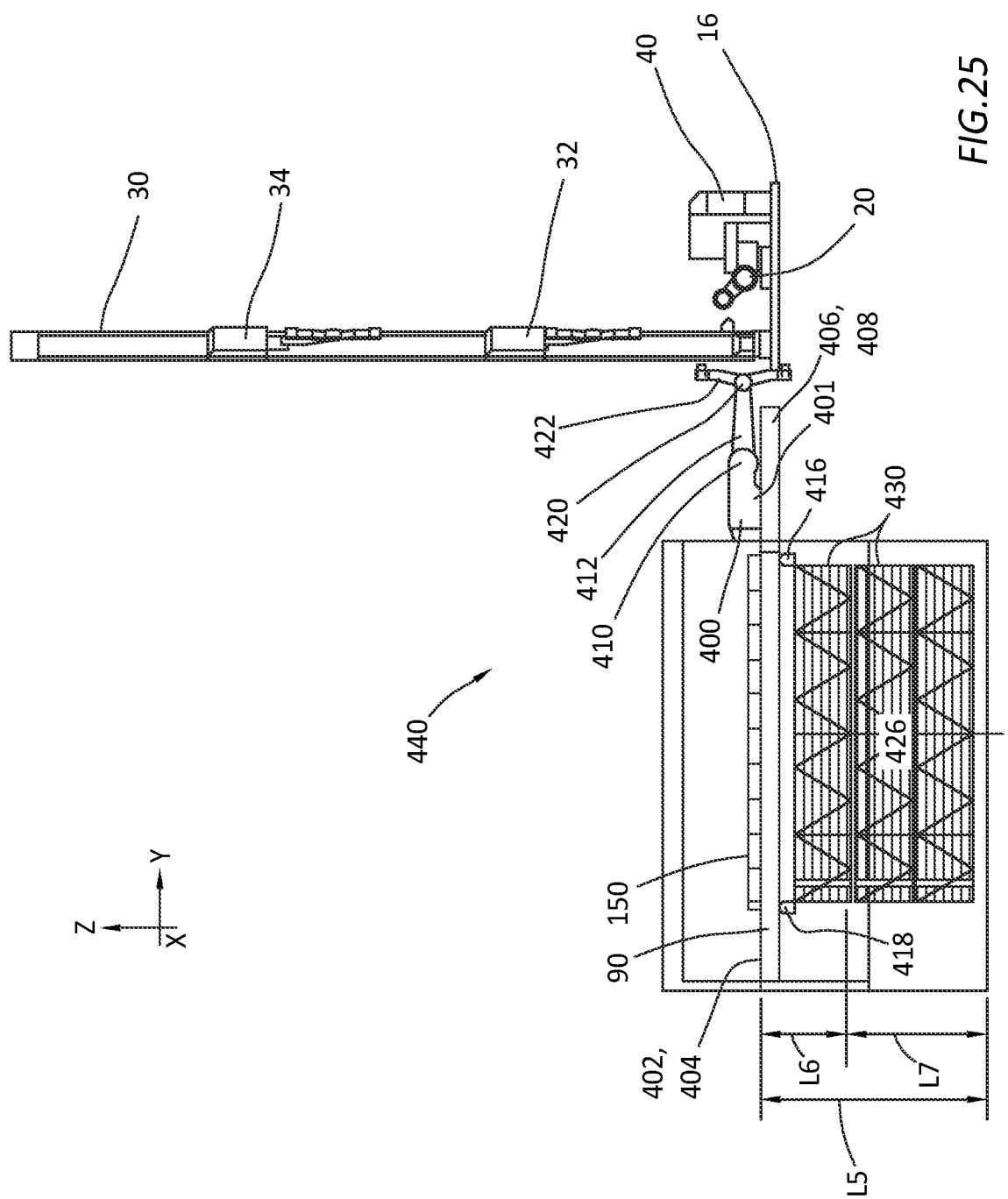
FIG. 25 is a representative side view of a pipe handler operating along a horizontal bridge over a deep horizontal storage area, where the bridge can extend toward a well center, in accordance with certain embodiments.

FIG. 25 is a representative side view of catwalk system 440 that can include a pipe handler 400 operating along a horizontal bridge 90 over a deep horizontal storage area 426, where the bridge 90 can be extended toward and retracted from a well center 82. The catwalk system 440 can be used to transport (via the pipe handler 400) tubulars 60 or other equipment (e.g., tools, subs, etc.) between the horizontal storage area 426 and the rig floor 16. The pipe handler 400 can receive or hand off the tubulars or equipment to other equipment on the rig floor 16, such as pipe handlers 32, 34 on a vertical support structure 30 which is rotationally attached to the rig floor 16, or a drill floor robot 20, or an iron roughneck 40, or a top drive (not shown), or an elevator (not shown), or other pipe handling equipment.

The pipe handler 400 is similar to the pipe handler 100 in FIGS. 1-10 and can similarly interface with a shuttle 150. The pipe handler 400 can include a body 401 that is moveably coupled to bridge rails 402, 404 (and bridge rail extensions 406, 408 if bridge rail extensions are used) and can move in a Y-direction along the bridge 90. The bridge 90 can be moveably coupled to guide rails 416, 418 and can move in an X-direction along the guide rails 416, 418 as well as in the Y-direction relative to the guide rails 416, 418. The pipe handler 400 can include an arm 412 that is rotationally coupled to the body 401 at a pivot 410, and an arm 422 that is rotationally coupled to the arm 412 at a pivot 420, with the arm 422 having a gripper 36 positioned at opposite ends. These grippers 36 can be used to engage tubulars 60 as well as other equipment (e.g., tools, subs, etc.) and manipulate the equipment about the horizontal storage 426 and the rig floor 16. The arm 412 or grippers 36 can include sensors (e.g., ultrasonic sensors, LIDAR sensors, cameras, etc.) that can measure one or more parameters (e.g., inclination, diameter, length, etc.) of the tubular 60 (or other equipment) as the pipe handler 400 is positioned to engage and lift the tubular 60 (or other equipment).

Referring to FIGS. 26A, 26B, some horizontal storage areas, like the horizontal storage area 426 may have tubulars stored at a depth that is inaccessible by the pipe handler 400, directly. The depth L6 below the bridge 90 that is accessible by the grippers 36 is limited by the length L8 of the arm 412. If the depth L5 of the horizontal storage area 426 is deeper than the accessible depth L6, then equipment, such as tubulars 60 and other equipment, stored in the depth indicated by depth L7, is inaccessible to the pipe handler 400, directly. The current catwalk system 440 can include crane lifts 452, 454, with the crane lift 452 positioned proximate the guide rail 418 and the crane lift 454 positioned proximate the guide rail 416. The crane lifts 452, 454 can be used to lift tubular baskets 430 or other equipment baskets to a depth in the horizontal storage area 426 that is accessible by the pipe handler 400. Therefore, by using the crane lifts 452, 454, the full capacity of the horizontal storage area 426 can be utilized, even if the depth L5 is deeper than the accessible depth L6. The equipment baskets 430 can include crane attachment points 434, 436 for attaching to the crane lifts 452, 454, respectively.

FIGS. 27A-27C are representative end views of a pipe handler operating along a horizontal bridge 90 and the bridge 90 operating along guide rails 416, 418 over a deep horizontal storage area 426, with the bridge 90 including a crane 452, 454 for lifting tubular baskets 430 to a depth accessible by the pipe handler 400.

Referring to FIG. 27A, an end view of the horizontal storage area 426 and the catwalk system 440 illustrates tubular baskets 430 stored in the horizontal storage area 426 below an accessible depth, and additional tubular baskets 430' stored beside the deep storage area of the horizontal storage area 426. The tubular baskets 430' may be directly accessible by the pipe handler 400 since the guide rails 416, 418 extend over the area the baskets 430' are stored and the baskets 430' are within an accessible depth by the pipe handler 400. The ends 456, 458 of the bridge 90 are coupled to the respective guide rails 416, 418. However, the tubular baskets 430, 432 in the horizontal storage area 426 are not yet accessible by the pipe handler 400, directly. If it is desired to utilize tubulars (or other equipment) from one of the baskets in the horizontal storage area 426, then the crane lifts 452, 454 can be connected to the desired basket (e.g., basket 432) to lift the basket 432 (arrows M14) from its storage location to a carrying location near the bridge 90 (see FIG. 27B).

Referring to FIG. 27C, the basket 432 has been raised to the carrying position just below the bridge 90 and carried in the X-direction to a position above the supports 460, 462. The basket 432 can then be lowered by the crane lifts 452, 454 to allow the basket 432 to rest on the supports 460, 462, and the crane lifts 452, 454 disengaged (if desired) from the basket 432 to allow the pipe handler 400 to move relative to the basket 432 as it accesses the storage area within the basket 432. The supports 460, 462 are positioned at a depth in the horizontal storage area 426 that allows the pipe handler 400 to access all equipment stored in the basket 432, such as tubulars, tools, subs, etc. When the basket 432 is empty (or another basket is desired), the catwalk system 440, via the use of the crane lifts 452, 454 can lift the basket 432 off of the supports 460, 462, carry the basket 432 to another storage location out of the way of another desired basket 430, and then, via the crane lifts 452, 454, move the next desired basket 430 to rest on the supports 460, 462. This allows the catwalk system 440 to access the full storage space in the horizontal storage area 426, without deploying a crane that is separate from the bridge 90.

It should be understood that the pipe handler 400 can access the storage area within the basket 432 while the basket 432 is suspended by crane lifts 452, 454 to retrieve equipment from or store equipment in the basket 432 storage area. It is not required that the basket 432 be deposited onto the supports 460, 462 to retrieve equipment from or store equipment in the basket 432 storage area. For example, if a basket 432 contained only a BHA 64, then the crane lifts 452, 454 can engage the basket 432 in the horizontal storage area 18, lift the basket 432 up to a position just below the bridge 90, while moving the bridge 90 to the desired location the pipe handler 400 can access the basket 432 storage area, engage the BHA 64, lift the BHA 64 from the storage area, rotate the BHA 64 through the space 414 between the bridge rails 402, 404, and deliver the BHA to another pipe handler (e.g., top drive, elevator, pipe handlers 32, 34) or the rig floor 16, then lower the basket 432 back to a storage location in the horizontal storage area 18.

Figure 28:
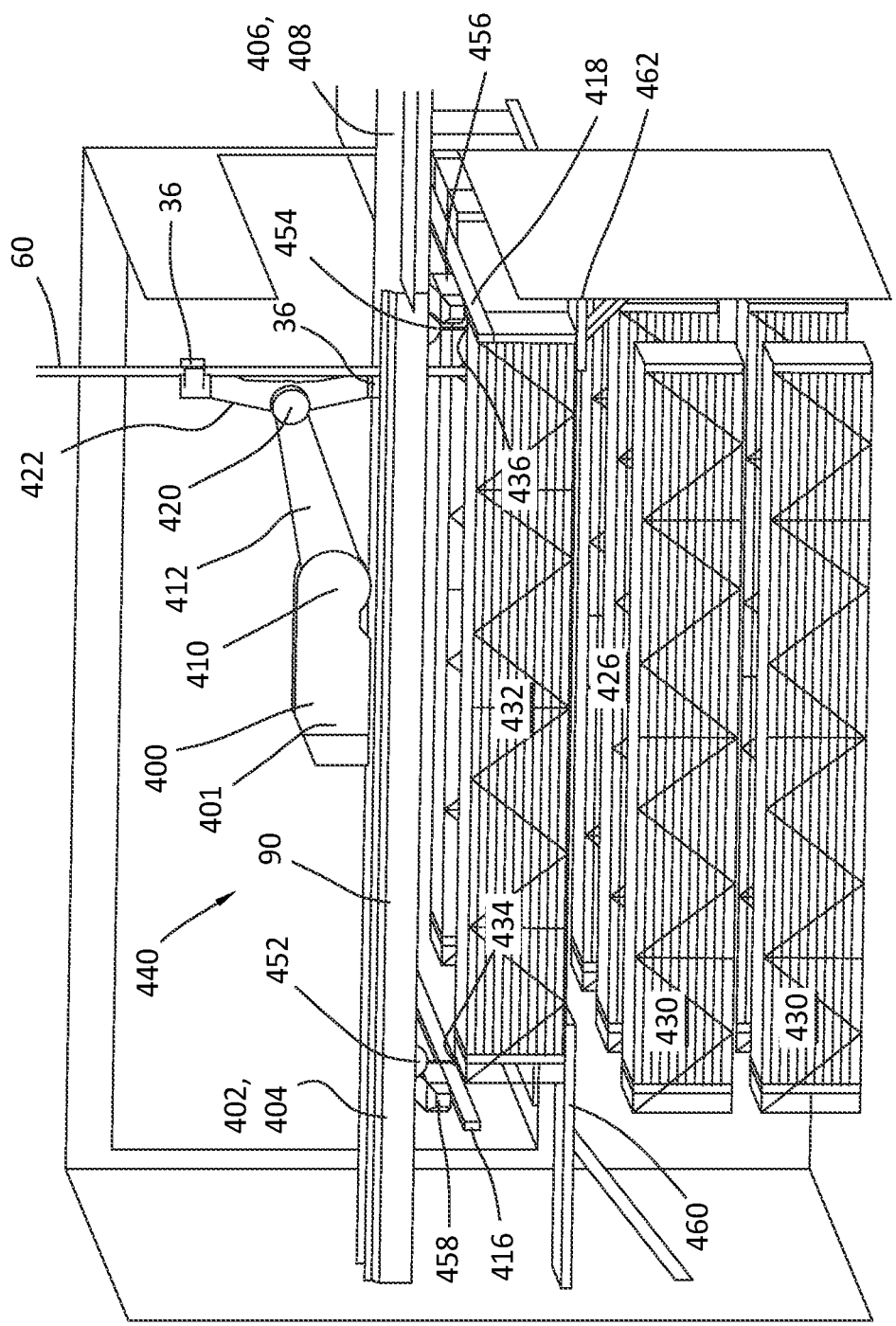
FIG. 28 is a representative perspective view of a pipe handler operating along a horizontal bridge and the bridge operating along guide rails over a deep horizontal storage area, where a portion of the bridge can extend to a well center in a rig floor, in accordance with certain embodiments.

FIG. 28 is a representative perspective view of a catwalk system 440 that can include a pipe handler 400 operating along a horizontal bridge 90 with the bridge rails 402, 404 of the bridge 90 operating along guide rails 416, 418 over a deep horizontal storage area 426, where bridge rail extensions 406, 408 of the bridge 90 can extend to a well center 82 in a rig floor 16. FIG. 28 illustrates the basket 432 positioned on the supports 460, 462. The basket 432 is also shown still attached to the crane lifts 452, 454, by crane connections 434, 436, respectively, as the pipe handler 400 works at collecting tubulars 60 from the basket 432, or depositing tubulars 60 into the basket 432. When the basket 432 is emptied or full, the crane lifts 452, 454 can lift the basket 432 from the supports 460, 462, deposit it in the horizontal storage area 426, and if desired, pick up another basket to position on the supports 460, 462. It should be understood that the crane lifts 452, 454 can be detached from the basket 432 while the pipe handler 400 is accessing the storage space in the basket 432. It should also be understood that the crane lifts 452, 454 can remain attached to the basket 432 while the pipe handler 400 is accessing the storage space in the basket 432.

As similarly described in FIGS. 1-10, the bridge 90 can include bridge rails 402, 404 that are coupled to the guide rails 416, 418, by bridge ends 456, 458, respectively. The ends 456, 458 are moveably coupled to the respective guide rails 416, 418 and can transport the bridge 90 along the guide rails 416, 418 in the X-direction over the horizontal storage area 426. In certain embodiments, the bridge 90 can also include bridge rail extensions 406, 408 that allow the bridge 90 to be extended to the well center 82. It should be understood that ends of the bridge rails 402, 404, and the extensions 406, 408 can extend past the bridge ends 456, 458 as illustrated. Similar to the other pipe handlers, the pipe handler 400 can include a body 401 moveably coupled to the bridge 90 to transport the pipe handler 400 in a Y-direction along the bridge 90. The pipe handler 400 can also include the arm 412 rotationally coupled to the body 401 at pivot 410, and the arm 422 rotationally coupled to the arm 412 at pivot 420, with grippers positioned at opposite ends of the arm 422 which can engage equipment, such as tubulars, tools, subs, etc. The arms 412, 422 can be rotated to lift and rotate a tubular 60 to transport the tubular 60 between the basket 432 and the well center 82 (or another pipe handler including an iron roughneck 40, a drill floor robot 20, pipe handlers 32, 34, etc.).

Figure 29A:
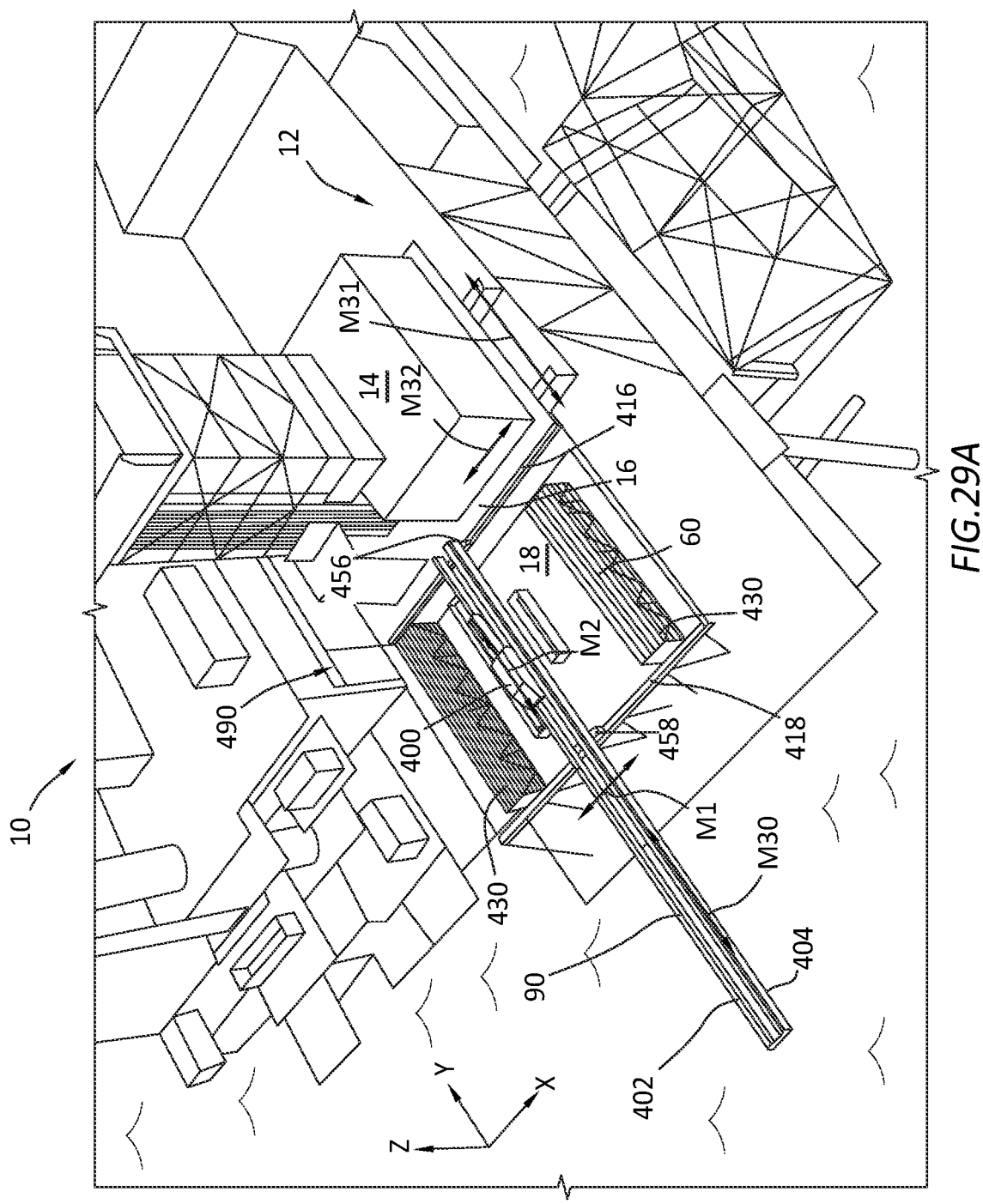
FIGS. 29A-29B are representative perspective views of a pipe handler operating along a horizontal bridge, the bridge operating along guide rails over a horizontal storage area, and the bridge moveable in an X-Y plane to accommodate movements of a rig floor, in accordance with certain embodiments.

Referring to FIG. 29A, the catwalk system 490 can include a pipe handler 400 operating along a bridge 90 with bridge rails 402, 404. In this example, the derrick 14 is moveable in the X direction (arrows M32) and the Y direction (arrows M31) relative to the platform 12 and the horizontal storage area 18. The bridge 90 is coupled to the guide rails 416, 418 through ends 456, 458, respectively. The ends 456, 458 are moveable along the respective guide rails 416, 418 in the X-direction (arrow M1). The pipe handler 400 is moveable along the bridge 90 in the Y-direction (arrows M2). The bridge 90 can be moveable in the Y-direction (arrows M30) relative to the guide rails 416, 418, and the ends 456, 458. Therefore, if the derrick 14 moves in the Y-direction (arrows M31), then, with the bridge rails 402, 404 can be moved in the Y-direction (arrows M30) to maintain access to the rig floor 16. In this example, the guide rail 416 is rigidly attached to the rig floor 16, and therefore, moves with the derrick 14. As the derrick 14 is moved in the Y-direction away from the horizontal storage area 18, then the bridge 90 can be extended in the Y-direction toward the derrick 14 to maintain the coupling of the bridge 90 with the end 456. If the derrick 14 moves in the X-direction, then the bridge 90 can be moved along the guide rails 416, 418 as needed to access the desired location at or above the rig floor 16. The bridge 90 can be coupled to the end 456, such that when the derrick 14 moves, the bridge 90 will move with it (e.g., the derrick 14 will push or pull the bridge 90 as the derrick 14 moves in the Y-direction). Alternatively, or in addition to, the bridge 90 can actively control its position relative to the end 456 to maintain the coupling with the end 456.

The pipe handler 400 can access equipment in the horizontal storage area 18 (e.g., equipment in baskets 430), transport the equipment along the bridge 90 to the rig floor 16 where the pipe handler 400 can hand-off the equipment as in the other embodiments (such as hand-off to pipe handlers 32, 34, top drive, elevator, rig floor, storage bins, etc.) in any of vertical, inclined, or horizontal orientations. The bridge rails 402, 404 can be configured to allow for extension of the bridge 90 over the rig floor to access the well center 82, which means that the bridge 90 would extend over the end 456 and be cantilevered over the rig floor 16.

Figure 29B:
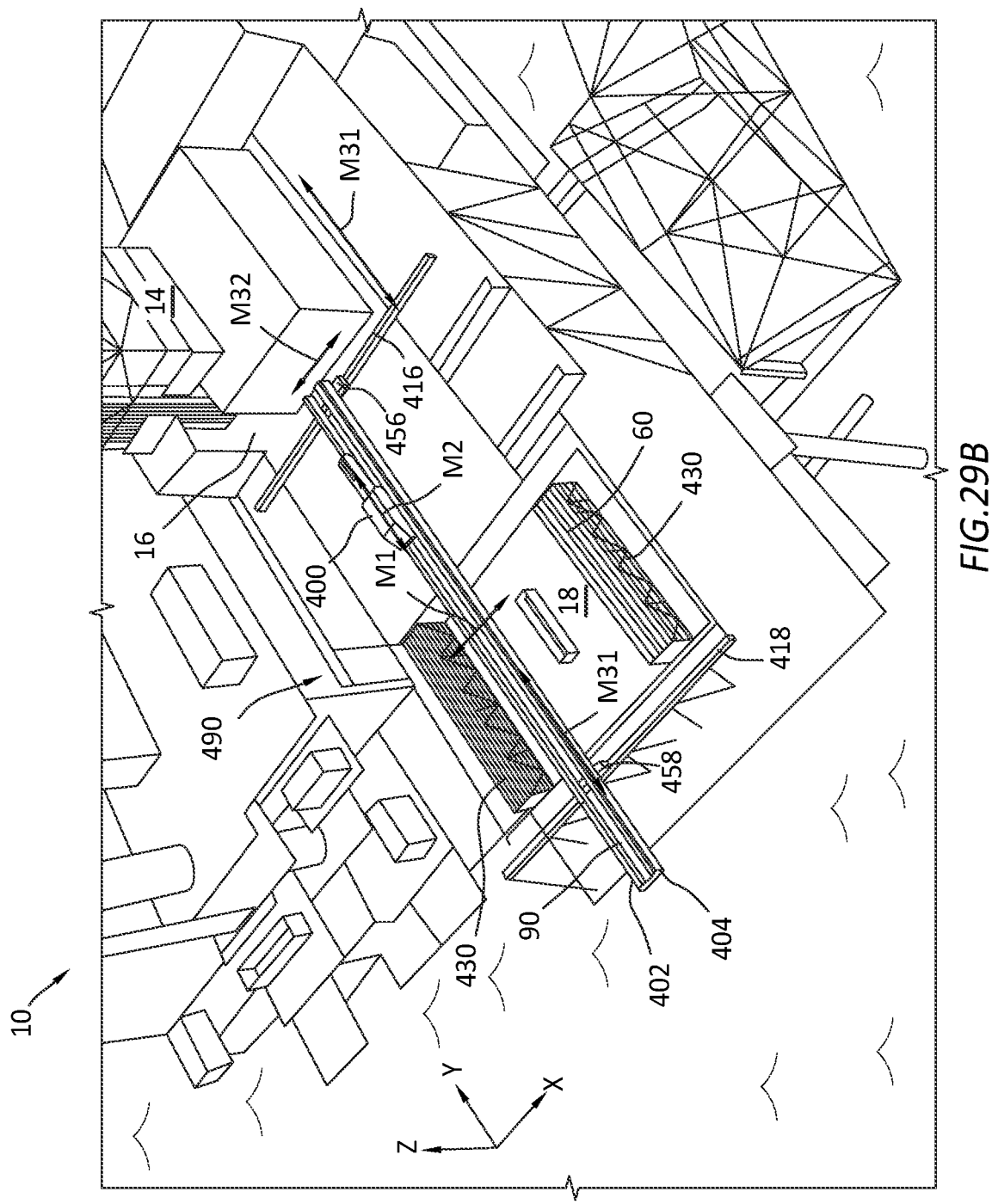

Referring to FIG. 29B, the derrick 14 has been moved in the Y-direction (arrows M31) away from the horizontal storage area 18, with the guide rail 416 moving with the derrick 14. The length of the bridge 90 that extended past the guide rail 418 has been reduced to compensate for the extension length of the bridge 90 toward the derrick 14. The bridge 90 has been adjusted toward the derrick 14 (arrows M31) to span the distance between the horizontal storage area 18 and the rig floor 16. The derrick 14 has also been moved in the X-direction (arrows M32), and the bridge 90 can be moved along the guide rails 416, 418 to accommodate X-direction movements of the derrick 14. This bridge configuration works well unless the rig is enclosed with walls and a roof to protect the rig and its equipment from a harsh environment. In this case, the bridge 90 may not be allowed to extend very far past the guide rail 418, which is different than in FIG. 29A, where there are no obstructions outside the guide rail 418. In the configuration with the enclosed rig 10, the bridge may include one or more pairs of bridge rail extensions.

Referring to FIG. 30A, the catwalk system 440 has the pipe handler 400 moved to a position proximate the end of the bridge rails 402, 404 closest to the well center 82. The bridge rail extensions 406, 408 are fully retracted into the bridge rails 402, 404, which might be the position needed when the pipe handler 400 is accessing the storage space within the basket 432, which has been positioned on the supports 460, 462. The shuttle 150 is stowed at the storage position 120. The ends 456, 458 have moved the bridge 90 in line with the well center 82 or in line with a hand-off position for handling equipment to another pipe handler operating over the rig floor 16. This allows the bridge 90 to be extended toward and retracted from the well center 82, without requiring the bridge 90 to extend very far past the guide rail 418 (reference to the FIG. 30A) when the bridge 90 is retracted from the well center 82.

Figure 30B:
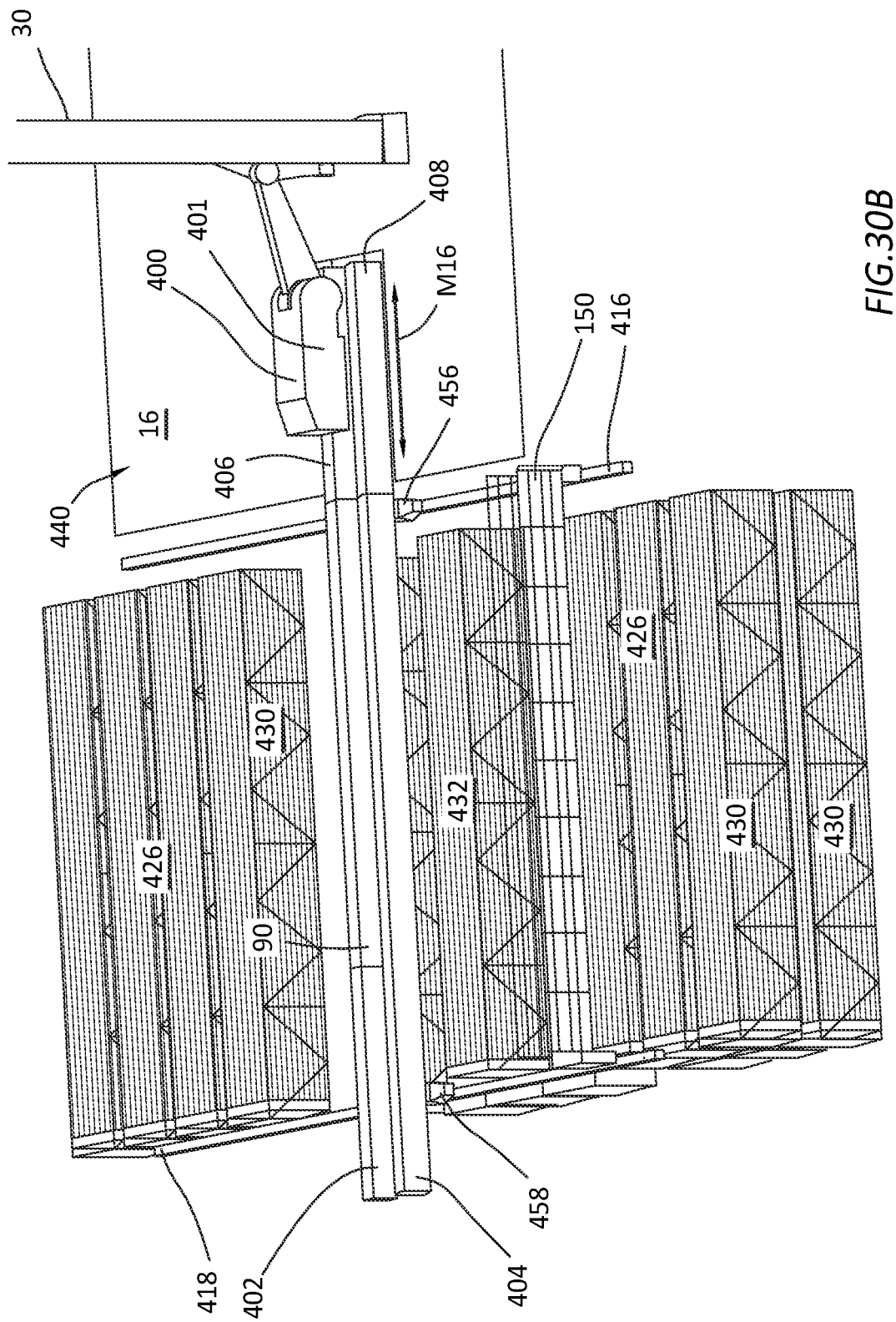

Referring to FIG. 30B, the catwalk system 440 has extended the bridge rail extensions 406, 408 (arrows M16) by an appropriate distance to deliver or retrieve equipment (e.g., a tubular 60) from the well center 82, or from another pipe handler. The bridge rail extensions 406, 408 can be extended or retracted as needed to allow the pipe handler 400 to access the well center or the horizontal storage area 426. Even though it may be preferred to have the bridge rail extensions 406, 408 retractable from the rig floor 16, it should be understood that the bridge rail extensions 406, 408 can be attached to an end of the bridge rails 402, 404 such that they are not retractable. They can be removably attached to the rig floor 16 and the respective bridge rails 402, 404. This will also allow the pipe handler 400 to access the rig floor area, but the bridge rail extensions 406, 408 would occupy precious space on the rig floor 16 even when the pipe handler 400 is not transported onto the bridge rail extensions 406, 408.

Figure 31:
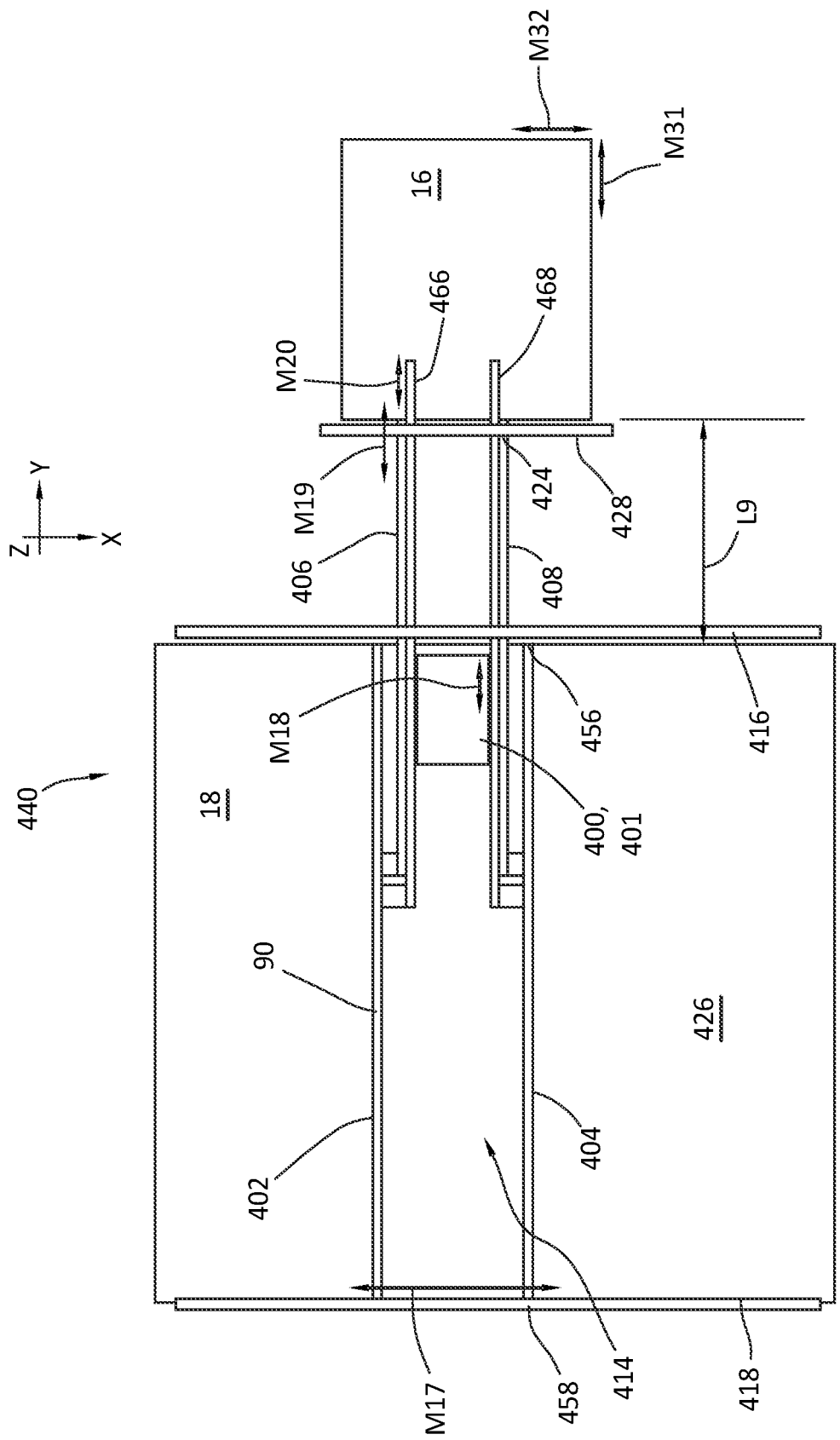
FIGS. 31-33 are representative top views of a pipe handler operating along a horizontal bridge, with the bridge including two pairs of bridge extensions for extending the reach of the pipe handler to a well center on a rig floor, in accordance with certain embodiments.
Figure 32:
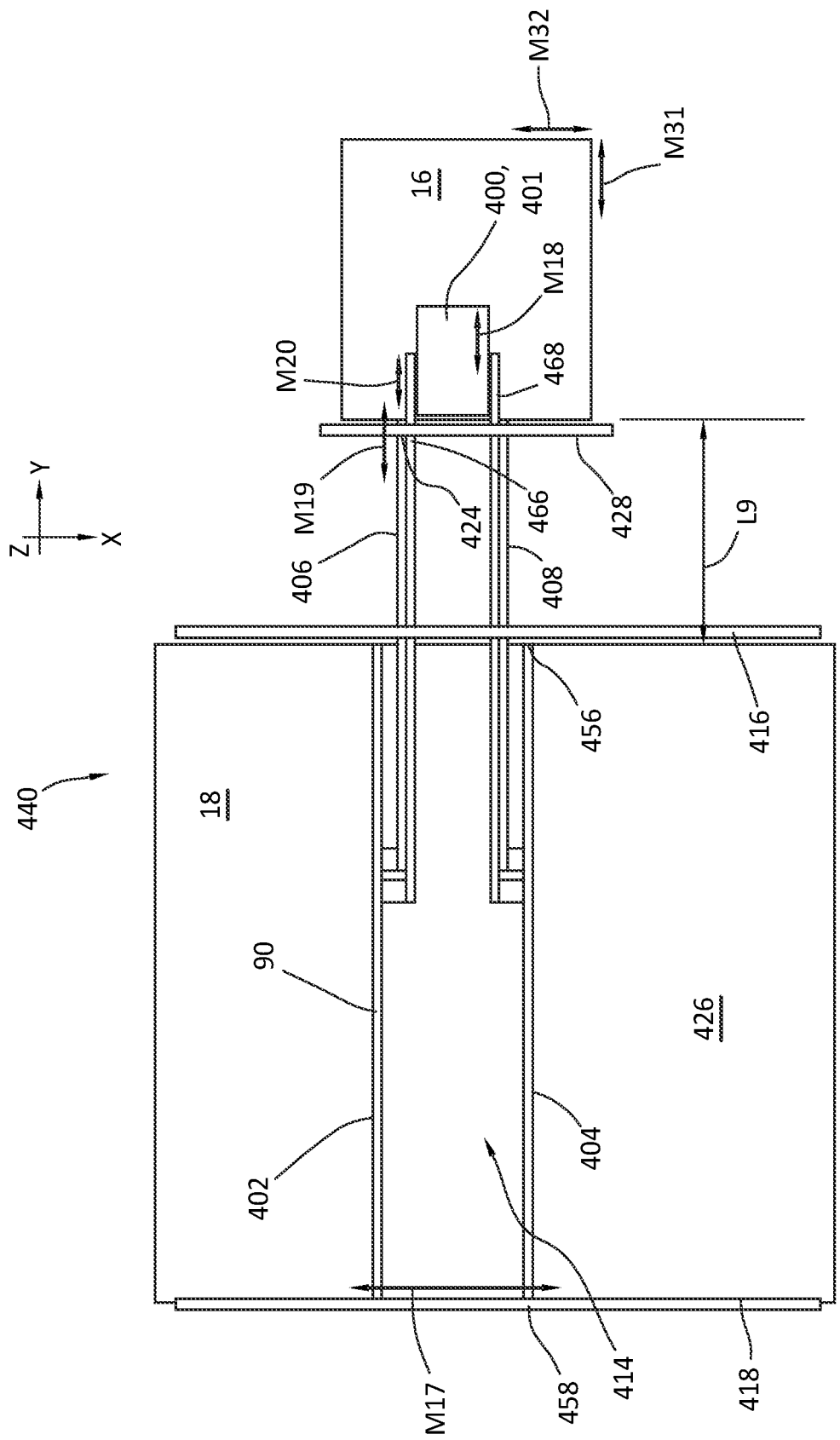
Figure 33:
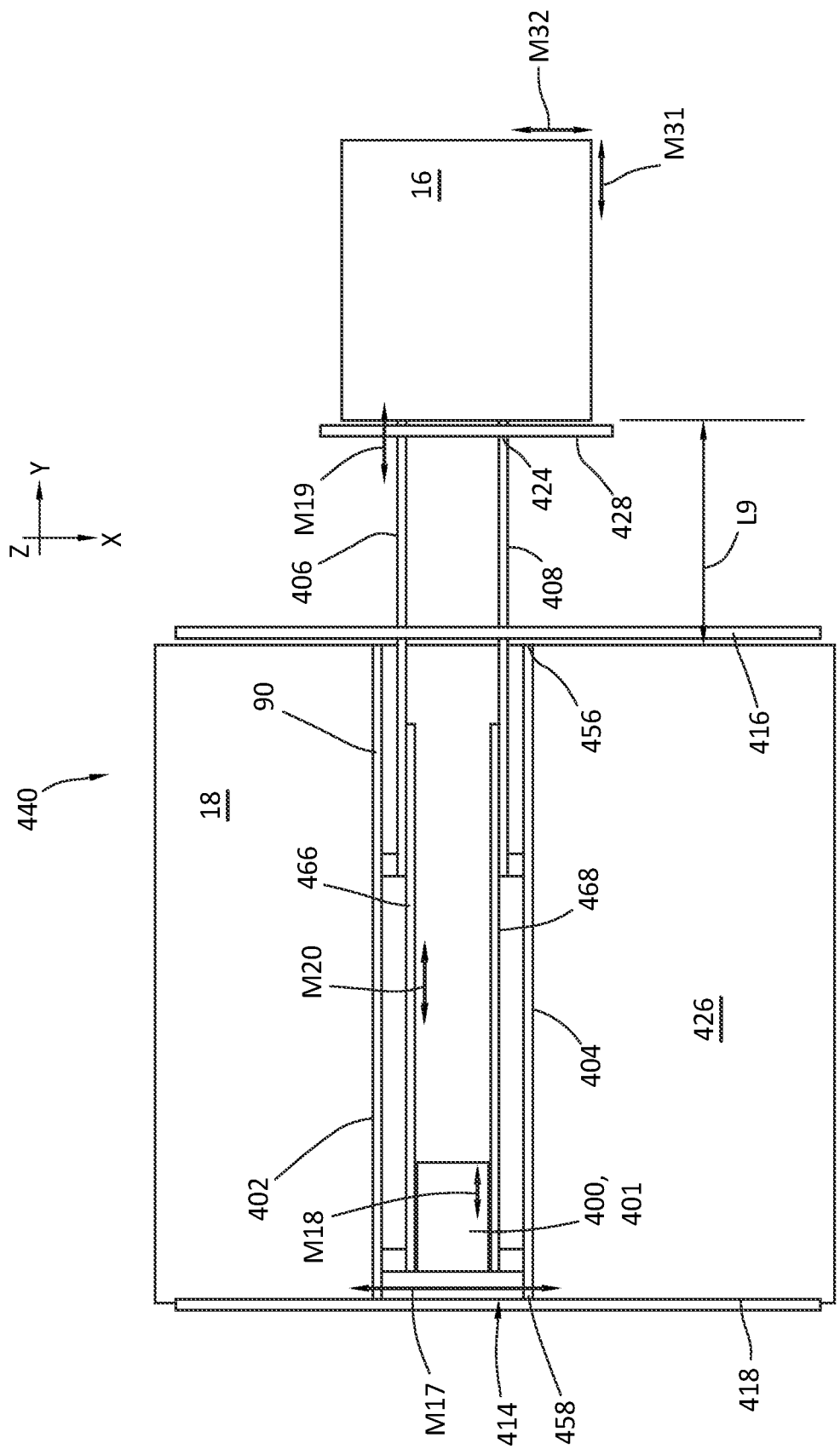

FIGS. 31-33 are representative top views of catwalk system 440 that can include a pipe handler 400 operating along a horizontal bridge 90, with the bridge 90 including first bridge rail extensions 406, 408 and second bridge rail extensions 466, 468 for extending access of the pipe handler 400 to the rig floor 16, well center 82, and the horizontal storage area 426. The first bridge rail extensions 406, 408 are moveably coupled to the respective bridge rails 402, 404 and are configured to move in the Y-direction (arrows M19) within the space 414 between the bridge rails 402, 404. When the catwalk system 440 is installed to the well site, it may be preferred that the first bridge rail extensions 406, 408 be extended a distance L9 to allow the bridge rail extensions 406, 408 to be coupled to an end 424 (similar to ends 456, 458) that is moveably coupled to the guide rail 428. If the rig floor 16 moves in the X-direction (arrows M31), then the bridge rail extensions 406, 408 can be moved along the bridge rails 402, 404 to compensate for the movement of the rig floor 16 in the X-direction.

The bridge rails 402, 404 can be moveably coupled at one end 458 to a guide rail 418 and at an opposite end 456 to a guide rail 416. The ends 456, 458, 424 coupled to respective guide rails 416, 418, 428 allow the bridge 90 to move in the X-direction over the horizontal storage area 18 and over the space L9 that separates the horizontal storage area 18 and the rig floor 16. With the bridge rails 402, 404 positioned over the horizontal storage area 18 and the bridge rail extensions 406, 408 slidably coupled to the bridge rails 402, 404 and coupled to the rig floor 16 via the guide rail 428, the pipe handler 400, via movement of the second bridge rail extensions 466, 468 along the bridge rails 402, 404 and movement of the pipe handler 400 along the second bridge rail extensions 466, 468, the pipe handler 400 can access the full width of the horizontal storage area 18 and the rig floor 16. The bridge 90 can move along guide rails 416, 418, 428 in the X-direction (arrows M17) to access the full length of the horizontal storage area 426.

In FIG. 31, the body 401 of the pipe handler 400 has been moved to a right side of the horizontal storage area 18 (or horizontal storage area 426), the first bridge rail extensions 406, 408 have been extended a distance L9 past the horizontal storage area 18 to couple to the rig floor 16 via the guide rail 428. The second bridge rail extensions 466, 468 have been extended over the rig floor a desired distance to support access to the rig floor 16 by the pipe handler 400.

Referring to FIG. 32, the pipe handler 400 has been moved to the end of the second bridge rail extensions 466, 468 to access areas on the rig floor 16 (e.g., well center 82, another pipe handler, tool storage, etc.)

Referring to FIG. 33, the second bridge rail extensions 466, 468 have been moved along the bridge rails 402, 404 to a left side of the horizontal storage area 18, and the pipe handler 400 has been moved to the left end of the second bridge rail extensions 466, 468. As can be seen, this configuration of extendable bridge rail extensions 406, 408, 466, 468 can allow the pipe handler 400 to access the full horizontal storage area 426 and areas on the rig floor 16, even with the rig floor being moveable in the X and Y directions.

Various Embodiments

Embodiment 1. A pipe handling system comprising: a bridge disposed in an inclined position, the bridge comprising first and second rails with a space therebetween; and an arm coupled to the first and second rails, the arm being configured to manipulate a tubular through the space between the first and second rails.

Embodiment 2. The system of embodiment 1, wherein the arm comprises one or more sensors that measure one or more parameters of the tubular, and wherein the parameters comprise weight, length, diameter, tubular damage, inclination, or combinations thereof.

Embodiment 3. The system of embodiment 1, wherein the bridge is inclined from a horizontal storage area to a rig floor.

Embodiment 4. The system of embodiment 3, wherein the rig floor is vertically elevated relative to the horizontal storage area.

Embodiment 5. The system of embodiment 1, wherein the arm is configured to manipulate the tubular through the space while moving along the bridge.

Embodiment 6. The system of embodiment 1, wherein an actuator is configured to rotate the bridge between a horizontal position and the inclined position.

Embodiment 7. The system of embodiment 1, wherein the bridge further comprises first and second extension rails which are configured to extend the bridge above a rig floor.

Embodiment 8. The system of embodiment 7, wherein the first and second extension rails extend to increase a length of the bridge or retract to decrease the length of the bridge.

Embodiment 9. The system of embodiment 7, wherein the first and second extension rails rotate between a stowed position, which decreases a length of the bridge, and a deployed position, which increases the length of the bridge.

Embodiment 10. The system of embodiment 7, wherein the first and second extension rails are rigidly attached to an end of the first and second rails, respectively, to increase a length of the bridge.

Embodiment 11. The system of embodiment 1, wherein the bridge is disposed in a cutout in a rig floor.

Embodiment 12. The system of embodiment 1, further comprising a shuttle that is slidably coupled to the bridge, wherein the shuttle is configured to carry large, bulky, or oddly shaped equipment along the bridge to and from a rig floor.

Embodiment 13. The system of embodiment 12, wherein the shuttle is slid along the bridge via a cable drive system.

Embodiment 14. The system of embodiment 12, wherein the shuttle is coupled to the arm, and wherein the shuttle is slid along the bridge via movement of the arm along the bridge.

Embodiment 15. The system of embodiment 1, wherein a horizontal storage area further comprises a tubular lift, and wherein the tubular lift hoists a tubular from a horizontal orientation to an inclined orientation.

Embodiment 16. A pipe handling system comprising: a bridge disposed in an inclined position from a horizontal storage area to a rig floor; a tubular lift positioned in the horizontal storage area and configured to rotate a tubular between a horizontal orientation and an inclined orientation; and an arm coupled to the bridge and configured to move along the bridge, wherein the arm is configured to engage the tubular in the inclined orientation and lift the tubular from the tubular lift or configured to deliver the tubular to the tubular lift in the inclined orientation.

Embodiment 17. The system of embodiment 16, wherein the tubular lift comprises one or more sensors that measure one or more parameters of the tubular.

Embodiment 18. The system of embodiment 17, wherein the one or more parameters comprise weight, length, diameter, tubular damage, inclination, or combinations thereof.

Embodiment 19. The system of embodiment 16, wherein the arm comprises one or more sensors that measure one or more parameters of the tubular, and wherein the parameters comprise weight, length, diameter, tubular damage, inclination, or combinations thereof.

Embodiment 20. A method for conducting a subterranean operation, the method comprising: gripping a tubular in a horizontal storage area via an arm coupled to a bridge, the bridge comprising first and second rails with a space therebetween; lifting the tubular from the horizontal storage area and through the space; and moving the tubular along the bridge via the arm, with the bridge being inclined from the horizontal storage area to a rig floor.

Embodiment 21. The method of embodiment 20, further comprising delivering the tubular, via the arm, to a well center on the rig floor in a vertical orientation.

Embodiment 22. The method of embodiment 21, further comprising spinning the tubular to: connect the tubular to a tubular string at the well center; or connect the tubular to a top drive.

Embodiment 23. The method of embodiment 21, further comprising: stabbing the tubular into a stickup at the well center; or stabbing the tubular into a top drive; or handing the tubular to another pipe handler; or storing the tubular in a vertical storage location on the rig floor.

Embodiment 24. The method of embodiment 20, further comprising lifting the tubular through the space while moving the tubular along the bridge.

Embodiment 25. The method of embodiment 20, wherein the arm comprises a plurality of grippers, and the method further comprises gripping the tubular with the plurality of grippers.

Embodiment 26. A method for handling a tubular comprising: gripping a tubular at a well center on a rig floor via an arm coupled to a bridge, the bridge comprising first and second rails with a space therebetween; moving the tubular from the well center and through the space; and moving the tubular along the bridge via the arm, with the bridge being inclined from a horizontal storage area to the rig floor.

Embodiment 27. The method of embodiment 26, further comprising delivering the tubular, via the arm, to the horizontal storage area in a horizontal orientation.

Embodiment 28. The method of embodiment 27, further comprising spinning the tubular to: disconnect the tubular from a tubular string at the well center; or disconnect the tubular from a top drive.

Embodiment 29. The method of embodiment 27, further comprising: retrieving the tubular from another pipe handler; or retrieving the tubular from a vertical storage location on the rig floor.

Embodiment 30. The method of embodiment 26, further comprising moving the tubular through the space while moving the tubular along the bridge.

Embodiment 31. The method of embodiment 26, wherein the arm comprises a plurality of grippers, and the method further comprises gripping the tubular with the plurality of grippers.

Embodiment 32. A catwalk system comprising: a bridge disposed within a horizontal storage area and coupled to a guide rail; an equipment basket contained within the horizontal storage area, with the equipment basket having an internal storage area; a crane coupled to the bridge, the crane being configured to transport the equipment basket between a first location and an elevated location in the horizontal storage area; and a pipe handler coupled to the bridge and configured to move along the bridge.

Embodiment 33. The system of embodiment 32, wherein the pipe handler is configured to access the internal storage area of the equipment basket.

Embodiment 34. The system of embodiment 32, wherein the pipe handler is configured to collect equipment from the internal storage area or deposit the equipment into the internal storage area.

Embodiment 35. The system of embodiment 34, wherein the equipment comprises a bottom hole assembly, a magazine, a tubular, a tool, a sub, or combinations thereof.

Embodiment 36. The system of embodiment 32, wherein the bridge is configured to move from a first bridge position to a second bridge position along the guide rail and over the horizontal storage area.

Embodiment 37. The system of embodiment 36, wherein the guide rail comprises first and second guide rails, with the first guide rail positioned proximate to an opposite end of the bridge from the second guide rail.

Embodiment 38. The system of embodiment 32, wherein the pipe handler comprises a body coupled to the bridge and an arm rotationally coupled to the body.

Embodiment 39. The system of embodiment 38, wherein the arm engages equipment and transports the equipment into or out of the internal storage area.

Embodiment 40. The system of embodiment 39, wherein the arm comprises a plurality of grippers.

Embodiment 41. The system of embodiment 39, wherein the bridge comprises first and second bridge rails with a space therebetween.

Embodiment 42. The system of embodiment 41, wherein the arm transports the equipment through the space.

Embodiment 43. The system of embodiment 32, wherein the bridge comprises: first and second bridge rails, with a space therebetween; and first and second bridge rail extensions coupled to the first and second bridge rails, respectively.

Embodiment 44. The system of embodiment 43, wherein the pipe handler is coupled to the first and second bridge rail extensions and configured to move along the first and second bridge rail extensions.

Embodiment 45. The system of embodiment 44, wherein the first and second bridge rail extensions selectively extend to lengthen the bridge toward a well center on a rig floor or retract to shorten the bridge away from a well center on a rig floor.

Embodiment 46. The system of embodiment 44, wherein the first and second bridge rail extensions selectively extend to lengthen the bridge or retract to shorten the bridge.

Embodiment 47. The system of embodiment 43, wherein the bridge further comprises first and second additional bridge rail extensions coupled to the first and second bridge rails, respectively.

Embodiment 48. The system of embodiment 47, wherein the first and second additional bridge rail extensions selectively extend to lengthen the bridge toward a well center on a rig floor or retract to shorten the bridge away from a well center on a rig floor.

Embodiment 49. The system of embodiment 48, wherein the first and second bridge rail extensions move along the first and second bridge rails to allow the pipe handler to access a full length of the bridge when the bridge is extended to or over the rig floor.

Embodiment 50. The system of embodiment 32, further comprising a shuttle coupled to a second bridge within the horizontal storage area, the bridge being coupled to the guide rail.

Embodiment 51. The system of embodiment 50, wherein engagement of the bridge with the second bridge unlocks the second bridge and enables movement of the second bridge along the guide rail, the movement of the second bridge being driven by the bridge.

Embodiment 52. The system of embodiment 50, wherein engagement of the pipe handler with the shuttle unlocks the shuttle and enables movement of the shuttle along the second bridge, the movement of the shuttle being driven by the pipe handler.

Embodiment 53. The system of embodiment 52, wherein the shuttle carries large, bulky, or oddly shaped equipment between the horizontal storage area and a rig floor.

Embodiment 54. A catwalk system comprising: a first bridge and a second bridge disposed within a horizontal storage area and coupled to a guide rail, with the first bridge and the second bridge configured to move along the guide rail in a first direction; a pipe handler coupled to the first bridge and configured to move along the first bridge in a second direction; and a shuttle coupled to the second bridge and configured to move along the second bridge in the second direction, wherein the pipe handler is configured to selectively couple to the shuttle and drive the shuttle in the second direction.

Embodiment 55. The system of embodiment 54, wherein the first bridge is configured to selectively couple to the second bridge and drive the second bridge in the first direction.

Embodiment 56. The system of embodiment 54, wherein the first direction is generally perpendicular to the second direction.

Embodiment 57. The system of embodiment 54, further comprising a bridge lock configured to prevent movement of the second bridge relative to the guide rail when the bridge lock is engaged.

Embodiment 58. The system of embodiment 57, wherein when the first bridge couples to the second bridge, the first bridge disengages the bridge lock and allows the second bridge to move relative to the guide rail.

Embodiment 59. The system of embodiment 54, further comprising a shuttle lock configured to prevent movement of the shuttle relative to the second bridge when the shuttle lock is engaged.

Embodiment 60. The system of embodiment 57, wherein when the pipe handler couples to the shuttle, the pipe handler disengages the shuttle lock and allows the shuttle to move relative to the second bridge.

Embodiment 61. A method of operating an equipment handling system comprising: lifting an equipment basket, via a crane coupled to a bridge, from a first storage location in a horizontal storage area; transporting the equipment basket to an elevated storage location in the horizontal storage area; gripping, via an arm coupled to the bridge, equipment in an internal storage area of the equipment basket; lifting, via the arm, the equipment from the equipment basket; and transporting the equipment, via the arm, to a well center on a rig floor.

Embodiment 62. The method of embodiment 61, further comprising transporting the equipment basket to an elevated storage location in the horizontal storage area; and then lifting, via the arm, the equipment from the equipment basket.

Embodiment 63. The method of embodiment 62, further comprising: moving the tubular along the bridge from the horizontal storage area to the rig floor via the arm; and delivering the tubular, via the arm, to the well center in a vertical, inclined, or horizontal orientation.

Embodiment 64. The method of embodiment 62, further comprising: moving the tubular along the bridge from the horizontal storage area to the rig floor via the arm; delivering the tubular, via the arm, to the rig floor proximate the well center in a horizontal orientation; releasing the tubular into a holder on the rig floor in the horizontal orientation; and then engaging and lifting the tubular from the holder on the rig floor via a second pipe handler.

Embodiment 65. The method of embodiment 62, further comprising: during the transporting of the tubular, moving the tubular, via the arm, through a space between first and second bridge rails of the bridge.

Embodiment 66. The method of embodiment 62, wherein transporting the equipment basket further comprises translating the bridge along a guide rail from a first bridge position to a second bridge position wherein the second bridge position is spaced apart from the first bridge position.

Embodiment 67. The method of embodiment 62, further comprising: moving the tubular from a first horizontal position associated with a pick-up position through a vertical position and to a second horizontal position associated with a delivered position.

Embodiment 68. The method of embodiment 67, wherein the delivered position is on the rig floor.

Embodiment 69. The method of embodiment 62, further comprising: translating the arm along at least a portion of a length of the bridge while rotating the tubular from a first horizontal position, through a vertical position, to a second horizontal position.

Embodiment 70. The method of embodiment 69, wherein the first horizontal position is in the equipment basket and the second horizontal position is on or above the rig floor.

Embodiment 71. The method of embodiment 69, wherein the second horizontal position is in the equipment basket and the first horizontal position is on or above the rig floor.

Embodiment 72. A catwalk system comprising: a guide rail; a bridge disposed over a horizontal storage area, coupled to a guide rail, and configured to move along the guide rail in a first direction, with one end of the bridge configured to couple to a rig floor and the bridge configured to move in a second direction with the rig floor when the rig floor moves relative to the horizontal storage area; and a pipe handler coupled to the bridge and configured to move along the bridge in the second direction.

Embodiment 73. The catwalk system of embodiment 72, wherein the first direction is substantially perpendicular to the second direction.

Embodiment 74. The catwalk system of embodiment 72, wherein the pipe handler transports equipment between the horizontal storage area and the rig floor or equipment on the rig floor.

Embodiment 75. The catwalk system of embodiment 72, wherein the guide rail comprises first and second guide rails, and wherein the first guide rail is positioned along one side of the horizontal storage area and the second guide rail is positioned along a side of the rig floor, the rig floor being positioned on an opposite side of the horizontal storage area, and the second guide rail is configured to move with the rig floor when the rig floor moves.

Embodiment 76. The catwalk system of embodiment 72, wherein the guide rail comprises first and second guide rails, and wherein the first guide rail is positioned along one side of the horizontal storage area and the second guide rail is positioned along an opposite side of the horizontal storage area.

Embodiment 77. The catwalk system of embodiment 76, wherein the bridge comprises first and second bridge rails, with a space therebetween, and wherein the pipe handler transports equipment through the space.

Embodiment 78. The catwalk system of embodiment 77, wherein the bridge further comprises first and second bridge rail extensions, wherein the first and second bridge rail extensions are moveably coupled to the first and second bridge rails, respectively, and wherein the pipe handler is moveably coupled to the first and second bridge rail extensions.

Embodiment 79. The catwalk system of embodiment 78, wherein the first and second bridge rail extensions selectively extend toward the rig floor or away from the rig floor to selectively allow the pipe handler access to the rig floor or the rig floor equipment.

Embodiment 80. The catwalk system of embodiment 78, wherein the bridge further comprises third and fourth bridge rail extensions that are moveably coupled to the first and second bridge rails and moveably coupled to the first and second bridge rail extensions.

Embodiment 81. The catwalk system of embodiment 80, wherein the guide rail further comprises a third guide rail, wherein the third guide rail is positioned along a side of the rig floor, the rig floor being positioned on an opposite side of the horizontal storage area, and the third guide rail is configured to move with the rig floor when the rig floor moves.

Embodiment 82. The catwalk system of embodiment 81, wherein the third and fourth bridge rail extensions move relative to the first and second bridge rails when the rig floor moves relative to the horizontal storage area.

Embodiment 83. A catwalk system comprising: a bridge disposed in a horizontal orientation above a horizontal storage area; a tubular lift system configured to transport a tubular in a horizontal orientation between the horizontal storage area and an intermediate storage location; and a pipe handler moveably coupled to the bridge, the pipe handler configured to transport the tubular between the intermediate storage location and a rig floor.

Embodiment 84. The system of embodiment 83, wherein the bridge comprises first and second bridge rails with a space between.

Embodiment 85. The system of embodiment 84, wherein pipe handler is configured to transport the tubular through the space while the tubular is being transported along the bridge.

Embodiment 86. The system of embodiment 83, wherein the tubular lift system is configured to simultaneously lift multiple tubulars in a horizontal orientation.

Embodiment 87. The system of embodiment 83, wherein the intermediate storage location comprises a longitudinal groove, and wherein the tubular lift system is configured to deliver the tubular to or receive the tubular from the longitudinal groove.

Embodiment 88. The system of embodiment 87, wherein the pipe handler is further configured to engage the tubular in the longitudinal groove and lift the tubular from the longitudinal groove, or deliver the tubular to the longitudinal groove and disengage from the tubular.

Embodiment 89. The system of embodiment 83, wherein the tubular lift system comprises a front lift system and a rear lift system, wherein the front lift system is configured to transport multiple tubulars in a horizontal orientation between a first portion of the horizontal storage area and the intermediate storage location, and wherein the rear lift system is configured to transport multiple tubulars in a horizontal orientation between a second portion of the horizontal storage area and the intermediate storage location.

Embodiment 90. The system of embodiment 89, wherein the front lift system delivers one of the multiple tubulars into a longitudinal groove of the intermediate storage location from a first side of the intermediate storage location, and wherein the rear lift system delivers one of the multiple tubulars into the longitudinal groove from a second side of the intermediate storage location.

Embodiment 91. The system of embodiment 90, wherein the first side and the second side are opposite sides of the intermediate storage location.

Embodiment 92. The system of embodiment 83, wherein the intermediate storage location comprises: a longitudinal groove that receives the tubular; and one or more sensors that measure a parameter of the tubular that is present in the longitudinal groove.

Embodiment 93. The system of embodiment 92, wherein the parameter comprises weight, length, diameter, tubular damage, or combinations thereof.

Embodiment 94. The system of embodiment 83, wherein the pipe handler is further configured to lift the tubular from the intermediate storage location, rotate the tubular from the horizontal orientation to a vertical orientation, and deliver the tubular to a well center on the rig floor in the vertical orientation.

Embodiment 95. The system of embodiment 94, wherein the pipe handler is further configured to spin the tubular into connection with a tubular string at the well center.

Embodiment 96. The system of embodiment 83, wherein the pipe handler is further configured to spin the tubular to disconnect the tubular from a tubular string at a well center.

Embodiment 97. The system of embodiment 96, wherein the pipe handler is further configured to rotate the tubular from a vertical orientation at a well center to the horizontal orientation and deliver the tubular to the intermediate storage location in the horizontal orientation.

Embodiment 98. The system of embodiment 83, wherein the bridge comprises first and second bridge rails, with first and second bridge rail extensions coupled to the respective first and second bridge rails to extend the bridge over the rig floor.

Embodiment 99. The system of embodiment 98, wherein the first and second bridge rail extensions are coupled to the rig floor.

Embodiment 100. The system of embodiment 83, wherein the tubular lift system comprises a plurality of lift actuators carried by left and right vertical conveyances that are configured to transport multiple tubulars between the horizontal storage area and the intermediate storage location in a horizontal orientation.

Embodiment 101. A tubular handling system comprising: a bridge disposed in a horizontal position proximate a drill floor, the bridge comprising first and second bridge rails with a space between; an arm coupled to the first and second bridge rails, the arm configured to manipulate a tubular through the space between the first and second bridge rails and to move back and forth along the bridge; and a tubular lift system that raises or lowers the tubular in a horizontal orientation between a horizontal storage and an intermediate storage location, the arm being configured to collect the tubular from the intermediate storage location and present the tubular to a well center on the drill floor or collect the tubular from the well center and deposit the tubular in the intermediate storage location.

Embodiment 102. The system of embodiment 101, wherein the tubular lift system comprises left and right vertically oriented conveyances, and wherein each of the left and right vertically oriented conveyances comprise multiple actuators that cooperate together to raise or lower the tubular in the horizontal orientation between the horizontal storage and the intermediate storage.

Embodiment 103. The system of embodiment 102, wherein the multiple actuators of the left and right vertically oriented conveyances simultaneously raise or lower one or more tubulars.

Embodiment 104. The system of embodiment 101, wherein the tubular lift system comprises a front lift system and a rear lift system, wherein the front lift system is configured to vertically transport multiple tubulars in the horizontal orientation between a first portion of a horizontal storage area and an intermediate storage location, and wherein the rear lift system is configured to transport multiple tubulars in the horizontal orientation between a second portion of the horizontal storage area and the intermediate storage location.

Embodiment 105. The system of embodiment 104, wherein the front lift system delivers the tubular into a longitudinal groove of the intermediate storage location from a first side of the intermediate storage location, and wherein the rear lift system delivers the tubular into the longitudinal groove from a second side of the intermediate storage location.

Embodiment 106. The system of embodiment 105, wherein the first side and the second side are opposite sides of the intermediate storage location.

Embodiment 107. The system of embodiment 101, wherein the intermediate storage location comprises: a longitudinal groove that receives the tubular; and one or more sensors that measure a parameter of the tubular that is present in the longitudinal groove.

Embodiment 108. The system of embodiment 107, wherein the parameter comprises weight, length, diameter, tubular damage, or combinations thereof.

Embodiment 109. A method for handling a tubular comprising: lifting a tubular, via a vertically oriented tubular lift system, from a horizontal storage area to an intermediate storage location while maintaining the tubular in a horizontal orientation; engaging the tubular at the intermediate storage location with a pipe handler; transporting the tubular, via the pipe handler, along a bridge to a rig floor; rotating the tubular, via the pipe handler, from the horizontal orientation to a vertical orientation; and presenting, via the pipe handler, the tubular in the vertical orientation to a well center.

Embodiment 110. The method of embodiment 109, wherein the rotating of the tubular further comprises moving the tubular through a space between first and second bridge rails of the bridge.

Embodiment 111. The method of embodiment 110, further comprising translating of the pipe handler along the bridge while manipulating the tubular through the space.

Embodiment 112. The method of embodiment 109, wherein the lifting the tubular further comprises engaging the tubular with first and second actuators of the vertically oriented tubular lift system and vertically raising the tubular toward the intermediate storage location.

Embodiment 113. The method of embodiment 112, further comprising releasing, via the first and second actuators, from the vertically oriented tubular lift system into a longitudinal groove in the intermediate storage location.

Embodiment 114. A method for handling a tubular comprising: retrieving, via a pipe handler, a tubular in a vertical orientation from a rig floor; transporting the tubular, via the pipe handler, from the rig floor along a bridge; rotating the tubular, via the pipe handler, from the vertical orientation to a horizontal orientation; disengaging the tubular, via the pipe handler, into an intermediate storage location; and lowering the tubular, via a vertically oriented tubular lift system, from the intermediate storage location to a horizontal storage area while maintaining the tubular in the horizontal orientation.

Embodiment 115. The method of embodiment 114, wherein the rotating of the tubular further comprises moving the tubular through a space between first and second bridge rails of the bridge.

Embodiment 116. The method of embodiment 115, further comprising translating of the pipe handler along the bridge while manipulating the tubular through the space.

Embodiment 117. The method of embodiment 114, wherein the lowering the tubular further comprises engaging the tubular with first and second actuators of the vertically oriented tubular lift system and vertically lowering the tubular toward the horizontal storage area.

Embodiment 118. The method of embodiment 117, further comprising releasing, via the first and second actuators, from the vertically oriented tubular lift system into the horizontal storage area.

Embodiment 119. A method for handling a tubular comprising: in a horizontal orientation, lifting, via a tubular conveyance, a tubular from a horizontal storage to an intermediate storage location; gripping, via an arm, the tubular in the intermediate storage location, the arm being coupled to a bridge that is disposed in a horizontal orientation, the bridge comprising first and second bridge rails with a space between; lifting, via the arm, the tubular from the intermediate storage location and manipulating the tubular through the space between the first and second bridge rails; and moving, via the arm, the tubular from the intermediate storage location to a well center on a rig floor.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A tubular handling system for conducting a subterranean operation, the system comprising:
    a bridge disposed in a horizontal position proximate a drill floor, the bridge comprising first and second bridge rails with a space between;
    an arm coupled to the first and second bridge rails, the arm configured to manipulate a tubular through the space between the first and second bridge rails, and to move along the bridge; and
    a tubular lift system that raises or lowers the tubular in a horizontal orientation between a horizontal storage area and an intermediate storage location, the arm being configured to collect the tubular from the intermediate storage location and present the tubular to a well center on the drill floor or to a pipe handler, or to collect the tubular from the well center or the pipe handler and deposit the tubular in the intermediate storage location.

2. The system of claim 1, wherein the tubular lift system comprises left and right vertically oriented conveyances, and wherein each of the left and right vertically oriented conveyances comprise multiple actuators that cooperate together to raise or lower the tubular in the horizontal orientation between the horizontal storage area and the intermediate storage.

3. The system of claim 2, wherein the multiple actuators of the left and right vertically oriented conveyances simultaneously raise or lower one or more tubulars.

4. The system of claim 1, wherein the tubular lift system comprises a front lift system and a rear lift system, wherein the front lift system is configured to vertically transport multiple tubulars in the horizontal orientation between a first portion of the horizontal storage area and an intermediate storage location, and wherein the rear lift system is configured to transport multiple tubulars in the horizontal orientation between a second portion of the horizontal storage area and the intermediate storage location.

5. The system of claim 4, wherein the front lift system delivers the tubular into a longitudinal groove of the intermediate storage location from a first side of the intermediate storage location, and wherein the rear lift system delivers the tubular into the longitudinal groove from a second side of the intermediate storage location.

6. The system of claim 5, wherein the first side and the second side are opposite sides of the intermediate storage location.

7. The system of claim 1, wherein the intermediate storage location comprises:
   a longitudinal groove that receives the tubular; and
   one or more sensors that measure a parameter of the tubular that is present in the longitudinal groove.

8. The system of claim 7, wherein the parameter is selected from a group consisting of weight, length, diameter, tubular damage, or combinations thereof.

9. The system of claim 1, wherein the pipe handler comprises a top drive, an elevator, or a vertical pipe handler.

10. The system of claim 1, further comprising a doping device, wherein the arm is configured to manipulate the tubular to extend an end of the tubular into the doping device.

11. The system of claim 10, wherein the doping device applies dope to the end of the tubular when the end is in the doping device.

12. The system of claim 10, wherein the arm comprises multiple grippers that are configured to engage the tubular and allow the arm to manipulate the tubular when the multiple grippers are engaged with the tubular.

* * * * *